United States Patent [19]

Campbell

[11] 4,259,720
[45] Mar. 31, 1981

[54] SECURITY SYSTEM FOR ELECTRONIC FUNDS TRANSFER SYSTEM

[75] Inventor: Carl M. Campbell, Newtown Square, Pa.

[73] Assignee: Interbank Card Association, New York, N.Y.

[21] Appl. No.: 867,924

[22] Filed: Jan. 9, 1978

[51] Int. Cl.³ .................. H04L 9/00; G06F 15/30
[52] U.S. Cl. ........................... 364/200; 375/2; 340/149 R
[58] Field of Search ... 364/200 MS File, 900 MS File; 178/22; 340/149 R, 152 R; 375/2

[56] References Cited

U.S. PATENT DOCUMENTS

| 3,764,742 | 10/1973 | Abbott et al. | 364/200 X |
|---|---|---|---|
| 3,798,359 | 3/1974 | Feistel | 178/22 |
| 3,798,605 | 3/1974 | Feistel | 364/200 |
| 3,958,081 | 5/1976 | Ehrsam et al. | 364/200 X |
| 3,962,539 | 6/1976 | Ehrsam et al. | 364/200 X |
| 3,984,637 | 10/1976 | Caudill et al. | 364/200 X |
| 4,004,089 | 1/1977 | Richard et al. | 178/22 |
| 4,074,066 | 2/1978 | Ehrsam et al. | 178/22 |
| 4,078,152 | 3/1978 | Tuckerman | 178/22 |
| 4,120,030 | 10/1978 | Johnstone | 364/200 |
| 4,193,131 | 3/1980 | Lennon et al. | 375/2 |
| 4,203,166 | 5/1980 | Ehrsam et al. | 375/2 |

Primary Examiner—Mark E. Nusbaum
Attorney, Agent, or Firm—Brumbaugh, Graves, Donohue & Raymond

[57]    ABSTRACT

A security system, particularly useful in an electronic funds transfer system, makes use of secret identification codes known only to system users. The codes are encrypted upon insertion into the system and are stored in a data processing unit in encrypted form. A security module is used to decrypt the code entered by a user and compare it to the corresponding encrypted code stored in the data processing unit.

5 Claims, 4 Drawing Figures

SECURITY SYSTEM FOR ELECTRONIC FUNDS TRANSFER SYSTEM

BACKGROUND OF THE INVENTION

This invention relates to security in data processing systems, and particularly to systems for preventing unauthorized use of a data processing system.

Unless suitable precautions are taken, data processing systems, especially automatic banking or electronic funds transfer systems, can be particularly vulnerable to fraudulent transactions. This vulnerability arises out of the fact that an unauthorized user can obtain access to the system without confrontation by another individual. Thus, in an electronic banking system a fraudulent user may secure funds from the system without the possibility of personal identification. Prior art systems for preventing fraudulent use of such systems have included the use of secret identification numbers, known only to authorized system users. These numbers are generally stored on a computer memory associated with a data processing unit. When an authorized user desires to obtain access to the system, for example to enter into a banking transaction, he must identify himself at a transaction terminal, such as an automatic banking terminal, by keying his secret identification number into the terminal. The data processing system compares the number keyed by the customer with the stored secret number corresponding to the customer's account, and if the numbers match, the transaction is authorized.

Two substantial security problems arise by the ordinary use of secret code numbers. The first problem can arise through the actions of personnel who are familiar with the data processing system. It is possible under ordinary circumstances for a dishonest employee, familiar with system programming, to obtain a computer print-out of account numbers and the corresponding secret identification code numbers. With this information available, unauthorized identification, such as a credit card or other identification indicia, can be fabricated and used at automatic banking terminals to defraud the bank. Another problem arises out of the possible use of a wire-tap on the communications link associated with a remote terminal, which can enable the surreptitious determination of secret identification numbers corresponding to customer account numbers. These numbers might then be used to defraud the bank using fabricated or stolen identification.

The problem of security in automatic banking systems becomes more complex when a system is arranged to enable a banking customer to obtain funds or merchandise at a terminal associated with a bank other than the bank at which he maintains his account. In this case, a problem of responsibility for fraudulent transactions can arise between the bank maintaining the terminal and the bank maintaining the account. This problem might preclude the establishment and successful operation of such a multiple-bank system. When secret code numbers might be compromised either by wire-tapping or by tampering with a data processing system, responsibility for fraudulent use becomes difficult to determine and it is therefore difficult to assess liability among banks operating as members of a cooperative electronic funds transfer system.

It is therefore an object of the present invention to provide apparatus for verifying the identity of an authorized person making use of automatic data processing equipment.

In particular, it is an object of the invention to provide security apparatus for use in electronic banking equipment.

SUMMARY OF THE INVENTION

In accordance with the invention, a system for automatically processing data entered at a terminal by an authorized person is provided with apparatus for verifying the identity of the authorized person. The apparatus includes code entry means at the terminal for receiving a secret code entered by the person and for generating input electrical signals representative of the code. Encrypting means associated with the code entry means and responsive to the input electrical signals and a first encrypting key are provided for generating encrypted electrical signals representative of the secret code encrypted by the first key. Storage means are provided for storing the value of the secret code encrypted by a second encrypting key. A security module communicating with the encrypting means and the storage means is responsive to the encrypted electrical signals and the stored encrypted secret code for decrypting the electrical signals and the code and providing an indication if the electrical signals are representative of the code. The security module is arranged to prevent output of the code in decrypted form.

The terminal may include means for entering identifying information other than the secret code and generating identifying electrical signals representative of the entered information. In this case, the storage means may store a plurality of the secret codes encrypted by the second encrypting key and include means responsive to the identifying electrical signals for selecting one of the encrypted codes and supplying the selected code to the security module. The storage means may also be arranged to store the first encrypting key in encrypted form and the security module can be used to decrypt the first key. There may be provided a plurality of terminals each of which has a unique first encrypting key. The terminals can generate terminal representative electrical signals which may be used by the storage means to select the encrypted first encrypting key corresponding to that terminal and supply the selected key to the security module.

In a variation of the invention, the security module may be used to decrypt the secret code and re-encrypt the secret code using the second encrypting key and thereby generate second key encrypted electrical signals representative of the secret code. In this case, data processing means, which includes storage means for storing secret codes encrypted by the second key can be used for comparing the second key encrypted electrical signals to the stored encrypted secret code, and provide an indication if the electrical signals are representative of the secret code. In this case, there may be provided a plurality of the second encrypting keys, each corresponding to a data processing unit. The second encrypting keys can be stored in an unsecured memory in encrypted form and provided to security module as required.

The invention is particularly useful in a system for automatically performing banking functions in response to transaction requests originated at banking terminals by banking customers. In this case, a data processing unit can be provided for interpreting a transaction message which consists of a first message portion comprising an encrypted secret customer code and a second message portion containing transaction information. If the transaction message corresponds to an account maintained by the bank associated with the banking terminal, the bank's data processing unit can interpret the transaction message and cause its security module to compare the encrypted message portion with a stored secret code. If the transaction corresponds to an account maintained by a different banking organization, the encrypted code can be re-encrypted into a new encrypted message portion which can be transmitted with the transaction message portion to the data processing unit associated with the bank at which the customer maintains his account. For additional security, the encrypted message portion can be formed using portions of the transaction message portion.

For a better understanding of the present invention, together with other and further embodiments, reference is made to the following description, taken in conjunction with the accompanying drawings and its scope will be pointed out in the appended claims.

DESCRIPTION OF THE INVENTION

Figure 1:
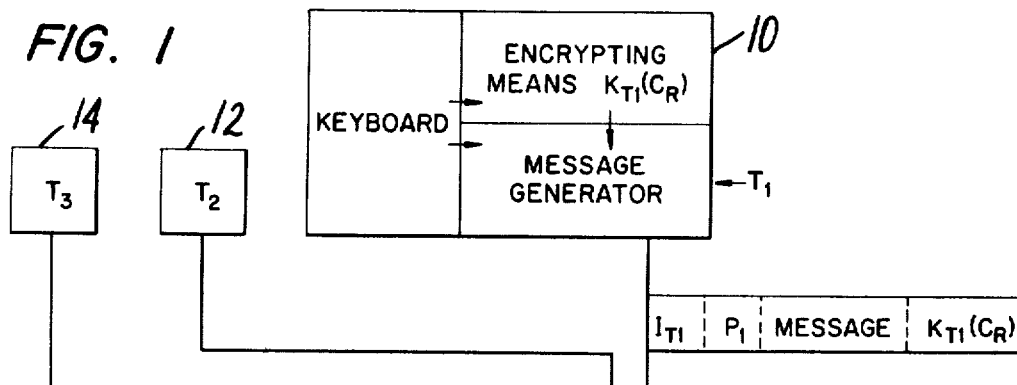
FIG. 1 is a functional block diagram of a data processing system having security apparatus in accordance with the present invention.

FIG. 1 is a functional block diagram illustrating an embodiment of the present invention. The system illustrated includes a plurality of transaction terminals 10, 12, and 14, of the type which may be used in an automatic banking system. Each terminal 10 includes a keyboard for entering information. The entered information includes a transaction message to be provided to the data processing unit 16, which may be a request for a banking transaction, such as a cash advance at the automatic banking terminal 10. In response to entries in the keyboard, or by other means such as a device for reading a magnetically encrypted card, a message is formed indicating the identification of the terminal, the identification of the person utilizing the terminal, the transaction which is requested and a secret identification code, which is manually entered by the person utilizing the terminal. The secret identification code may typically be a three to five digit number which is memorized by the person and is not revealed to any other person. The secret code which is entered at terminal 10 is provided directly from the keyboard to an encrypting device, such as a microprocessor or LSI circuit within the terminal which converts the secret code into encrypted electrical signals for transmission by terminal 10 to data processing unit 16. When the terminal is a point of sale terminal operated by a clerk, a separate keyboard may be provided on which the person utilizing the terminal may enter his secret code without disclosing the code to the clerk.

The encrypting of the secret code is carried out in accordancre with an algorithm which makes use of an encrypting key. A suitable algorithm for this function has been published by the National Bureau of Standards (hereinafter NBS Algorithm) and is available from the National Bureau of Standard, Systems and Software Division, Institute for Computer Services Technology, Building 225, Room A265, Washington, D. C. 20234. The NBS Algorithm has been published in the Federal Register, Volume 40, Number 52, pages 12067-12250, Mar. 11, 1975. The Algorithm is designed to encypher and decypher blocks of data consisting of 64 bits, under the control of a 64 bit key. According to the NBS Algorithm, the number to be encoded is put through a series of operations, the nature of which is dependent on the key. The process is reversable so that once the number has been encrypted into a cypher using a particular key, the original number can be obtained from the cypher by an inverse process using the same key.

In the block diagram of FIG. 1, the key used by terminal 10 is designated $K_{T1}$. The code entered by the person using terminal 10 is designated $C_R$. The encrypted message portion generated by the encrypting device in terminal 10 is therefore designated $K_{T1}(C_R)$. The message portion representing the identification of the person operating terminal 10 is $P_1$. The message portion identifying terminal 10 is indicated as $I_{T1}$. Message portions $P_1$ and $I_{T1}$ are used in data processing unit 16 to select codes and encrypting keys from unsecured memory 18. In some arrangements, the identification of the terminal may be made by reference to the communication line on which the message is received, and the identifying signals can be generated by data processing unit 16.

Since the algorithm which is used in the encryption process is a nonsecret NBS Algorithm, it is important that the keys used in the encrypting process be maintained in secrecy, just as the personal identification codes are maintained in secrecy. In an establishment such as a bank wherein a large number of employees may have access to the data processing unit, it is difficult to maintain such codes and keys in a memory in a manner which prevents access by personnel operating the data processing unit 16. For this reason, the codes and keys are stored in a storage device 18 in an encrypted form. The encrypting at the data processing unit 16 is performed by a security module 20. This module is the only location wherein memory states or signals representing the unencrypted form of keys or codes may exist, and most of these exist in the security module 20 only for a brief period of time.

Security module 20 is preferably housed separately from data processing unit 16 and is provided with separate controls and programs which preclude the output from security module 20 of the unencrypted form of identification codes or the keys for terminals 10, 12, and 14. Security module 20 is provided with a master key, designated $K_2$ in FIG. 1. This key is used for encrypting the terminal keys, $K_{T1}$, $K_{T2}$ and $K_{T3}$ corresponding to terminals 10, 12, and 14 respectively and is also used to encrypt customer identification code numbers $C_1$, $C_2$, $C_3$ so that all of these numbers may be stored in an encrypted form in unsecure memory 18. Master key $K_2$ is stored only within security module 20 which is arranged to prevent access to the master key. By storing the encrypted form of the keys and codes in unsecure memory 18, a dishonest bank employee is precluded from obtaining the unencrypted form of these keys and codes. It is possible for a banking employee to manipulate data processing unit 16 and thereby obtain a printout of account numbers and encrypted code. The encrypted codes cannot be decyphered by the dishonest employee in the absence of knowing the master key, $K_2$ which is stored only in security module 20. Preferably, the master key $K_2$ is contained in a device which will self-destruct upon tampering with security module 20, and the security module itself is maintained in a secure area of the bank's facility. The functions performed by the security module are primarily performed by the use of large scale integrated circuits, so that the physical size of the module is relatively small. Since the encrypted secret code numbers and keys are stored in a memory 18 external to the security module, the module itself requies only a relatively small amount of read-write memory. Rather than a single masterkey $K_2$, it is possible to provide multiple master keys in the security module, each for a different function. One master key can be used for encrypting codes, another for encrypting keys, and another for controlling access to the operation of the security module.

When data processing unit 16 receives a message from a terminal, for example terminal 10, which requests that a transaction be authorized, the data processing unit supplies the terminal identification portion of the message $I_{Ti}$ to a first selecting apparatus 17 and the customer identification portion of the message $P_i$ to a code selecting apparatus 19. Apparatus 19 selects the customer's encrypted code number from memory 18, and apparatus 17 selects the appropriate key, also inn encrypted form, form memory 18. The encrypted key and code are supplied to security module 20, where they are decrypted using master key $K_2$. The decrypted terminal key $K_t$, is used to decrypt the secret code number entered by the customer at the terminal. The two decrypted secret code numbers are compared in security module 20, and if they are identical, a message is provided to open gate 21 in the data processing unit, and provide the transaction message portion to a data processing means for transaction processing. If the codes do not correspond, a rejection message is provided to data processing unit 16 and closed gate 21 prevents further processing of the transaction request. Typically, gate 21 is merely a software controlled function in the data processing unit.

Figure 2:
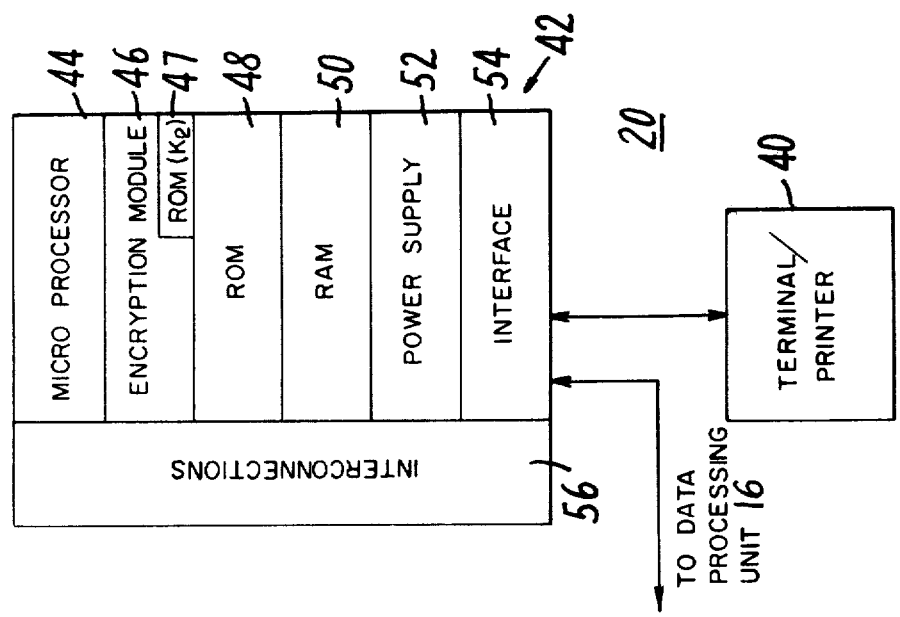
FIG. 2 is a block diagram illustrating the details of the security module used in the FIG. 1 system.

FIG. 2 is a block diagram illustrating the component hardware parts of security module 20. The module may include data processing apparatus 42 and an input/output device 40 such as a terminal, a printer or both. Apparatus 42 performs most functions for processing of customer code signals by direct interface with data processing unit 16. Terminal 40 is used only for special functions of the security module, such as entry of customer code numbers as will be discussed below. Data processing apparatus 42 is fabricated entirely from available microcomputer components, which are mounted in a suitable chassis and provided with a power supply 52. The components are tied together by interconnections 56 which provide data, control and address channels.

Data processing apparatus 42 is operated under the control of microprocessor 44 in accordance with programs stored in read-only-memory (ROM) 48. Data input and output from the data processing unit 16 or terminal 40 is provided by interface circuit 54, whose operation is controlled by microprocessor 44. Typically such input and output will be in serial format, while interconnection data will be in parallel format. The encryption module 46 is a special purpose microprocessor which performs the encrypting and decrypting functions according to the NBS Algorithm. The master key for the security module is contained in a read-only-memory (ROM). The master key can be changed only by replacing or re-programming this ROM. Random access memory (RAM) 50 is used to store intermediate data, perform input/output buffering, and store message format definitions. It may be a part of microprocessor 44 or a separate memory.

Motorola Semiconductor Products, Inc., Phoenix, Arizona, produces microprocessor components suitable for use in the security module. The components and their functions are as follows:

| Motorola Part Number | Description | Function |
|---|---|---|
| M68 MMCCL | 10 Card Chassis | Chassis, power supply 52 and interconnections 56. |
| M68MM01A | Microcomputer | Microprocessor 44 and RAM 50. |
| MSG6800 DSM | Data Security Module | Encryption Module 46 including ROM 47. |
| MEX6850 | ACIA Module | Interface 54 |
| M68MM04-1 | EROM Module | Read only memory 48. |
| MCM687808 | ROM | Read only memory 48. |

The capacity of the ROM and RAM memories required necessarily depends on the number and nature of different programmed operations the security module must handle.

In a typical operation, for example, comparing a received encrypted code to a code which are stored in the data processing unit 16 using a different key, the following operation may take place. Interface 54 receives a control signal indicating the function to be performed and data representing the received encrypted code ($K_{T1}$ (CR)), stored encrypted code ($K_2$ ($C_1$)) and encrypted terminal key ($K_2$ ($K_{T1}$)). The control signal causes microprocessor 44 to select an appropriate program from the ROM and acting under that program store the received data in the RAM. The microprocessor then provides the data in appropriate sequence, with instructions, to the encryption module 46. The encryption module will perform the following functions:

(1) Decrypt $K_{T1}$ using $K_2$
(2) Decrypt $C_R$ using $K_{T1}$
(3) Decrypt $C_1$ using $K_2$ The decrypted $C_R$ and $C_1$ are stored in the RAM, 50 and then compared by the microprocessor 44. The microprocessor 44 will then generate an appropriate output message indicating a correct or incorrect $C_R$ and provide the output message to data processing unit 16 by interface 54. The values of $C_R$ and $C_1$ are then erased in the RAM 50 and encryption module 46. The programming prevents these values from being supplied as outputs in unencrypted form.

When new customers are to be added to the system it becomes necessary to have direct access to the secret codes in unencrypted form. For this function, terminal 40 is advantageously provided in a secure location in direct communication with the security module data processing apparatus. A secret code number selected by the customer can be entered at a terminal. The security module can then encrypt the number according to a stored program and supply the customer's account number and the secret code number in encrypted from for storage to data processing unit 16. Alternately, the secret code number can be generated by the security module, for example, by encrypting the account number, and supplied to an output printer 40 to be forwarded to the customer under secure conditions.

An alternative to a separate security module terminal or printer 40 is to permit use of input/output devices associated with data processing unit 16 for printing secret codes to be forwarded to customers. This possibility is necessarily less secure, and requires special measures to secure the area containing the computer and its peripherals prior to such use.

It will be recognized that the ROM of data processing apparatus 42 may include many other security related programs for performing the various functions required by the various modifications of the invention.

Those skilled in the art will recognize that variations of the encrypting and decrypting process may be advantageous. For example, it may be advisable to cause the terminal 10 to encrypt the secret code according to terminal key $K_{T1}$ and to use portions of the transaction message in the encrypting process. In this way, the security module 20 can also verify the accuracy of the transaction message as received by data processing unit 16, since that message must be used to get a correct decrypting of the secret code.

Figure 3:
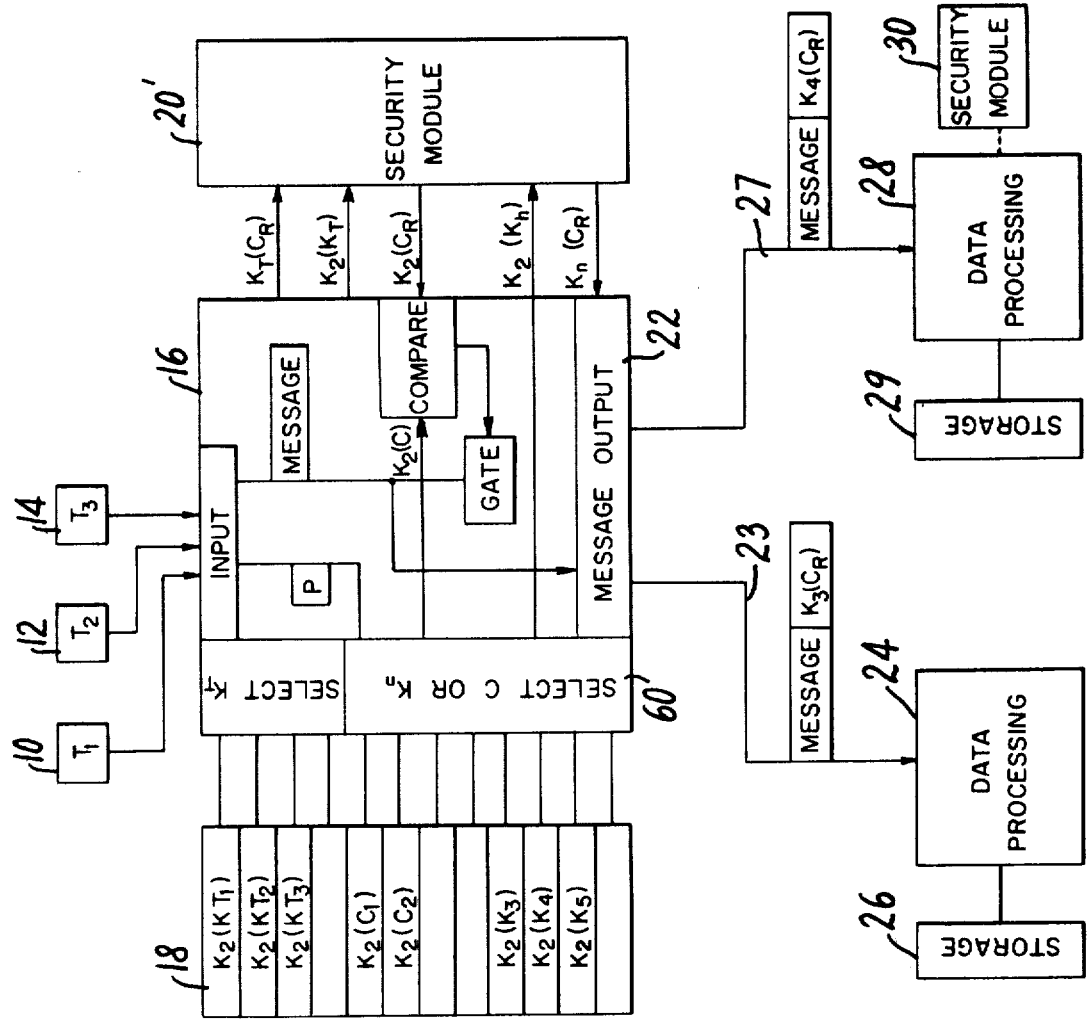
FIG. 3 is a functional block diagram illustrating an alternate arrangement of the present invention.

FIG. 3 illustrates in block diagram an embodiment of the invention which is usable in an electronic funds transfer system wherein a plurality of data processing units are tied together by communication lines to effect fund transfers between accounts in various banks. In this system, a customer of one bank can make use of a terminal which is connected to the data processing unit of another bank. When a message is received from a terminal by data processing unit 16, the identification of the terminal customer is provided to a selecting circuit 60. If the identification indicates that the terminal is serving a customer of the bank which maintains data processing unit 16, the selecting unit will select the customer's encoded identification number from memory 18. On the other hand, if the data processing unit determines that the individual being served by the terminal has an account at a different bank, it is necessary for the selecting unit to select an encrypted code corresponding to that bank. These encrypted codes are designated $K_3$, $K_4$, and $K_5$. In the embodiment illustrated in FIG. 3, the security module is used only for decrypting and encrypting functions and does not perform the comparison function which is performed by the security module 20 illustrated in FIG. 1. Security module 20' uses a master key $K_2$ associated with data processing unit 16 to decrypt the terminal key $K_T$ and decrypt the code number using the decrypted terminal key $K_T$ if the code corresponds to a customer of the bank with which data processing unit 16 is associated. If the customer maintains his account at another bank, it is necessary for the security module 20' to decrypt the key corresponding to that other bank and use that decrypted key to re-encrypt the customer's identification code for transmission to the data processing unit of the customer's bank where verification of the correctness of the secret identification code is performed.

Comparison of the stored codes and received encrypted codes in the embodiment of FIG. 3 is made in the data processing unit by comparing the secret code numbers in encrypted form. Thus, when an encrypted code number is received from a terminal, it is supplied to the security module which decrypts the code number using the terminal key, and re-encrypts it using the master key $K_2$. The data processing unit 16 can therefore compare, in an unsecured environment, the code entered at the terminal with the stored code, both of which are encrypted using the master key, $K_2$. If the code is to be transmitted to a different data processing unit for verification, security module 20' decrypts the code using the terminal key and re-encrypts the code using a key corresponding to the other data processing unit ($K_3$, $K_4$, etc.). Both of these keys are supplied to the security module 20' in encrypted form, and the security module uses its own master key, $K_2$, to decrypt these encrypted keys prior to decrypting and re-encrypting of the secret identification code.

The systems of FIG. 3, wherein the security module 20' re-encrypts the secret code entered by the customer in a key which is unknown to the data processing unit 16 except in encrypted form, enables another data processing unit 24 to participate in the system without the use of a security module. When a transaction request originated at a terminal 10, 12, or 14 associated with data processing unit 16 is determined to correspond to an account which is maintained by an institution associated with data processing unit 24, the secret code number entered by the customer at the terminal is re-encrypted by security module 20' and transmitted by communication line 23 along with other transaction message portions, which are unencrypted, to data processing unit 24, which is associated with the bank with which the customer maintains an account. Data processing unit 24 has a record of the customer's secret code number in encrypted form in storage unit 26. If there is no security module associated with data processing unit 24, the secret code number may be stored in storage unit 26 encrypted by the key $K_3$. Thus, the encrypted identification code, which is received by data processing unit 24, can be directly compared to the encrypted identification number maintained in storage unit 26 to determine if the transaction has been requested by an authorized person.

If there is a security module at the receiving data processing unit, the key by which the secret code numnber is encrypted for transmission for example, to data processing unit 28, may be used merely for transmission between data processing units. Data processing unit 28 receives messages over communications line 27 which include an identification code encrypted according to key $K_4$. The identification code itself may be stored in an unsecure storage unit 29 associated with data processing unit 28 encrypted by a different key. Thus, the key by which data processing unit 28 maintains its records is not revealed even in encrypted form to the institution having data processing unit 16 or its associated security module 20', thereby reducing the possibility that the contents of storage unit 29 can be comprised. A security module 30 associated with data processing unit 28 can decrypt the message according to key $K_4$ and re-encrypt it according to another key for comparison with the encrypted identification code stored in storage unit 29. Those skilled in the art will recognize that there may be terminals associated with data processing unit 28, and storage unit 29 may include keys associated with those terminals, (as well as) keys which are associated with different data processing units in the system, as well as the encrypted identification codes associated with the customers of the institution at which data processing unit 28 is located.

Figure 4:
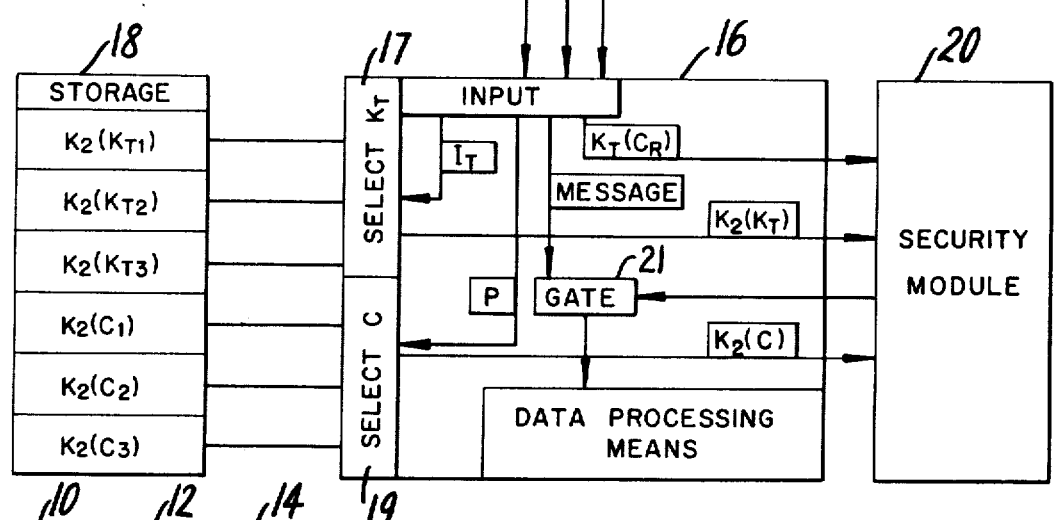
FIG. 4 is a block diagram illustrating an electronic funds transfer system which includes the security apparatus of the invention.
Figure 4:
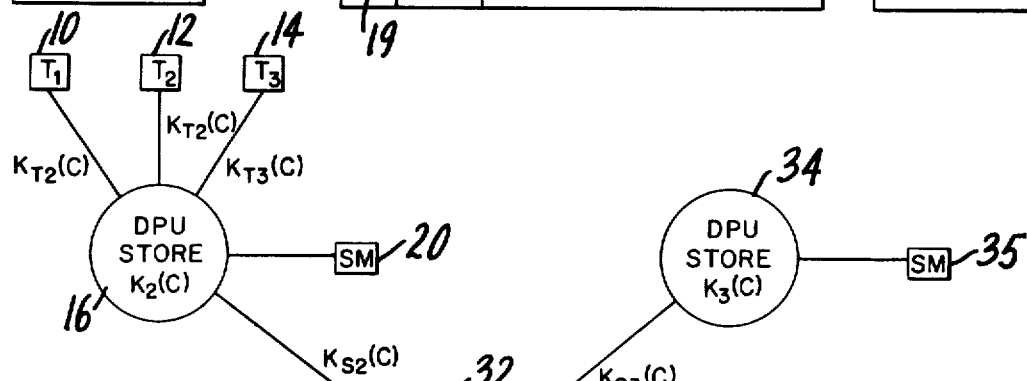
Figure 4:
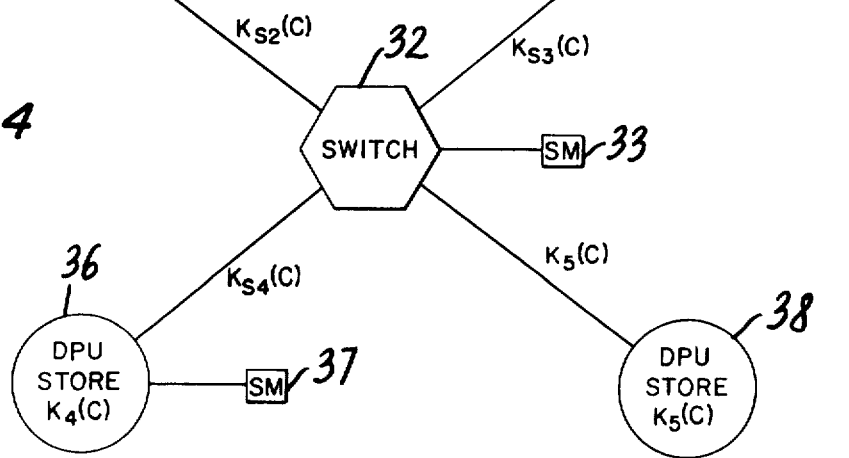

FIG. 4 is a block diagram illustrating a full electronic funds transfer system wherein a plurality of banks or other financial institutions are linked together by a central switching unit 32. Included are data processing units 16, 34, 36, and 38 which may be associated with different banks or financial institutions. Data processing unit 16 includes transaction terminals 10, 12, and 14 which are connected to data processing unit 16 by communication lines. There is also provided a security module 20 associated with data processing unit 16. Transactions originating at one of the terminals 10, 12, or 14 are transmitted to the processing unit with the secret code encrypted according to a key corresponding to the individual terminal. Thus, there are provided keys $K_{T1}$, $K_{T2}$, and $K_{T3}$. When the transaction involves an account which is maintained by a different data processing unit, the encryption of the secret code is changed by security module 20 so that the transaction message is transmitted to switch 32 with an encryption according to a key $K_{s2}$ which is known to the security module 33 associated with switch 32 and the security module 20 associated with central processing unit 16. According to its destination, the secret code is again re-encrypted by security module 33 to another encrypting key for further transmission to the data processing unit at the institution wherein the account is maintained. In the case of data processing unit 34 and 36, transmission is accomplished using an encrypting key known to security module 33 and which can be determined by the corresponding security module 35 or 37 at the data processing unit wherein the account is maintained. Thus, if the transaction involves an account maintained at data processing unit 36, the identification code is transmitted to that data processing unit from switch 32 encrypted according to a key $K_{s4}$. At data processing unit 36, security module 37 re-encrypts the codes according to another key $K_4$ under which the secret code is maintained in storage at data processing unit 36. Likewise, security module 35 at data processing unit 34 will re-encrypt the code using key $K_3$, according to which records are maintained at data processing unit 34.

As indicated in the diagram of FIG. 4, it is possible for some of the data processing units in the system, for example data processing unit 38, to dispense with the requirement for a security module. This is particularly applicable when the data processing unit does not have transaction terminals associated with it, but merely wishes to provide its own customers access to terminals maintained by other data processing units in the system.

In this case, the security module 33 associated with the switch 32 can encrypt the secret code associated with a transaction message in a key $K_5$ under which the secret codes are stored at data processing unit 38. The data processing unit can then compare the encrypted code, as received over the communication line, with the encrypted code as maintained in its own storage, without the need for decrypting, or re-encrypting. This system is less secure than a system using a security module, and may be subject to fraudulent use by personnel with access to the data processing unit.

Appendix I to this application is a print-out of a program suitable for use with the Motorola microprocessor and peripheral equipment listed above. The program is primarily in Motorola M6800 assembly language, but portions of the program are in special language which is defined by the program. Certain portions of the program listing have been deleted to prevent dissemination of security measures not pertinent to the invention. The program contemplates the use of subroutines DESENC and DESDEC to encrypt and decrypt numbers according to the NBS algorithm using the microprocessor rather than the data security module hardware listed above. These subroutines for implementing the NBS algorithm can be generated by a skilled programmer or can be eliminated by the data security module hardware. Appendix II is a list of functions identified by various labels used in the program. These functions are included as an aid to understanding the program itself.

Those familiar with data processing systems will recognize that the security apparatus of the present invention may be used to limit access to data stored in data processing equipment, other than that associated with banking functions. In some cases, such access will be restricted to protect the secrecy of private or commercial information stored in a data processing unit, or to prevent unauthorized use or tampering with data processing equipment.

While there have been described what are believed to be the preferred embodiments of the invention, those skilled in the art will recognize that other and further modifications may be made thereto without departing from the spirit of the invention, and it is intended to claim all such embodiments as fall within the true scope of the invention.

APPENDIX I

```
00000                           A7/D06
00010                   OP i    O
00020           ****
00030           *****DATA*****
00040   0000            OPG     0
00050   0000 0001   S0   RMB    1
00060   0001 0001   S1   RMB    1
00070   0002 0001   S2   RMB    1
00080   0003 0001   S3   RMB    1
00090   0004 0001   S4   RMB    1
00100   0005 0001   S5   RMB    1
00110   0006 0001   S6   RMB    1
00120   0007 0001   SS0  RMB    1
00130   0008 0001   SS1  RMB    1
00140   0009 0001   SS2  RMB    1
00150   000A 0001   SS3  RMB    1
00160   000B 0001   SS4  RMB    1
00170   000C 0002   IX1  RMB    2
00180   000E 0002   IX2  RMB    2
00190   0010 0002   IX3  RMB    2
```

```
00200 0012 0002    IX4    RMB   2
00210 0014 0002    ISTO   RMB   2       INTERRUPT TEMP. STORAGE
00220 0016 0002    LASTTB RMB   2       OUT BFR ADDR, LAST TAB OR CP
00230 0018 0001    BFLAG  RMB   1       0:6 BITS/CHAR, 1:8 BITS/CHAR
00240 0019 03DF    FSPT   FDB   STFA    FORMAT AREA SCAN POINTER
00250 001B 03DF    FAEPT  FDB   STFA    FORMAT AREA END POINTER
00260 001D 022A    ISPT   FDB   SIA1    INPUT AREA SCAN POINTER
00270 001F 022A    IENDPT FDB   SIA1    INPUT AREA END POINTER
00280 0021 03DF    OSPT   FDB   STFA    OUTPUT AREA SCAN POINTER
00290 0023 03DF    IOEPT  FDB   STFA    END OF I/O AREA POINTER
00300 0025 0019    MFASPT FDB   FSPT    MSG FORMAT AREA START POINTER
00310 0027 0002    REGSAD RMB   2       STARTING ADDR OF REGISTER BEI
00320 0029 03DF    OFSPT  FDB   STFA    OUTPUT FORMAT SCAN POINTER
00330 002B 0001    MSGTYP RMB   1       TYPE OF CURRENT INPUT MESSG
00340 002C 0001    NHOLD  RMB   1       STORAGE FOR NUMBER
00350 002D 0001    REGID  RMB   1       REGISTER IDENTITY
00360 002E 0004    REGFLG RMB   4       REGISTER FLAGS (1=LOADED)
00370 0032 0001    REGLTH RMB   1       REGISTER LENGTH IN DIGITS
00380 0033 0001    OUTMSG RMB   1       OUTPUT MESSG TYPE
00390 0034 0001    CHARCT RMB   1       CHARACTER COUNT
00400 0035 0001    IPFAIX RMB   1       INDEX INTO INPUT PRINT FIELD
00410 0036 0002    ADDRES RMB   2       STORAGE FOR ADDRESS
00420 0038 0001    STAD1  RMB   1
00430      0002    ASTX   EQU   $02
00440      0004    AEOT   EQU   $04
00450      001B    AESC   EQU   $1B
00460      0003    AETX   EQU   $03
00470      000D    ACR    EQU   $0D
00480 0039 0001    NPRNFG RMB   1       NON-PRINT FG; "-" CTR
00490 003A 0001    D1IP   RMB   1
00500 003B 03DF    D1OP   FDB   STFA
00510 003D 0002    BASE01 RMB   2
00520 003F 0002    BASE02 RMB   2
00530 0041 0006    BASE2L RMB   6
00540 0047 0001    OUTDEV RMB   1
00550 0048 0002    I1EPT  RMB   2
00560 004A 0002    I2EPT  RMB   2
00570 004C 0001    STAD2  RMB   1
00580 004D 03DF    O1EPT  FDB   STFA
00590 004F 0002    O1PTR  RMB   2
00600 0051 0002    O2PTP  RMB   2
00610 0053 0229    O2EPT  FDB   SIA1-1
00620 0055 0001    INDEV  RMB   1
00630 0056 0002    PROCTR RMB   2
00640 0058 0001    A1DC   RMB   1
00650 0059 0001    A2DC   RMB   1
00660 005A 0001    A3DC   RMB   1
00670 005B 0001    A4DC   RMB   1
00680 005C 0001    SAR    RMB   1
00690 005D 0001    SARTWO RMB   1
00700 005E 0008    A4     RMB   8
00710 0066 0008    A3     RMB   8
00720 006E 0008    A2     RMB   8
00730 0076 0008    A1     RMB   8
00740 007E 0008    KEYREG RMB   8
00750 0086 00      RANDOM FCB   0,0,0,0,0,0,0,0
      0087 00
      0088 00
      0089 00
      008A 00
      008B 00
      008C 00
      008D 00
00760 008E 0004    ERRMSG RMB   4
00770      0092    REGAR  EQU   *
00780 0092 0008    REGN0  RMB   8
00790 009A 0008    REGN1  RMB   8
00800 00A2 0008    REGN2  RMB   8
00810 00AA 0008    REGN3  RMB   8
00820 00B2 0005    REGN4  RMB   5
00830      009A    REGN5  EQU   REGN1
00840 00B7 0001    REGN6  RMB   1
```

```
00850 00B8 0001     REGN7   RMB   1
00860 00B9 0003     REGN8   RMB   3
00870 00BC 0001     REGN9   RMB   1
00880 00BD 0003     REGN10  RMB   3
00890 00C0 0001     REGN11  RMB   1
00900 00C1 0001     REGN12  RMB   1
00910 00C2 0003     REGN13  RMB   3
00920 00C5 0001     REGN14  RMB   1
00930 00C6 0004     REGN15  RMB   4
00940 00CA 0001     REGN16  RMB   1
00950 00CB 0001     REGN17  RMB   1
00960 00CC 0009     REGN18  RMB   9
00970 00D5 0009     REGN19  RMB   9
00980 00DE 0009     REGN20  RMB   9
00990 00E7 0009     REGN21  RMB   9
01000 00F0 0009     REGN22  RMB   9
01010 00F9 0008     IXKEY   RMB   8        INTERCHANGE KEY
01020 0101 0010     IFPA2   RMB   16
01030 0111 0008     IFPA1   RMB   8
01040      0119     IFPA1E  EQU   *
01050 0119 0070     RAMFLT  RMB   112
01060      0189     RAMFTE  EQU   *
01070 0189 0049     DESWA   RMB   73       DES WORK AREA
01080               *** I/O DATA ***
01090 01D2 0001     INPST   RMB   1        INPUT STATUS
01100 01D3 0001     ENDPFG  RMB   1        END-ECHO-PRINTING FLAG
01110 01D4 0001     PNCH    RMB   1        PUNCH-ON FLAG
01120 01D5 0002     PRNTPR  RMB   2        POINTER FOR ECHO PRINTING
01130 01D7 0002     SAVEX   RMB   2        HOLD INDEX REG.
01140 01D9 0001     RTNFG   RMB   1        "<" FLAG
01150 01DA 0050     SIA2    RMB   80
01160      022A     SIA1    EQU   *
01170 03DF                  ORG   $3DF
01180 03DF 0001     STFA    RMB   1
01190 03E0 0001     DV21FG  RMB   1        FLAG: DV2 TO DV1
01200 03E1 0001     AUTHFG  RMB   1
01210 03E2 0001     TRACFG  RMB   1
01220 A000                  ORG   $A000
01230               *START OF ROM
01240               ************************************************
01250      FF00     IFS     EQU   $FF00
01260      FF30     OFS     EQU   IFS+48
01270 A000 FF00     ROMIFT  FDB   IFS,IFS,IFS,IFS
      A002 FF00
      A004 FF00
      A006 FF00
01280 A008 FF00             FDB   IFS,IFS+2      4,5
      A00A FF02
01290 A00C A1A5             FDB   ROMI6,ROMI78,ROMI78,ROMI9   6-9
      A00E A1A9
      A010 A1A9
      A012 A1A8
01300 A014 FF04             FDB   IFS+4,IFS+6,IFS+8,IFS+10    10-
      A016 FF06
      A018 FF08
      A01A FF0A
01310 A01C FF0C             FDB   IFS+12,IFS+14,IFS+16,IFS+18  14-
      A01E FF0E
      A020 FF10
      A022 FF12
01320 A024 FF14             FDB   IFS+20,IFS+22,IFS+24,IFS+26  18-
      A026 FF16
      A028 FF18
      A02A FF1A
01330 A02C FF1C             FDB   IFS+28,IFS+30,IFS+32,IFS+34
      A02E FF1E
      A030 FF20
      A032 FF22
01340 A034 FF24             FDB   IFS+36,IFS+38,IFS+40,IFS+42  26-
      A036 FF26
      A038 FF28
      A03A FF2A
01350 A03C FF2C             FDB   IFS+44,IFS+46   30-31
```

```
         A03E FF2E
01360         A040      POMIFE EQU     *
01370 A040 FF30         POMOFT FDB     OFS,OFS+2,OFS+4,OFS+6      0-
      A042 FF32
      A044 FF34
      A046 FF36
01380 A048 FF38                FDB    OFS+8,OFS+10,OFS+12,OFS+14   4-
      A04A FF3A
      A04C FF3C
      A04E FF3E
01390 A050 A1A0                FDB    ROMP8,ROMP9,ROMP10,OFS+16
      A052 A185
      A054 A193
      A056 FF40
01400 A058 FF42                FDB    OFS+18,OFS+20,OFS+22,OFS+24  12-
      A05A FF44
      A05C FF46
      A05E FF48
01410 A060 FF4A                FDB    OFS+26,OFS+28,OFS+30,OFS+32  16-
      A062 FF4C
      A064 FF4E
      A066 FF50
01420 A068 FF52                FDB    OFS+34,OFS+36,OFS+38,OFS+40  20-
      A06A FF54
      A06C FF56
      A06E FF58
01430 A070 FF5A                FDB    OFS+42,OFS+44,OFS+46,OFS+48  24-
      A072 FF5C
      A074 FF5E
      A076 FF60
01440 A078 FF62                FDB    OFS+50,OFS+52,OFS+54,OFS+56  28-
      A07A FF64
      A07C FF66
      A07E FF68
01450 A080 FF6A                FDB    OFS+58,OFS+60,OFS+62   32-34
      A082 FF6C
      A084 FF6E
01460      A086      ROMOFE EQU     *
01470                *** REGISTER LOCATION TABLE ***
01480 A086 0010      RGLOT  FDB    REGN0-REGAR*256+16
01490 A088 0810             FDB    REGN1-REGAR*256+16
01500 A08A 1010             FDB    REGN2-REGAR*256+16
01510 A08C 1810             FDB    REGN3-REGAR*256+16
01520 A08E 200A             FDB    REGN4-REGAR*256+10
01530 A090 080C             FDB    REGN5-REGAR*256+12
01540 A092 2502             FDB    REGN6-REGAR*256+2
01550 A094 2602             FDB    REGN7-REGAR*256+2
01560 A096 2706             FDB    REGN8-REGAR*256+6
01570 A098 2A02             FDB    REGN9-REGAR*256+2
01580 A09A 2B06             FDB    REGN10-REGAR*256+6
01590 A09C 2E02             FDB    REGN11-REGAR*256+2
01600 A09E 2F02             FDB    REGN12-REGAR*256+2
01610 A0A0 3006             FDB    REGN13-REGAR*256+6
01620 A0A2 3302             FDB    REGN14-REGAR*256+2
01630 A0A4 3408             FDB    REGN15-REGAR*256+8
01640 A0A6 3502             FDB    REGN16-REGAR*256+2
01650 A0A8 3902             FDB    REGN17-REGAR*256+2
01660 A0AA 3A90             FDB    REGN18-REGAR*256+16+$80
01670 A0AC 4390             FDB    REGN19-REGAR*256+16+$80
01680 A0AE 4C90             FDB    REGN20-REGAR*256+16+$80
01690 A0B0 5590             FDB    REGN21-REGAR*256+16+$80
01700 A0B2 5E90             FDB    REGN22-REGAR*256+16+$80
01710      A0B4      PGLTE  EQU    *
01720 A0B4 0080      MASKEY FMB    128
01730 A134 0000      RPSAT  FDB    0
01740 A136 BA06             FDB    LIXKEY  5: LOAD INTERCHANGE KEY
01750 A138 BB62             FDB    AUTSET  6: SET AUTHORIZATION
01760 A13A BB7A             FDB    AUTHCK  7: CHECK AUTH.
01770 A13C BB84             FDB    AUTHDL  8: CLEAR AUTH
01780 A13E BB17             FDB    CUSPIC  9: CUSTOMER-SEL PIC
01790 A140 B873             FDB    PICISS  10: ISSUE NEW PIC, PRNT MAILE
01800 A142 B87E             FDB    PICRIS  11: REISSUE PIC, PRNT MAILER
01810 A144 B8A9             FDB    BEPVER  12: TT1 (BLOCK ENCR PIC), LOC
```

```
01820 A146 B8CD        FDB    BEPINX    13: TT1, INTERCHANGE
01830 A148 B8D5        FDB    BEPIXR    14: TT1, INTERCHANGE RESPONSE
01840 A14A B902        FDB    IBMVER    15: TT2 (IBM ATM), LOCAL MSG.
01850 A14C B913        FDB    IBMINX    16: TT2, INTERCHANGE
01860 A14E B91A        FDB    IBMIXR    17: TT2, INX RESPONSE
01870 A150 B928        FDB    IBMCEN    18: TT2, ENCR. IN IBM COMM KE
01880 A152 B932        FDB    IBMCDE    19: TT2, DECR. IN IBM COMM KE
01890 A154 B93C        FDB    IBMNCC    20: TT2, GEN, ENCR NEW COMM K
01900 A156 B94F        FDB    EPPADL    21: TT3 (ENCR. DEC. PIC PAD),
01910 A158 B964        FDB    EPPADI    22: TT3, INTERCHANGE
01920 A15A B96E        FDB    EPPDIR    23: TT3, INX RESPONSE
01930 A15C B9A0        FDB    CPSFT     24: TT3, CUST PIC SEL
01940 A15E B9C5        FDB    MPSFT     25: TT3, MGR. PIC SEL
01950 A160 B9D9        FDB    IIXMAC    26: INX MSG REC BY ISSUER
01960 A162 BB91        FDB    GENKEY    27: GEN AND ENCR NEW TERM KEY
01970 A164 BBB5        FDB    VACODE    28: VERIFY ACODE
01980 A166 BB87        FDB    DEBUG1    29: BLOCK ENCR PIC IN TK
01990 A168 0000        FDB    0,0,0,0,0
      A16A 0000
      A16C 0000
      A16E 0000
      A170 0000
02000                  *** DEVICE 1 OUTPUT MESSAGES ***
02010 A172 FF2E        FDB    $FF2E,$2E44,$4920
      A174 2E44
      A176 4920
02020 A178 2E54        FDB    $2E54,$4343,$4120
      A17A 4343
      A17C 4120
02030 A17E 4449        FDB    $4449,$4C41,$564E
      A180 4C41
      A182 564E
02040 A184 49          FCB    $49
02050 A185 11   ROMP9  FCB    $11       INVALID ACCT. ID
02060 A186 FF2E        FDB    $FF2E,$2E44,$455A
      A188 2E44
      A18A 455A
02070 A18C 4952        FDB    $4952,$4F48,$5455
      A18E 4F48
      A190 5455
02080 A192 41          FCB    $41
02090 A193 0A   ROMP10 FCB    $0A       AUTHORIZED
02100 A194 FF2E        FDB    $FF2E,$2E2E,$4854
      A196 2E2E
      A198 4854
02110 A19A 5541        FDB    $5541,$2054,$4F4E
      A19C 2054
      A19E 4F4E
02120 A1A0 09    ROMP8 FCB    $09       NOT AUTH.
02130                  *** DEVICE 1 INPUT MESSAGES ***
02140 A1A1 FFC2        FDB    $FFC2,$40C1
      A1A3 40C1
02150 A1A5 40    ROMI6 FCB    $40       S1R1S1R2E AUTHSET
02160 A1A6 FFC5        FDB    $FFC5
02170 A1A8 B2    ROMI9 FCB    $B2       M18R5E CUSPIC
02180 A1A9 FF    ROMI78 FCB   $FF       E
02190                  OPT    L
02200 A1AA 03FF  STACKL FDB   $3FF
02210 A1AC 39    INXIO  RTS
02220                  ****************************************
02230 A1AD 0014        RMB    20
02250                  * INPUT/OUTPUT
02260 A1C1 86 03 BEGIN LDA A  #3
02270 A1C3 B7 8408     STA A  MTTYSO
02280 A1C6 7F 01D3     CLR    ENDPFG
02290 A1C9 7F 01D2     CLR    INPST
02300 A1CC 7F 0055     CLR    INDEV
02310 A1CF 7F 008E     CLR    ERPMSG
02320 A1D2 BE A1AA     LDS    STACKL
02330 A1D5 86 89       LDA A  #$89
02340 A1D7 0E          CLI
02350 A1D8 B7 8408     STA A  MTTYSO
02360 A1DB BD A449 NIPSO JSR  PANDI1
```

```
02370 A1DE C6 A2    NILOOP  LDA B   #NIPJT/256   JMP TO APPRO. CODE
02380 A1E0 D7 0C            STA B   IX1
02390 A1E2 F6 01D2           LDA B   INPST
02400 A1E5 C1 0B             CMP B   #11
02410 A1E7 23 03             BLS     *+5
02420 A1E9 7E A1E9           JMP     *
02430 A1EC 58                ASL B
02440 A1ED D7 0D             STA B   IX1+1
02450 A1EF DE 0C             LDX     IX1
02460 A1F1 EE D6             LDX     NIPJT*256/256,X
02470 A1F3 6E 00             JMP     X
02480                * ISTATUS 1: ESC FOUND, DEVICE 1
02490 A1F5 BD A416  NIPS1   JSR     PNCHOF
02500 A1F8 CE 022A          LDX     #SIA1
02510 A1FB 7D 01D9          TST     RTNFG
02520 A1FE 27 05            BEQ     NIPS1F
02530 A200 08               INX
02540 A201 08               INX
02550 A202 7F 01D9          CLR     RTNFG
02560 A205 FF 01D5  NIPS1F  STX     PRNTPR       PRINT POINTER
02570 A208 7F 0039  NIPS1E  CLR     NPRNFG
02580 A20B 7D 01D3  NIPS1A  TST     ENDPFG       END PRINT FLAG
02590 A20E 27 08            BEQ     NIPS1B
02600 A210 BD A2AC  NIPS1D  JSR     PCRLF
02610 A213 7F 01D3          CLR     ENDFFG
02620 A216 20 C6             BRA     NILOOP
02630 A218 BD A449  NIPS1B  JSR     RANDI1
02640 A21B FE 01D5          LDX     PRNTPR
02650 A21E 9C 48             CPX     I1EPT
02660 A220 27 E9             BEQ     NIPS1A
02670 A222 7D 01D3           TST     ENDPFG
02680 A225 26 E9             BNE     NIPS1D
02690 A227 A6 00             LDA A   X
02700 A229 08                INX
02710 A22A FF 01D5           STX     PRNTPR
02720 A22D 7D 0039           TST     NPRNFG
02730 A230 26 03             BNE     *+5          (DO NOT ECHO)
02740 A232 BD A285           JSR     OUTCH
02750 A235 81 5E             CMP A   #'^          CK FOR NO PRINT
02760 A237 26 03             BNE     NIPS1C
02770 A239 7C 0039           INC     NPRNFG
02780 A23C 81 0D    NIPS1C  CMP A   #ACR         CK FOR CR
02790 A23E 26 CB             BNE     NIPS1A
02800 A240 DF 1F             STX     IENDPT
02810 A242 CE 022A           LDX     #SIA1
02820 A245 DF 1D             STX     ISPT
02830 A247 86 01             LDA A   #1
02840 A249 97 55             STA A   INDEV
02850 A24B 7E A8E0           JMP     NEWMSG       IN1
02860                * ISTATUS 2: CR FROM DEVICE 1: PROCESS NORMALLY
02870       A1F5    NIPS2   EQU     NIPS1
02880                * ISTATUS 3: DEVICE 1 OVERFLOW  NIPS3 = EXIT
02890                * ISTATUS 4: STX FOUND, DEVICE 2
02900 A24E 7D 01D4  NIPS4   TST     PNCH         TURN PUNCH OFF:
02910 A251 27 03            BEQ     *+5
02920 A253 BD A416          JSR     PNCHOF
02930 A256 86 10            LDA A   #$10         START BLOCK FORWARD
02940 A258 BD A2B8          JSR     OCHAR
02950 A25B 86 37            LDA A   #'7
02960 A25D BD A2B8          JSR     OCHAR
02970 A260 BD A449  NIPS4A  JSR     RANDI1
02980 A263 B6 01D2          LDA A   INPST        CK INPUT STATUS
02990 A266 81 04            CMP A   #4
03000 A268 27 F6            BEQ     NIPS4A
03010 A26A 7E A1DE          JMP     NILOOP
03020                * ISTATUS 5: DEV. 2 AND ETX FOUND
03030       A1DB    NIPS5   EQU     NIPS0        WAIT FOR CR
03040                * ISTATUS 7: DEV. 2 AND EOT FOUND
03050       A1DB    NIPS7   EQU     NIPS0        WAIT FOR CR
03060                * ISTATUS 8: DEV.2, EOT, CR FOUND
03070       A26D    NIPS8   EQU     *
03080                * ISTATUS 6: DEV. 2, ETX, CR FOUND
03090 A26D DE 4A    NIPS6   LDX     I2EPT
```

```
03100 A26F DF 1F            STX     IENDPT
03110 A271 CE 01DA           LDX     #SIA2
03120 A274 DF 1D            STX     ISPT
03130 A276 86 02            LDA A   #2
03140 A278 97 55            STA A   INDEV
03150 A27A 7E A8E0           JMP     NEWMSG
03160           * ISTATUS 9: DEV 2 ERROR: WAIT FOR CR:
03170      A1DB    NIPS9    EQU     NIPS0
03180           * ISTATUS 10: DEV 2 OVF FOL BY CR: NIPS10 = EXIT
03190           * ISTATUS 11: DEV 2 & CR WO ETX OR EOT
03200 A27D 86 04   NIPS11   LDA A   #4
03210 A27F B7 01D2           STA A   INPST
03220 A282 7E A24E           JMP     NIPS4
03230           * PRINT CHAR: 3 NULLS AFTER EACH EXC. CR
03240           *             23 NULLS AFTER CR, LF BEFORE
03250 A285 36     OUTCH    PSH A
03260 A286 7D 01D4           TST     PNCH
03270 A289 27 03            BEQ     *+5
03280 A28B BD A416           JSR     PNCHOF
03290 A28E 32              PUL A
03300 A28F 81 0D            CMP A   #ACR
03310 A291 27 19            BEQ     PCRLF
03320 A293 F6 8408 OUTCH1   LDA B   MTTYSO
03330 A296 C5 02            BIT B   #2
03340 A298 27 F9            BEQ     OUTCH1
03350 A29A B7 8409           STA A   MTTYDO   OUTPUT CHAR.
03360 A29D C6 03            LDA B   #3
03370 A29F 36      NULLS    PSH A
03380 A2A0 86 00            LDA A   #0        NULL
03390 A2A2 37              PSH B
03400 A2A3 BD A2B8           JSR     OCHAR
03410 A2A6 33              PUL B
03420 A2A7 32              PUL A
03430 A2A8 5A              DEC B
03440 A2A9 26 F4            BNE     NULLS
03450 A2AB 39              RTS
03460      A285     CO      EQU     OUTCH
03470           * OUTPUT LF, CR TO PRINTER
03480 A2AC 86 0A   PCRLF    LDA A   #$A       LF
03490 A2AE 8D E3            BSR     OUTCH1
03500 A2B0 86 0D            LDA A   #ACR
03510 A2B2 8D DF            BSR     OUTCH1
03520 A2B4 C6 14            LDA B   #20       ADDL NULLS REQUIRED
03530 A2B6 20 E7            BRA     NULLS
03540           *OUTPUT 1 CHAR, LF BEFORE CR, 4 NULLS AFTER CR:
03550 A2B8 81 0D   OCHAR    CMP A   #ACR
03560 A2BA 27 0B            BEQ     PNCHLC
03570 A2BC F6 8408 OCHAR1   LDA B   MTTYSO
03580 A2BF C5 02            BIT B   #2
03590 A2C1 27 F9            BEQ     OCHAR1
03600 A2C3 B7 8409           STA A   MTTYDO
03610 A2C6 39              RTS
03620 A2C7 86 0A   PNCHLC   LDA A   #$A       LF
03630 A2C9 BD A2BC           JSR     OCHAR1
03640 A2CC 86 0D            LDA A   #ACR
03650 A2CE BD A2BC           JSR     OCHAR1
03660 A2D1 C6 04            LDA B   #4
03670 A2D3 7E A29F           JMP     NULLS
03680           * NORMAL INPUT PROCESSING JUMP TABLE:
03690 A2D6 A1DB   NIPJT    FDB     NIPS0
03700 A2D8 A1F5            FDB     NIPS1
03710 A2DA A1F5            FDB     NIPS2
03720 A2DC A2F2            FDB     EXITP
03730 A2DE A24E            FDB     NIPS4
03740 A2E0 A1DB            FDB     NIPS5
03750 A2E2 A26D            FDB     NIPS6
03760 A2E4 A1DB            FDB     NIPS7
03770 A2E6 A26D            FDB     NIPS8
03780 A2E8 A1DB            FDB     NIPS9
03790 A2EA A2F2            FDB     EXITP     NIPS10
03800 A2EC A27D            FDB     NIPS11
03810 A2EE 0000            FDB     0,0
     A2F0 0000
```

```
03820 A2F2 96 8E    EXITP   LDA A   ERRMSG
03830 A2F4 27 48            BEQ     IO10B       ERROR MSG:
03840 A2F6 D6 55            LDA B   INDEV
03850 A2F8 C1 01            CMP B   #1
 860 A2FA 26 16            BNE     IO10A       DEV 1:
 870 A2FC DE 1B    IO9A    LDX     FAEPT
 880 A2FE A7 00            STA A   X
 890 A300 96 8F            LDA A   ERRMSG+1
 900 A302 09               DEX
 910 A303 A7 00            STA A   X
 920 A305 09               DEX
 930 A306 86 0D            LDA A   #ACR
 940 A308 A7 00            STA A   X
 950 A30A 09               DEX
 960 A30B DF 4D            STX     O1EPT
 970 A30D BD A398           JSR     OUTDV1
 980 A310 20 2C            BRA     IO10B
 990 A312 C1 02    IO10A   CMP B   #2
04000 A314 27 03            BEQ     *+5
04010 A316 7E 31C1           JMP     BEGIN       DEVICE 2:
04020 A319 B7 0229  IO10C   STA A   SIA1-1
04030 A31C 96 8F            LDA A   ERRMSG+1
04040 A31E B7 0228           STA A   SIA1-2
04050 A321 86 0D            LDA A   #ACR
04060 A323 B7 0227           STA A   SIA1-3
04070 A326 CE 0226           LDX     #SIA1-4
04080 A329 DF 53            STX     O2EPT
04090 A32B BD A3C5           JSR     OUTDV2
04100                * SET O1EPT OR O2EPT
04110 A32E 96 47            LDA A   OUTDEV
04120 A330 81 02            CMP A   #2
04130 A332 27 06            BEQ     SET1A
04140 A334 96 23            LDA A   IOEPT
04150 A336 97 4D            STA A   O1EPT
04160 A338 20 04            BRA     IO10B
04170 A33A 96 23    SET1A   LDA A   IOEPT
04180 A33C 97 53            STA A   O2EPT
04190                * CHECK STATUS:
04200 A33E B6 01D2  IO10B   LDA A   INPST
04210 A341 7F 008E           CLR     ERRMSG
04220 A344 81 03            CMP A   #3
04230 A346 26 0B            BNE     IO11A       DEV 1 OVF:
04240 A348 86 38            LDA A   #'8         E8= NO. MEM.
04250 A34A 97 8F            STA A   ERRMSG+1
04260 A34C 86 45            LDA A   #'E
04270 A34E 7F 01D2           CLR     INPST
04280 A351 20 A9            BRA     IO9A
04290 A353 81 09    IO11A   CMP A   #9          DEV 2 OVERFLOW
04300 A355 26 0B            BNE     IO12A
04310 A357 86 38            LDA A   #'8
04320 A359 97 8F            STA A   ERRMSG+1
04330 A35B 86 45            LDA A   #'E
04340 A35D 7F 01D2           CLR     INPST
04350 A360 20 B7            BRA     IO10C
04360                * READY FOR NEXT INPUT MESSAGE
04370 A362 B6 01D2  IO12A   LDA A   INPST
04380 A365 81 02            CMP A   #2
04390 A367 26 14            BNE     IO12B       DEV 1 IN PROC:
04400 A369 CE 022C  IO12A1  LDX     #SIA1+2     LEAVE MESSAGE TYPE
04410 A36C DF 48            STX     I1EPT
04420 A36E BE A1AA           LDS     STACKL
04430 A371 7A 01D2           DEC     INPST       NOW = 1
04440 A374 FF 01D5           STX     PRNTPR
04450 A377 BD A416           JSR     PNCHOF
04460 A37A 7E A208           JMP     NIPS1E
04470 A37D 81 06    IO12B   CMP A   #6          CK FOR DEVICE 2
04480 A37F 27 03            BEQ     *+5
04490 A381 7E A1C1           JMP     BEGIN
04500 A384 CE 01DA           LDX     #SIA2
04510 A387 DF 4A            STX     I2EPT
04520 A389 BE A1AA           LDS     STACKL
04530 A38C 86 04            LDA A   #4
04540 A38E B7 01D2           STA A   INPST
```

```
04550 A391 7E A24E          JMP    NIPS4
04560 A394 DE 23    SOUTD1   LDX    IOEPT
04570 A396 DF 4D             STX    O1EPT
04580 A398 DE 1B    OUTDV1   LDX    FAEPT
04590 A39A DF 4F    ID13A    STX    O1PTR
04600 A39C 9C 4D             CPX    O1EPT
04610 A39E 27 40             BEQ    ID14C          RTN
04620 A3A0 A6 00             LDA A  X
04630 A3A2 81 3E             CMP A  #'>
04640 A3A4 26 13             BNE    ID13B
04650                     * OUTPUT LINE OF -------:
04660 A3A6 BD A2AC            JSR    PCRLF
04670 A3A9 86 50             LDA A  #80            NUM CHAR PER LINE
04680 A3AB 97 39             STA A  NPRNFG         (USED AS COUNTER)
04690 A3AD 86 2D    ID13C    LDA A  #'-
04700 A3AF BD A285            JSR    CO
04710 A3B2 7A 0039            DEC    NPRNFG
04720 A3B5 26 F6             BNE    ID13C
04730 A3B7 86 0D             LDA A  #$0D           CR
04740 A3B9 BD A285 ID13B     JSR    CO
04750 A3BC DE 4F    ID13D    LDX    O1PTR
04760 A3BE 09                DEX
04770 A3BF 20 D9             BRA    ID13A
04780 A3C1 DE 23    SOUTD2   LDX    IOEPT
04790 A3C3 DF 53             STX    O2EPT
04800 A3C5 CE 0229  OUTDV2   LDX    #SIA1-1
04810 A3C8 DF 51    ID14A    STX    O2PTR
04820 A3CA 9C 53             CPX    O2EPT
04830 A3CC 27 0A             BEQ    ID14B
04840 A3CE A6 00             LDA A  X
04850 A3D0 BD A3E1            JSR    POC
04860 A3D3 DE 51             LDX    O2PTR
04870 A3D5 09                DEX
04880 A3D6 20 F0             BRA    ID14A
04890 A3D8 01      ID14B     NOP                   (JSR PNCHOF)
04900 A3D9 01                NOP
04910 A3DA 01                NOP
04920 A3DB CE 0229            LDX    #SIA1-1
04930 A3DE DF 53             STX    O2EPT
04940 A3E0 39      ID14C     RTS
04950      8409    MTTYDI    EQU    $8409
04960      8409    MTTYDO    EQU    MTTYDI
04970      8408    MTTYCI    EQU    $8408
04980      8408    MTTYCO    EQU    MTTYCI
04990      A3E1    POC       EQU    *
05000 A3E1 BD A3F7            JSR    PNCHON
05010 A3E4 81 0D             CMP A  #$D
05020 A3E6 26 0C             BNE    POC1
05030 A3E8 FF 01D7            STX    SAVEX
05040 A3EB CE 5DC0            LDX    #$5DC0
05050 A3EE 09      UP        DEX
05060 A3EF 26 FD             BNE    UP
05070 A3F1 FE 01D7            LDX    SAVEX
05080 A3F4 7E A2B8 POC1      JMP    OCHAR
05090      A3F7    PNCHON    EQU    *
05100 A3F7 7D 01D4            TST    PNCH
05110 A3FA 26 19             BNE    P20
05120 A3FC 36                PSH A
05130 A3FD 7C 01D4            INC    PNCH
05140 A400 86 10             LDA A  #$10
05150 A402 BD A2B8            JSR    OCHAR
05160 A405 86 30             LDA A  #'0
05170 A407 BD A2B8            JSR    OCHAR
05180 A40A 86 7F             LDA A  #$7F
05190 A40C BD A2B8            JSR    OCHAR
05200 A40F 86 12             LDA A  #$12
05210 A411 BD A2B8            JSR    OCHAR
05220 A414 32                PUL A
05230 A415 39      P20       RTS
05240      A416    PNCHOF    EQU    *
05250 A416 86 14             LDA A  #$14
05260 A418 BD A2B8            JSR    OCHAR
05270 A41B 86 10   PRINTO    LDA A  #$10
```

```
05280 A41D BD A2B8         JSR     OCHAR
05290 A420 86 39            LDA A   #'9
05300 A422 BD A2B8         JSR     OCHAR
05310      A425      PUN325 EQU    *
05320 A425 7F 01D4         CLR     PNCH
05330             * DELAY TO AVOID SYNC PROB. FOR IMMED. FOL. PRINTING
05340 A428 CE 2000         LDX     #$2000
05350 A42B 09       PRINON DEX
05360 A42C 26 FD           BNE     PRINON1
05370 A42E 39              RTS
05380             * START OUTPUT
05390 A42F 96 47    STROUT LDA A   OUTDEV
05400 A431 81 01           CMP A   #1
05410 A433 26 03           BNE     *+5
05420 A435 7E A394         JMP     SOUTD1
05430 A438 81 02           CMP A   #2
05440 A43A 26 03           BNE     *+5
05450 A43C 7E A3C1         JMP     SOUTD2
05460 A43F BD A1C1         JSR     BEGIN
05470 A442 00       NCHAR  FCB     0,$7F,$0A,$11,$12,$13,$14
      A443 7F
      A444 0A
      A445 11
      A446 12
      A447 13
      A448 14
5480       A449      ENCHAR EQU    *
5490              * INCREMENT RANDOM NUMBER
5500  A449 CE 0001  PANDI1 LDX    #1
5510  A44C DF 8C    PANDIN STX    RANDOM+6
5520  A44E CE 008B         LDX    #RANDOM+5
5530  A451 96 8D           LDA A  RANDOM+7
5540  A453 AB 00           ADD A  X
5550  A455 A7 00           STA A  X
5560  A457 09             DEX
5570  A458 96 8C           LDA A  RANDOM+6
5580  A45A A9 00           ADC A  X
5590  A45C A7 00           STA A  X
5600  A45E 4F       RAND01 CLR A
5610  A45F 09              DEX
5620  A460 9C 85           CPX    RANDOM-1
5630  A462 27 06           BEQ    RAND02    RTN
5640  A464 A9 00           ADC A  X
5650  A466 A7 00           STA A  X
5660  A468 25 F4           BCS    RAND01
5670  A46A 39       RAND02 RTS
5680              **************************************
05690             *********** PROCESS IRQ ***********
05700             **************************************
05710 A46B B6 8408  PROIRQ LDA A   MTTYSI
05720 A46E 47              ASR A
05730 A46F 25 01           BCS     CHARFN
05740 A471 3B              RTI             NO CHAR., EXIT
05750             * CHARACTER FOUND **
05760 A472 B6 8409  CHARFN LDA A   MTTYDI
05770 A475 84 7F           AND A   #$7F
05780 A477 CE A442         LDX     #NCHAR
05790 A47A A1 00    CI2    CMP A   X         CK FOR ILLEGAL CHAR
05800 A47C 27 29           BEQ     IRTN1A
05810 A47E 08              INX
05820 A47F 8C A449         CPX     #ENCHAR
05830 A482 26 F6           BNE     CI2
05840 A484 C6 A5           LDA B   #INTRJT/256  JMP TO APPRO. CODE
05850 A486 D7 14           STA B   ISTO
05860 A488 F6 01D2         LDA B   INPST     F(INPUT STATUS)
05870 A48B C1 0B           CMP B   #11
05880 A48D 23 03           BLS     *+5
05890 A48F 7E A48F         JMP     *
05900 A492 58              ASL B
05910 A493 D7 15           STA B   ISTO+1
05920 A495 DE 14           LDX     ISTO
05930 A497 EE 5D           LDX     INTRJT*256/256,X
05940 A499 6E 00           JMP     X
```

```
05950                       ** STATUS 0: READY FOR NEW DATA **
05960  A49B 81 1B    INPS0   CMP  A    #AESC
05970  A49D 26 09            BNE       INPS0A     ESC FOUND:
05980  A49F 7C 01D2          INC       INPST
05990  A4A2 CE 022A          LDX       #SIA1
06000  A4A5 DF 48            STX       I1EPT
06010  A4A7 3B       IPTN1A  RTI
06020  A4A8 81 02    INPS0A  CMP  A    #ASTX
06030  A4AA 26 FB            BNE       IPTN1A     STX FOUND:
06040  A4AC C6 04    INPS0B  LDA  B    #4
06050  A4AE F7 01D2          STA  B    INPST
06060  A4B1 CE 01DA          LDX       #SIA2
06070  A4B4 DF 4A            STX       I2EPT
06080  A4B6 3B               RTI
06090                       ** STATUS 1: DEVICE 1 DATA BEING ENTERED **
06100  A4B7 81 02    INPS1   CMP  A    #ASTX
06110  A4B9 26 0A            BNE       INPS1A     STX FOUND:
06120  A4BB CE 022A          LDX       #SIA1
06130  A4BE DF 48            STX       I1EPT
06140  A4C0 7C 01D3          INC       ENDPFG
06150  A4C3 20 E7            BRA       INPS0B
06160  A4C5 81 1B    INPS1A  CMP  A    #AESC
06170  A4C7 26 09            BNE       INPS1B     ESC FOUND:
06180  A4C9 CE 022A          LDX       #SIA1
06190  A4CC DF 48    INPS1C  STX       I1EPT
06200  A4CE 7C 01D3          INC       ENDPFG
06210  A4D1 3B       IRETN1  RTI
06220  A4D2 D6 48    INPS1B  LDA  B    I1EPT      CK FOR OVERRUN
06230  A4D4 D1 1B            CMP  B    FAEPT
06240  A4D6 25 08            BCS       INPS1G
06250  A4D8 26 21            BNE       INPS1F
06260  A4DA D6 49            LDA  B    I1EPT+1
06270  A4DC D1 1C            CMP  B    FAEPT+1
06280  A4DE 24 1B            BCC       INPS1F
06290  A4E0 DE 48    INPS1G  LDX       I1EPT      STORE CHAR
06300  A4E2 A7 00            STA  A    X
06310  A4E4 08               INX
06320  A4E5 DF 48            STX       I1EPT
06330  A4E7 81 3C            CMP  A    #'<        "<" = START OVER
06340  A4E9 26 08            BNE       INPS1D
06350  A4EB CE 022C          LDX       #SIA1+2
06360  A4EE 7C 01D9          INC       RTNFG
06370  A4F1 20 D9            BRA       INPS1C
06380  A4F3 81 0D    INPS1D  CMP  A    #ACR
06390  A4F5 26 03            BNE       INPS1E
06400  A4F7 7C 01D2          INC       INPST      SET STATUS = 2 WHEN CR FOUND
06410  A4FA 3B       INPS1E  RTI
06420  A4FB 7C 01D3  INPS1F  INC       ENDPFG     OVERRUN FOUND:
06430  A4FE CE 022A          LDX       #SIA1
06440  A501 DF 48            STX       I1EPT
06450  A503 C6 03            LDA  B    #3
06460  A505 F7 01D2          STA  B    INPST
06470  A508 3B               RTI
06480                       *** STATUS 2: CR FOUND FOR DEVICE 1 ***
06490         A509   INPS2   EQU       *
06500                       *** STATUS 3: OVERRUN FOUND FOR DEVICE 1 ***
06510  A509 3B       INPS3   RTI                  IGNORE CHARACTER
06520                       *** STATUS 4: DEVICE 2 CHARACTER ***
06530  A50A 81 1B    INPS4   CMP  A    #AESC      CHECK FOR ESC
06540  A50C 26 0B            BNE       INPS4C
06550  A50E C6 01            LDA  B    #1
06560  A510 F7 01D2          STA  B    INPST
06570  A513 CE 022A          LDX       #SIA1
06580  A516 DF 48            STX       I1EPT
06590  A518 3B       IRETN2  RTI
06600  A519 81 02    INPS4C  CMP  A    #ASTX
06610  A51B 27 FB            BEQ       IRETN2
06620  A51D D6 4A            LDA  B    I2EPT      CK FOR OVERRUN
06630  A51F D1 1B            CMP  B    FAEPT
06640  A521 25 0E            BCS       INPS4E
06650  A523 26 06            BNE       INPS4D
06660  A525 D6 4B            LDA  B    I2EPT+1
06670  A527 D1 1C            CMP  B    FAEPT+1
```

```
06680 A529 25 06              BCS      INPS4E
06690 A52B C6 09      INPS4D  LDA B    #9
06700 A52D F7 01D2            STA B    INPST
06710 A530 3B                  RTI
06720 A531 DE 4A      INPS4E  LDX      I2EPT     STORE CHARACTER
06730 A533 A7 00              STA A    X
06740 A535 08                  INX
06750 A536 DF 4A              STX      I2EPT
06760 A538 81 03              CMP A    #AETX     CK FOR ETX, EOT
06770 A53A 26 06              BNE      INPS4A
06780 A53C C6 05              LDA B    #5
06790 A53E F7 01D2            STA B    INPST     5 FOR ETX
06800 A541 3B                  RTI
06810 A542 81 04      INPS4A  CMP A    #AEOT
06820 A544 26 06              BNE      INPS4B
06830 A546 C6 07              LDA B    #7
06840 A548 F7 01D2  INPS4G    STA B    INPST
06850 A54B 3B        INPS4F   RTI
06860 A54C 81 0D     INPS4B   CMP A    #ACR      CR = STATUS 11
06870 A54E 26 FB              BNE      INPS4F
06880 A550 C6 0B              LDA B    #11
06890 A552 20 F4              BRA      INPS4G
06900                 *** STATUS 5: DEVICE 2 AND ETX ***
06910      A554      INPS5    EQU      *
06920                 *** STATUS 7: DEVICE 2 AND EOT ***
06930 A554 81 0D     INPS7    CMP A    #ACR      FIND CR
06940 A556 26 03              BNE      INPS7A
06950 A558 7C 01D2            INC      INPST     STATUS TO 6 OR 8
06960 A55B 3B        INPS7A   RTI
06970                 *** STATUS 6: DEVICE 2, ETX, CR ***
06980      A55C      INPS6    EQU      *
06990                 *** STATUS 8: DEVICE 2, EOT, CR ***
07000 A55C 3B        INPS8    RTI                IGNORE CHARACTER
07010                 *** STATUS 9: DEV 2 OVRRUN: WAIT FOR CR ***
07020      A554      INPS9    EQU      INPS7
07030                 *** STATUS 10: DEV 2 OVERRUN & CR ***
07040      A55C      INPS10   EQU      INPS8     IGNORE
07050                 *** STATUS 11: DEV 2 & CR W/O ETX, EOT ***
07060      A55C      INPS11   EQU      INPS8     IGNORE
07070                 ****************************************
07080                 *** INTERRUPT PROCESSING JUMP TABLE ***
07090 A55D A49B      INTPJT   FDB      INPS0
07100 A55F A4B7               FDB      INPS1,INPS2,INPS3,INPS4
      A561 A509
      A563 A509
      A565 A50A
07110 A567 A554               FDB      INPS5,INPS6,INPS7,INPS8,INPS9
      A569 A55C
      A56B A554
      A56D A55C
      A56F A554
07120 A571 A55C               FDB      INPS10,INPS11
      A573 A55C
07130 A575 0014               RMB      20
07150                 *
07160                 *
07170                 * FORMAT ASSEMBLER ********
07180 A589 7F 002C   FANEXT   CLR      NHOLD     FA1A
07190 A58C BD A86D   FA1B     JSR      ADVISP    FA1B
07200 A58F DE 1D              LDX      ISPT
07210 A591 A6 00              LDA A    X
07220 A593 84 7F              AND A    #$7F
07230 A595 81 04              CMP A    #4
07240 A597 22 03              BHI      *+5
07250 A599 7E A7C1            JMP      FAEND
07260 A59C 81 20              CMP A    #$20      FA1B1 (SPACE)
07270 A59E 27 EC              BEQ      FA1B
07280 A5A0 81 0A              CMP A    #$0A
07290 A5A2 27 E8              BEQ      FA1B
07300 A5A4 81 0D              CMP A    #$0D
07310 A5A6 27 E4              BEQ      FA1B
07320 A5A8 81 3F              CMP A    #$3F      FA1C
07330 A5AA 23 62              BLS      FAER1     FAFERR
```

```
07340 A5AC 81 5F              CMP A    #$5F
07350 A5AE 22 5E              BHI      FAFER1    FAFERP
07360 A5B0 84 1F              AND A    #$1F      FA1D
07370 A5B2 48                 ASL A
07380 A5B3 C6 A8              LDA B    #FATBL/$100
07390 A5B5 D7 0C              STA B    IX1
07400 A5B7 97 0D              STA A    IX1+1
07410 A5B9 DE 0C              LDX      IX1
07420 A5BB EE 2D              LDX      FATBL*$100/$100,X
07430 A5BD 6E 00              JMP      X
07440 A5BF BD A7E2  FALRI     JSR      DH1T3     FA2A
07450 A5C2 97 2B              STA A    MSGTYP
07460 A5C4 48                 ASL A              FA2B
07470 A5C5 81 3F              CMP A    #ROMIFE-ROMIFT-1
07480 A5C7 22 45              BHI      FAFER1    FAFERR
07490 A5C9 C6 A0              LDA B    #ROMIFT/$100   FA2C
07500 A5CB D7 0C              STA B    IX1
07510 A5CD 97 0D              STA A    IX1+1
07520 A5CF DE 0C              LDX      IX1
07530 A5D1 E6 00              LDA B    ROMIFT*$100/$100,X
07540 A5D3 C1 FF              CMP B    #$FF
07550 A5D5 26 3A              BNE      FAARD1    FAARDF
07560 A5D7 A6 01              LDA A    ROMIFT+1*$100/$100,X  FA2D
07570 A5D9 97 01              STA A    S1
07580 A5DB C6 01  FA3A        LDA B    #RAMFLT/$100  FA3A
07590 A5DD D7 0C              STA B    IX1
07600 A5DF 97 0D              STA A    IX1+1
07610 A5E1 DE 0C              LDX      IX1
07620 A5E3 A6 19              LDA A    RAMFLT*$100/$100,X
07630 A5E5 26 2A              BNE      FAARD1    FAARDF
07640 A5E7 D6 1B              LDA B    FAEPT     FA3B
07650 A5E9 E7 19              STA B    RAMFLT*$100/$100,X
07660 A5EB D6 1C              LDA B    FAEPT+1
07670 A5ED E7 1A              STA B    RAMFLT+1*$100/$100,X
07680 A5EF 20 98              BRA      FANEXT    FA3C
07690 A5F1 BD A7E2  FALPT     JSR      DH1T3     FA4A,B
07700 A5F4 4A                 DEC A
07710 A5F5 97 01              STA A    S1
07720 A5F7 96 01  FA4C        LDA A    S1        FA4C
07730 A5F9 81 2F              CMP A    #$2F
07740 A5FB 23 17              BLS      FA4E
07750 A5FD DE 1B              LDX      FAEPT     FA4D
07760 A5FF 86 2F              LDA A    #$2F
07770 A601 A7 00              STA A    X
07780 A603 BD A8A2             JSR      ADVFEP
07790 A606 D6 01              LDA B    S1
07800 A608 C0 30              SUB B    #$30
07810 A60A D7 01              STA B    S1
07820 A60C 20 E9              BRA      FA4C
07830 A60E 7E A7CC  FAFEP1    JMP      FAFERR
07840 A611 7E A7D7  FAARD1    JMP      FAARDF
07850 A614 DE 1B   FA4E       LDX      FAEPT     FA4E
07860 A616 96 01              LDA A    S1
07870 A618 A7 00              STA A    X
07880 A61A 20 2A              BRA      FAADNX
07890 A61C BD A7E2  FALRN     JSR      DH1T3     FA5A
07900 A61F 97 2C              STA A    NHOLD
07910 A621 7E A58C             JMP      FA1B      FA5B
07920 A624 DE 1B   FALRV      LDX      FAEPT     FA6A
07930 A626 86 30              LDA A    #$30
07940 A628 A7 00              STA A    X
07950 A62A 96 2C  FA6B        LDA A    NHOLD     FA6B
07960 A62C 26 01              BNE      FA6C1
07970 A62E 4C                 INC A
07980 A62F 4A    FA6C1        DEC A
07990 A630 84 0F              AND A    #$0F
08000 A632 DE 1B              LDX      FAEPT
08010 A634 AA 00              ORA A    X
08020 A636 A7 00              STA A    X
08030 A638 BD A8A2             JSR      ADVFEP    FA6D
08040 A63B BD A86D             JSR      ADVISP    FA6E
08050 A63E DE 1D              LDX      ISPT      FA6F
08060 A640 A6 00              LDA A    X
```

```
08070 A642 DE 1B              LDX    FAEPT
08080 A644 A7 00              STA A  X
08090 A646 BD A8A2 FAADNX JSR        ADVFEP    FA6G
08100 A649 7E A589            JMP    FANEXT    FA6H
08110 A64C 86 40   FALRS  LDA A #$40           FA7A
08120 A64E 97 02             STA A  S2
08130 A650 BD A7E2 FA7B   JSR        DH1T3     FA7B
08140 A653 4A                 DEC A            FA7C
08150 A654 97 01              STA A  S1
08160 A656 86 40   FA7D   LDA A #$40           FA7D
08170 A658 91 01              CMP A  S1
08180 A65A 22 13              BHI    FA7F
08190 A65C C6 3F              LDA B #$3F       FA7E
08200 A65E DB 02              ADD B  S2
08210 A660 DE 1B              LDX    FAEPT
08220 A662 E7 00              STA B  X
08230 A664 BD A8A2            JMP    ADVFEP
08240 A667 D6 01              LDA B  S1
08250 A669 C0 40              SUB B #$40
08260 A66B D7 01              STA B  S1
08270 A66D 20 E7              BRA    FA7D
08280 A66F D6 02   FA7F   LDA B  S2            FA7F
08290 A671 DB 01              ADD B  S1
08300 A673 DE 1B              LDX    FAEPT
08310 A675 E7 00              STA B  X
08320 A677 20 CD              BRA    FAADNX
08330 A679 86 80   FALRD  LDA A #$80           FA8A
08340 A67B DE 1B              LDX    FAEPT
08350 A67D A7 00              STA A  X
08360 A67F 20 A9              BRA    FA6B      FA8B
08370 A681 C6 E0   FALRO  LDA B #$E0           FA8C
08380 A683 D7 02              STA B  S2
08390 A685 20 0C              BRA    FA9B      FA8D
08400 A687 86 FF   FALRE  LDA A #$FF           FA8E
08410 A689 DE 1B              LDX    FAEPT
08420 A68B A7 00              STA A  X
08430 A68D 20 B7              BRA    FAADNX
08440 A68F C6 C0   FALRR  LDA B #$C0           FA9A
08450 A691 D7 02              STA B  S2
08460 A693 BD A7E2 FA9B   JSR        DH1T3     FA9B
08470 A696 97 01              STA A  S1
08480 A698 81 1E              CMP A #$1E       FA9C
08490 A69A 22 6D              BHI    FAFER2    FAFERR
08500 A69C 9B 02              ADD A  S2        FA9D
08510 A69E DE 1B              LDX    FAEPT
08520 A6A0 A7 00              STA A  X
08530 A6A2 20 A2              BRA    FAADNX
08540 A6A4 BD A7E2 FALRL  JSR        DH1T3     FA10A
08550 A6A7 97 01              STA A  S1
08560 A6A9 48                 ASL A            FA10B
08570 A6AA 81 2E              CMP A #RGLTE-RGLOT
08580 A6AC 24 5B              BCC    FAFER2    FAFERR
08590 A6AE C6 A0              LDA B #RGLOT/$100  FA10C
08600 A6B0 D7 0C              STA B  IX1
08610 A6B2 97 0D              STA A  IX1+1
08620 A6B4 DE 0C              LDX    IX1
08630 A6B6 E6 86              LDA B  RGLOT*$100/$100,X
08640 A6B8 D7 02              STA B  S2
08650 A6BA E6 87              LDA B  RGLOT*$100/$100+1,X
08660 A6BC D7 03              STA B  S3
08670 A6BE 2A 49              BPL    FAFER2    FAFERR   FA10D
08680 A6C0 C4 7F              AND B #$7F       FA10E
08690 A6C2 D0 2C              SUB B  NHOLD
08700 A6C4 25 43              BCS    FAFER2    FAFERR
08710 A6C6 86 00              LDA A #REGAR/$100
08720 A6C8 97 0C              STA A  IX1
08730 A6CA 96 02              LDA A  S2
08740 A6CC 97 0D              STA A  IX1+1
08750 A6CE DE 0C              LDX    IX1
08760 A6D0 E7 92              STA B  REGAR*$100/$100,X
08770 A6D2 7E A589            JMP    FANEXT
08780 A6D5 BD A7E2 FALRP  JSR        DH1T3     FA11A
```

```
08790 A6D9 97 2B              STA A   MSGTYP
08800 A6DB 48                 ASL A           FA11B
08810 A6DB 81 46              CMP A   #POMOFE-POMOFT
08820 A6DD 24 2A              BCC     FAFER2  FAFEPP
08830 A6DF C6 A0              LDA B   #POMOFT/$100  FA11C
08840 A6E1 D7 0C              STA B   IX1
08850 A6E3 97 0D              STA A   IX1+1
08860 A6E5 DE 0C              LDX     IX1
08870 A6E7 E6 40              LDA B   POMOFT*$100/$100,X
08880 A6E9 C1 FF              CMP B   #$FF
08890 A6EB 27 03              BEQ     *+5
08900 A6ED 7E A7D7            JMP     FAARDF
08910 A6F0 A6 41              LDA A   POMOFT+1*$100/$100,X  FA11D
08920 A6F2 97 01              STA A   S1
08930 A6F4 7E A5DB            JMP     FA3A    FA11E
08940 A6F7 DE 1B      FALRC   LDX     FAEPT   FA11F
08950 A6F9 86 2E              LDA A   #$2E
08960 A6FB A7 00              STA A   X
08970 A6FD 7E A646            JMP     FAADNX
08980 A700 DE 1B      FALPG   LDX     FAEPT   FA11G
08990 A702 86 2F              LDA A   #$2F
09000 A704 A7 00              STA A   X
09010 A706 7E A646            JMP     FAADNX
09020 A709 7E A7CC  FAFER2    JMP     FAFEPP
09030 A70C 7F 0001  FALROB    CLR     S1      FA12A
09040 A70F DE 1B              LDX     FAEPT
09050 A711 DF 02              STX     S2
09060 A713 BD A8A2            JSR     ADVFEP
09070 A716 BD A86D  FA12B     JSR     ADVISP  FA12B
09080 A719 DE 1D              LDX     ISPT    FA12C
09090 A71B A6 00              LDA A   X
09100 A71D 81 5D              CMP A   #$5D
09110 A71F 27 0C              BEQ     FA12D1
09120 A721 7C 0001            INC     S1
09130 A724 DE 1B              LDX     FAEPT
09140 A726 A7 00              STA A   X
09150 A728 BD A8A2            JSR     ADVFEP
09160 A72B 20 E9              BRA     FA12B
09170 A72D 96 01    FA12D1    LDA A   S1      FA12D
09180 A72F 81 2C              CMP A   #$2C
09190 A731 23 11              BLS     FA13A1
09200 A733 DE 1D              LDX     ISPT
09210                    *
09220 A735 A6 00              LDA A   X
09230 A737 DE 1B              LDX     FAEPT
09240 A739 A7 00              STA A   X
09250 A73B DE 02              LDX     S2
09260 A73D C6 2D              LDA B   #$2D
09270 A73F E7 00              STA B   X
09280 A741 7E A646            JMP     FAADNX
09290 A744 DE 02    FA13A1    LDX     S2      FA13A
09300 A746 96 01              LDA A   S1
09310 A748 A7 00              STA A   X
09320 A74A 7E A529            JMP     FANEXT
09330 A74D BD A7E2  FALPF     JSR     DHIT3   FA13B
09340 A750 97 01              STA A   S1
09350 A752 81 10              CMP A   #$10
09360 A754 22 76              BHI     FAFEPP
09370 A756 96 01              LDA A   S1      FA13C
09380 A758 8B 2F              ADD A   #$2F
09390 A75A DE 1B              LDX     FAEPT
09400 A75C A7 00              STA A   X
09410 A75E 7E A646            JMP     FAADNX
09420 A761 86 80    FALPA     LDA A   #$80    FA13D
09430 A763 97 02              STA A   S2
09440 A765 7E A650            JMP     FA7B
09450 A768 86 FF    FALRK     LDA A   #$FF    FA14A
09460 A76A 97 0E              STA A   IX2
09470 A76C 97 0F              STA A   IX2+1
09480 A76E CE 0117            LDX     #RAMFLT-2
09490 A771 08       FA14A1    INX             FA14A1  NEW TEST
09500 A772 08                 INX
09510 A773 8C 0189            CPX     #RAMFTE
```

```
09520 A776 27 22           BEQ    FA14A5
09530 A778 A6 00           LDA A  X
09540 A77A 26 04            BNE    FA14A2
09550 A77C E6 01           LDA B  1,X
09560 A77E 27 F1           BEQ    FA14A1
09570 A780 91 0E  FA14A2  CMP A  IX2        FA14A2  NOT ZERO
09580 A782 27 04           BEQ    FA14A3
09590 A784 22 EB           BHI    FA14A1
09600 A786 20 06           BRA    FA14A4
09610 A788 A6 01  FA14A3  LDA A  1,X
09620 A78A 91 0F           CMP A  IX2+1
09630 A78C 24 E3           BCC    FA14A1
09640 A78E E6 00  FA14A4  LDA B  X
09650 A790 D7 0E           STA B  IX2
09660 A792 A6 01           LDA A  1,X
09670 A794 97 0F           STA A  IX2+1
09680 A796 DF 0C           STX    IX1
09690 A798 20 D7           BRA    FA14A1
09700 A79A DE 0E  FA14A5  LDX    IX2
09710 A79C 8C FFFF         CPX    #$FFFF
09720 A79F 27 0B           BEQ    FA14A6
09730 A7A1 DF 1B           STX    FAEPT
09740 A7A3 DE 0C           LDX    IX1
09750 A7A5 6F 00           CLR    X
09760 A7A7 6F 01           CLR    1,X
09770 A7A9 7E A589         JMP    FANEXT      FA14B
09780 A7AC CE 03DF FA14A6  LDX    #STFA
09790 A7AF DF 1B           STX    FAEPT
09800 A7B1 7E A589         JMP    FANEXT      FA14B
09810 A7B4 7F 0018 FALRB  CLR    BFLAG       FA14C
09820 A7B7 7E A589         JMP    FANEXT
09830 A7BA 86 FF  FALRH   LDA A  #$FF        FA14D
09840 A7BC 97 18           STA A  BFLAG
09850 A7BE 7E A589         JMP    FANEXT
09860 A7C1 86 43  FAEND   LDA A  #'C
09870 A7C3 97 8E           STA A  ERRMSG
09880 A7C5 86 31           LDA A  #'1
09890 A7C7 97 8F           STA A  ERRMSG+1
09900 A7C9 7E A2F2         JMP    EXITP
09910 A7CC 86 45  FAFEPR  LDA A  #'E         FA15C
09920 A7CE 97 8E           STA A  ERRMSG
09930 A7D0 86 31           LDA A  #'1
09940 A7D2 97 8F           STA A  ERRMSG+1
09950 A7D4 7E A2F2         JMP    EXITP       FA15D
09960 A7D7 86 45  FAARDF  LDA A  #'E         FA15E,F
09970 A7D9 97 8E           STA A  ERRMSG
09980 A7DB 86 32           LDA A  #'2
09990 A7DD 97 8F           STA A  ERRMSG+1
10000 A7DF 7E A2F2         JMP    EXITP
10010 A7E2 BD A86D DH1T3  JSR    ADVISP      FA16A
10020 A7E5 DE 1D           LDX    ISPT
10030 A7E7 A6 00           LDA A  X
10040 A7E9 84 0F           AND A  #$0F
10050 A7EB 97 08           STA A  SS1
10060 A7ED 7F 0009         CLR    SS2
10070 A7F0 7F 000A         CLR    SS3
10080 A7F3 A6 01  FA16B   LDA A  1,X         FA16B
10090 A7F5 81 30           CMP A  #'0
10100 A7F7 25 18           BCS    FA16F
10110 A7F9 81 39           CMP A  #'9
10120 A7FB 22 14           BHI    FA16F
10130 A7FD 8D 6E           BSR    ADVISP      FA16C
10140 A7FF 96 09           LDA A  SS2
10150 A801 97 0A           STA A  SS3
10160 A803 96 08           LDA A  SS1
10170 A805 97 09           STA A  SS2
10180 A807 DE 1D           LDX    ISPT
10190 A809 E6 00           LDA B  X
10200 A80B C4 0F           AND B  #$0F
10210 A80D D7 08           STA B  SS1
10220 A80F 20 E2           BRA    FA16B       FA16D,E
10230 A811 96 09  FA16F   LDA A  SS2         FA16F
10240 A813 48            ASL A
```

```
10250 A814 16            TAB
10260 A815 58            ASL  B
10270 A816 58            ASL  B
10280 A817 1B            ABA
10290 A818 9B 08         ADD  A  SS1
10300 A81A D6 0A         LDA  B  SS3
10310 A81C 58            ASL  B
10320 A81D 58            ASL  B
10330 A81E 1B            ABA
10340 A81F 58            ASL  B
10350 A820 58            ASL  B
10360 A821 58            ASL  B
10370 A822 1B            ABA
10380 A823 58            ASL  B
10390 A824 1B            ABA
10400 A825 39            RTS              FA16G
10410                *
10420                *
10430                *
10440 A826 86 A0   FALPM LDA  A  #$A0      FA17A
10450 A828 97 02         STA  A  S2
10460 A82A 7E A69B        JMP     FA9B     FA17B
10470 A82D A7CC   FATBL  FDB     FAFERR   @
10480 A82F A761          FDB     FALFA    A
10490 A831 A7B4          FDB     FALRB    B
10500 A833 A6F7          FDB     FALRC    C
10510 A835 A679          FDB     FALRD    D
10520 A837 A687          FDB     FALRE    E
10530 A839 A74D          FDB     FALRF    F
10540 A83B A700          FDB     FALRG    G
10550 A83D A7BA          FDB     FALRH    H
10560 A83F A5BF          FDB     FALRI    I
10570 A841 A7CC          FDB     FAFERR   J
10580 A843 A768          FDB     FALRK    K
10590 A845 A6A4          FDB     FALRL    L
10600 A847 A826          FDB     FALRM    M
10610 A849 A61C          FDB     FALRN    N
10620 A84B A7CC          FDB     FAFERR   O
10630 A84D A6D5          FDB     FALRP    P
10640 A84F A681          FDB     FALRQ    Q
10650 A851 A68F          FDB     FALRR    R
10660 A853 A64C          FDB     FALRS    S
10670 A855 A5F1          FDB     FALRT    T
10680 A857 A7CC          FDB     FAFERR   U
10690 A859 A624          FDB     FALRV    V
10700 A85B A7CC          FDB     FAFERR   W
10710 A85D A7CC          FDB     FAFERR   X
10720 A85F A7CC          FDB     FAFERR   Y
10730 A861 A7CC          FDB     FAFERR   Z
10740 A863 A70C          FDB     FALROB   [
10750 A865 A7CC          FDB     FAFERR   /
10760 A867 A7CC          FDB     FAFERR   ]
10770 A869 A7CC          FDB     FAFERR   ^
10780 A86B A7CC          FDB     FAFERR   -
10790                * SUBROUTINE ADVISP
10800 A86D DE 1D   ADVISP LDX    ISPT
10810 A86F 08             INX
10820 A870 DF 1D          STX    ISPT     SR1A
10830 A872 96 1D          LDA A  ISPT     SR1B
10840 A874 91 1F          CMP A  IENDPT
10850 A876 27 03          BEQ    RS1B
10860 A878 22 1D          BHI    WAIT
10870 A87A 39             RTS
10880 A87B 96 1E   RS1B   LDA A  ISPT+1
10890 A87D 91 20          CMP A  IENDPT+1
10900 A87F 24 16          BCC    WAIT
10910 A881 39             RTS              SR1C
10920                * SUBROUTINE ADVFSP
10930 A882 DE 19   ADVFSP LDX    FSPT     SP3A
10940 A884 09             DEX
10950 A885 DF 19          STX    FSPT
10960 A887 96 19          LDA A  FSPT     SP3B
```

```
10970 A889 91 1B          CMP A   FAEPT
10980 A88B 27 03          BEQ     SP3B1
10990 A88D 25 08          BCS     SR3B2
11000 A88F 39             RTS
11010 A890 96 1A  SR3B1   LDA A   FSPT+1
11020 A892 91 1C          CMP A   FAEPT+1
11030 A894 23 01          BLS     SR3B2
11040 A896 39             RTS
11050 A897 86 45  SR3B2   LDA A   #'E
11060 A899 97 8E          STA A   ERRMSG
11070 A89B 86 37          LDA A   #'7
11080 A89D 97 8F          STA A   ERRMSG+1
11090 A89F 7E A2F2        JMP     EXITP
11100             * SUBROUTINE ADVFEP
11110 A8A2 DE 1B  ADVFEP  LDX     FAEPT    SR4A
11120 A8A4 09             DEX
11130 A8A5 DF 1B          STX     FAEPT
11140 A8A7 96 1B          LDA A   FAEPT    SR4B
11150 A8A9 91 1F          CMP A   IENDPT
11160 A8AB 27 03          BEQ     SR4A1
11170 A8AD 23 08          BLS     SR4B1
11180 A8AF 39             RTS
11190 A8B0 96 1C  SR4A1   LDA A   FAEPT+1
11200 A8B2 91 20          CMP A   IENDPT+1
11210 A8B4 23 01          BLS     SR4B1
11220 A8B6 39             RTS              (SR4C)
11230 A8B7 86 45  SR4B1   LDA A   #'E
11240 A8B9 97 8E          STA A   ERRMSG
11250 A8BB 86 38          LDA A   #'8
11260 A8BD 97 8F          STA A   ERRMSG+1
11270 A8BF 7E A2F2        JMP     EXITP
11280       A897   WAIT   EQU     SR3B2
11290 A8C2 001E          RMB     30
11310             * PROGRAM IN
11320 A8E0 DE 1D  NEWMSG  LDX     ICPT     IN1A
11330 A8E2 A6 00          LDA A   X
11340 A8E4 84 0F          AND A   #$0F
11350 A8E6 97 01          STA A   S1
11360 A8E8 BD A86D        JSR     ADVISP   IN1B
11370 A8EB DE 1D          LDX     ISPT     IN1C
11380 A8ED E6 00          LDA B   X
11390 A8EF C4 0F          AND B   #$0F
11400 A8F1 D7 02          STA B   S2
11410 A8F3 96 01          LDA A   S1
11420 A8F5 48             ASL A
11430 A8F6 16             TAB
11440 A8F7 48             ASL A
11450 A8F8 48             ASL A
11460 A8F9 1B             ABA
11470 A8FA 9B 02          ADD A   S2
11480 A8FC 97 2B          STA A   MSGTYP
11490 A8FE 48             ASL A            (ACCA=MSGTYP)
11500 A8FF 81 40          CMP A   #ROMIFE-ROMIFT
11510 A901 24 2A          BCC     ININV1   (ININVM)
11520 A903 D6 2B  NMSGSC  LDA B   MSGTYP   IN1D
11530 A905 C1 04          CMP B   #04
11540 A907 24 27          BCC     IN1D1
11550 A909 5D             TST B
11560 A90A 26 03          BNE     *+5
11570 A90C 7E A589        JMP     FANEXT   MSG 00
11580 A90F 5A             DEC B
11590 A910 26 06          BNE     IN1D2    MSG 01:
11600 A912 7C 03E0        INC     DV2IFG   SET FG
11610 A915 7E A7C1        JMP     FAEND
11620 A918 5A     IN1D2   DEC B
11630 A919 26 09          BNE     IN1D3    MSG 02:
11640 A91B 7F 03E0        CLR     DV2IFG
11650 A91E 7F 03E2        CLR     TRACFG
11660 A921 7E A7C1        JMP     FAEND
11670 A924 7E AFDB IN1D3  JMP     INITST
11680 A927 7C 03E2        INC     TRACFG
11690 A92A 7E A7C1        JMP     FAEND
11700 A92D 7E A89A ININV1 JMP     ININVM
```

```
11710 A930 58           IN1D1   ASL  B                    (ACCB=MSGTYP)  IN2A
11720 A931 86 A0                LDA  A    #ROMIFT/$100
11730 A933 97 0C                STA  A    IX1
11740 A935 D7 0D                STA  B    IX1+1
11750 A937 DE 0C                LDX       IX1
11760 A939 A6 00                LDA  A    ROMIFT*$100/$100,X
11770 A93B 81 FF                CMP  A    #$FF
11780 A93D 27 08                BEQ       IN2B1
11790 A93F 97 25                STA  A    MFASPT
11800 A941 A6 01                LDA  A    ROMIFT*$100/$100+1,X
11810 A943 97 26                STA  A    MFASPT+1
11820 A945 20 14                BRA       IN2D
11830 A947 A6 01    IN2B1       LDA  A    ROMIFT*$100/$100+1,X  IN2B
11840 A949 97 01                STA  A    S1
11850 A94B 86 01                LDA  A    #PAMFLT/$100    IN2C
11860 A94D D6 01                LDA  B    S1
11870 A94F 97 0C                STA  A    IX1
11880 A951 D7 0D                STA  B    IX1+1
11890 A953 DE 0C                LDX       IX1
11900 A955 EE 19                LDX       PAMFLT*$100/$100,X
11910 A957 DF 25                STX       MFASPT
11920 A959 27 20                BEQ       INUND1   (INUNDF)
11930 A95B DE 25    IN2D        LDX       MFASPT   IN2D
11940 A95D 08                   INX
11950 A95E DF 19                STX       FSPT
11960 A960 7F 0035              CLR       IPFAIX   IN2E
11970 A963 BD A882  INFLDF      JSR       ADVFSP
11980 A966 DE 19                LDX       FSPT     IN3A
11990 A968 A6 00                LDA  A    X
12000 A96A 84 F0                AND  A    #$F0
12010 A96C 44                   LSR  A
12020 A96D 44                   LSR  A
12030 A96E 44                   LSR  A
12040 A96F C6 AC                LDA  B    #INFTBL/$100
12050 A971 D7 0C                STA  B    IX1
12060 A973 97 0D                STA  A    IX1+1    (ACCA=MSD!FSPT)
12070 A975 DE 0C                LDX       IX1
12080 A977 EE 3A                LDX       INFTBL*$100/$100,X
12090 A979 6E 00                JMP       X
12100 A97B 7E ABA5  INUND1      JMP       INUNDF
12110 A97E 7F 0001  INFOR4      CLR       S1       IN3B
12120 A981 BD A986  IN3C        JSR       IN3SR    IN3C
12130 A984 20 DD                BRA       INFLDF   IN3D
12140 A986 DE 19    IN3SR       LDX       FSPT     IN3E
12150 A988 A6 00                LDA  A    X
12160 A98A 84 0F                AND  A    #$0F
12170 A98C 9B 01                ADD  A    S1
12180 A98E 97 01                STA  A    S1
12190 A990 7F 0034              CLR       CHARCT
12200 A993 BD A86D  IN3F        JSR       ADVISP   IN3F
12210 A996 7C 0034              INC       CHARCT
12220 A999 96 01                LDA  A    S1       IN3G
12230 A99B 26 01                BNE       IN3G1
12240 A99D 39                   RTS
12250 A99E 7A 0001  IN3G1       DEC       S1
12260 A9A1 20 F0                BRA       IN3F
12270 A9A3 86 10    INFOR5      LDA  A    #$10     IN4A
12280 A9A5 97 01                STA  A    S1
12290 A9A7 20 D8                BRA       IN3C     IN4B
12300 A9A9 86 20    INFOR6      LDA  A    #$20     IN4C
12310 A9AB 97 01                STA  A    S1
12320 A9AD 20 D2                BRA       IN3C     IN4D
12330 A9AF 86 30    INFOR7      LDA  A    #$30     IN4E
12340 A9B1 97 01                STA  A    S1
12350 A9B3 20 CC                BRA       IN3C     IN4F
12360 A9B5 7F 0001  INFOR0      CLR       S1       IN4G
12370 A9B8 CE A986  IN4H        LDX       #IN3SR   IN4H
12380 A9BB DF 02                STX       S2
12390 A9BD 96 35    IN4I        LDA  A    IPFAIX   IN4I
12400 A9BF 81 08                CMP  A    #IFPA1E-IFPA1
12410 A9C1 25 0B                BCS       IN4J1
12420 A9C3 86 45                LDA  A    #'E
12430 A9C5 97 8E                STA  A    EPPMSG
```

```
12440 A9C7 86 35         LDA A   #$5
12450 A9C9 97 8F         STA A   ERRMSG+1
12460 A9CB 7E A2F2       JMP     EXITP
12470 A9CE DE 1D   IN4J1 LDX     ISPT
12480 A9D0 08           INX
12490 A9D1 DF 0E         STX     IX2
12500 A9D3 48            ASL A              (ACCA=IPFAIX)   IN4J
12510 A9D4 C6 01         LDA B   #IFPA2/$100
12520 A9D6 D7 0C         STA B   IX1
12530 A9D8 97 0D         STA A   IX1+1
12540 A9DA DE 0C         LDX     IX1
12550 A9DC 96 0E         LDA A   IX2
12560 A9DE A7 01         STA A   IFPA2*$100/$100,X
12570 A9E0 D6 0F         LDA B   IX2+1
12580 A9E2 E7 02         STA B   IFPA2*$100/$100+1,X
12590 A9E4 DE 02         LDX     S2       IN4K
12600 A9E6 AD 00         JSR     X
12610 A9E8 96 35         LDA A   IPFAIX   IN4L
12620 A9EA C6 01         LDA B   #IFPA1/$100
12630 A9EC D7 0C         STA B   IX1
12640 A9EE 97 0D         STA A   IX1+1
12650 A9F0 DE 0C         LDX     IX1
12660 A9F2 D6 34         LDA B   CHARCT
12670 A9F4 E7 11         STA B   IFPA1*$100/$100,X
12680 A9F6 7C 0035       INC     IPFAIX   IN4M
12690 A9F9 7E A963       JMP     INFLDF
12700 A9FC 86 10  INFOR1 LDA A   #$10     IN4N
12710 A9FE 97 01         STA A   S1
12720 AA00 20 B6         BRA     IN4H
12730 AA02 86 20  INFOR2 LDA A   #$20     IN4O
12740 AA04 97 01         STA A   S1
12750 AA06 20 B0         BRA     IN4H
12760 AA08 CE AA15 INFOR3 LDX    #IN5SR   IN4P
12770 AA0B DF 02         STX     S2
12780 AA0D 20 AE         BRA     IN4I     IN4Q
12790 AA0F BD AA15 INFOR8 JSR    IN5SR    IN5A
12800 AA12 7E A963       JMP     INFLDF   IN5B
12810 AA15 DE 19  IN5SR  LDX     FSPT     IN5C
12820 AA17 A6 00         LDA A   X
12830 AA19 84 0F         AND A   #$0F
12840 AA1B 97 01         STA A   S1
12850 AA1D 7F 0034       CLR     CHARCT
12860 AA20 BD A882       JSR     ADVFSP   IN5D
12870 AA23 DE 19         LDX     FSPT
12880 AA25 A6 00         LDA A   X
12890 AA27 97 02         STA A   S2
12900 AA29 BD A86D IN5D  JSR     ADVISP   IN5E
12910 AA2C 96 34         LDA A   CHARCT   IN5F
12920 AA2E 81 FF         CMP A   #$FF
12930 AA30 27 03         BEQ     IN5G1
12940 AA32 7C 0034       INC     CHARCT
12950 AA35 DE 1D  IN5G1  LDX     ISPT
12960 AA37 A6 00         LDA A   X
12970 AA39 91 02         CMP A   S2
12980 AA3B 26 EC         BNE     IN5D     IN5G
12990 AA3D 96 01         LDA A   S1
13000 AA3F 27 05         BEQ     IN5I1    IN5H
13010 AA41 7A 0001       DEC     S1
13020 AA44 20 E3         BRA     IN5D
13030 AA46 7A 0034 IN5I1 DEC     CHARCT
13040 AA49 39            RTS
13050 AA4A 4F    INFORC  CLR A            IN6A
13060 AA4B DE 19  IN6B   LDX     FSPT     IN6B
13070 AA4D E6 00         LDA B   X
13080 AA4F C4 0F         AND B   #$0F
13090 AA51 1B            ABA
13100 AA52 97 2D         STA A   REGID
13110 AA54 81 18         CMP A   #24
13120 AA56 23 03         BLS     *+5
13130 AA58 7E AE9A       JMP     ININVM
13140 AA5B BD AC06       JSR     SRPLOC   IN6C
13150 AA5E 7F 0004       CLR     S4
13160 AA61 BD A86D IN6E  JSR     ADVISP   IN6D
```

```
13170 AA64 DE 1D            LDX     ISPT
13180 AA66 A6 00            LDA A   X
13190 AA68 80 30            SUB A   #$30
13200 AA6A 97 01            STA A   S1
13210 AA6C 81 09            CMP A   #$9      (ACCA=S1) IN6E
13220 AA6E 23 04             BLS    IN6E2
13230 AA70 80 07            SUB A   #$7
13240 AA72 97 01            STA A   S1
13250 AA74 BD AAA0  IN6E2   JSR     INSRSD   IN6F
13260 AA77 D6 32            LDA B   REGLTH   IN6G
13270 AA79 D1 04            CMP B   S4
13280 AA7B 22 E4             BHI    IN6E
13290 AA7D C6 00  IN6G      LDA B   #REGFLG/$100  IN6H
13300 AA7F D7 0C            STA B   IX1
13310 AA81 D6 2D            LDA B   REGID
13320 AA83 17               TBA
13330 AA84 84 07            AND A   #$07
13340 AA86 C4 18            AND B   #$18
13350 AA88 54               LSR B
13360 AA89 54               LSR B
13370 AA8A 54               LSR B
13380 AA8B D7 0D            STA B   IX1+1
13390 AA8D C6 01            LDA B   #$1
13400 AA8F 91 00  IN6H1     CMP A   #$0
13410 AA91 27 04             BEQ    IN6H2
13420 AA93 58               ASL B
13430 AA94 4A               DEC A
13440 AA95 20 F8             BRA    IN6H1
13450 AA97 DE 0C  IN6H2     LDX     IX1
13460 AA99 EA 2E            ORA B   REGFLG+$100/$100,X
13470 AA9B E7 2E            STA B   REGFLG+$100/$100,X
13480 AA9D 7E A963          JMP     INFLDF
13490 AAA0 96 04  INSRSD    LDA A   S4       IN7A
13500 AAA2 84 01            AND A   #$01
13510 AAA4 26 18             BNE    IN7B1
13520 AAA6 D6 01            LDA B   S1
13530 AAA8 C4 0F            AND B   #$0F
13540 AAAA 58               ASL B
13550 AAAB 58               ASL B
13560 AAAC 58               ASL B
13570 AAAD 58               ASL B
13580 AAAE DE 27            LDX     REGSAD
13590 AAB0 A6 00            LDA A   X
13600 AAB2 84 0F            AND A   #$0F
13610 AAB4 97 0C            STA A   IX1
13620 AAB6 DA 0C            ORA B   IX1
13630 AAB8 E7 00            STA B   X
13640 AABA 7C 0004          INC     S4
13650 AABD 39               RTS
13660 AABE D6 01  IN7B1     LDA B   S1       IN7B
13670 AAC0 C4 0F            AND B   #$0F
13680 AAC2 D7 0C            STA B   IX1
13690 AAC4 DE 27            LDX     REGSAD
13700 AAC6 A6 00            LDA A   X
13710 AAC8 84 F0            AND A   #$F0
13720 AACA 9A 0C            ORA A   IX1
13730 AACC A7 00            STA A   X
13740 AACE DE 27            LDX     REGSAD
13750 AAD0 08               INX
13760 AAD1 DF 27            STX     REGSAD
13770 AAD3 7C 0004          INC     S4
13780 AAD6 39               RTS
13790 AAD7 86 10  INFORD    LDA A   #$10     IN8A
13800 AAD9 7E AA4B          JMP     IN6B     IN8B
13810 AADC DE 19  INFORE    LDX     FSPT     IN8C
13820 AADE A6 00            LDA A   X
13830 AAE0 84 0F            AND A   #$0F
13840 AAE2 97 2D            STA A   REGID
13850 AAE4 81 18  IN8D      CMP A   #24
13860 AAE6 23 03             BLS    *+5
13870 AAE8 7E AB9A          JMP     ININVM
13880 AAEB BD AC06          JSR     SRRLOC   IN8D
13890 AAEE 7F 0004          CLR     S4
```

```
13900 AAF1 7F 0002        CLR       S2
13910 AAF4 D6 18          LDA B     BFLAG    IN8F
13920 AAF6 26 71          BNE       IN9G
13930 AAF8 BD AB07  IN8F  JSR       INSRGD   IN8G
13940 AAFB BD AAA0        JSR       INSRSD   IN9A
13950 AAFE 96 32          LDA A     REGLTH   IN9B
13960 AB00 91 04          CMP A     S4
13970 AB02 22 F4          BHI       IN8F
13980 AB04 7E AA7D        JMP       IN6G     IN9C
13990 AB07 96 02   INSRGD LDA A     S2       IN9D
14000 AB09 26 2A          BNE       IN9E1
14010 AB0B BD A86D        JSR       ADVICP
14020 AB0E DE 1D          LDX       ISPT
14030 AB10 A6 00          LDA A     X
14040 AB12 84 3C          AND A     #$3C
14050 AB14 44             LSR A
14060 AB15 44             LSR A
14070 AB16 D6 01          LDA B     S1
14080 AB18 C4 F0          AND B     #$F0
14090 AB1A D7 01          STA B     S1
14100 AB1C 9A 01          ORA A     S1
14110 AB1E 97 01          STA A     S1
14120 AB20 A6 00          LDA A     X
14130 AB22 84 03          AND A     #$03
14140 AB24 48             ASL A
14150 AB25 48             ASL A
14160 AB26 D6 03          LDA B     S3
14170 AB28 C4 F3          AND B     #$F3
14180 AB2A D7 03          STA B     S3
14190 AB2C 9A 03          ORA A     S3
14200 AB2E 97 03          STA A     S3
14210 AB30 86 01          LDA A     #$1
14220 AB32 97 02          STA A     S2
14230 AB34 39             RTS
14240 AB35 96 02   IN9E1  LDA A     S2       IN9E
14250 AB37 81 01          CMP A     #$1
14260 AB39 26 26          BNE       IN9F1
14270 AB3B BD A86D        JSR       ADVISP
14280 AB3E D6 03          LDA B     S3
14290 AB40 D7 01          STA B     S1
14300 AB42 DE 1D          LDX       ISPT
14310 AB44 A6 00          LDA A     X
14320 AB46 84 30          AND A     #$30
14330 AB48 44             LSR A
14340 AB49 44             LSR A
14350 AB4A 44             LSR A
14360 AB4B 44             LSR A
14370 AB4C D6 01          LDA B     S1
14380 AB4E C4 FC          AND B     #$FC
14390 AB50 D7 01          STA B     S1
14400 AB52 9A 01          ORA A     S1
14410 AB54 97 01          STA A     S1
14420 AB56 A6 00          LDA A     X
14430 AB58 84 0F          AND A     #$0F
14440 AB5A 97 03          STA A     S3
14450 AB5C 86 02          LDA A     #$2
14460 AB5E 97 02          STA A     S2
14470 AB60 39             RTS
14480 AB61 96 03   IN9F1  LDA A     S3       IN9AF
14490 AB63 97 01          STA A     S1
14500 AB65 7F 0002        CLR       S2
14510 AB68 39             RTS
14520 AB69 BD A86D  IN9G  JSR       ADVISP   IN9AG
14530 AB6C DE 1D          LDX       ISPT     IN9AH
14540 AB6E A6 00          LDA A     X
14550 AB70 DE 27          LDX       REGSAD
14560 AB72 A7 00          STA A     X
14570 AB74 08             INX
14580 AB75 DF 27          STX       REGSAD   IN9AI
14590 AB77 7C 0004        INC       S4
14600 AB7A 7C 0004        INC       S4
14610 AB7D 96 32          LDA A     REGLTH
14620 AB7F 91 04          CMP A     S4
```

```
14630 AB81 22 E6              BHI      IN9G
14640 AB83 7E AA7D             JMP      IN6G
14650 AB86 DE 19    INFORF LDX       FSPT     IN10A
14660 AB88 A6 00              LDA A    X
14670 AB8A 84 0F              AND A    #$0F
14680 AB8C 81 0F              CMP A    #$F
14690 AB8E 27 07              BEQ      PRORE1   (PROREG)
14700 AB90 8B 10              ADD A    #$10      IN10B
14710 AB92 97 2D              STA A    REGID
14720 AB94 7E AAE4             JMP      IN8D      IN10C
14730 AB97 7E B0CD PRORE1 JMP       PROREG
14740 AB9A 86 45    ININVM LDA A     #'E       IN10D
14750 AB9C 97 8E              STA A    ERRMSG
14760 AB9E C6 33              LDA B    #'3
14770 ABA0 D7 8F              STA B    ERRMSG+1
14780 ABA2 7E A2F2             JMP      EXITP
14790 ABA5 86 45    INUNDF LDA A     #'E
14800 ABA7 97 8E              STA A    ERRMSG
14810 ABA9 86 34              LDA A    #'4
14820 ABAB 97 8F              STA A    ERRMSG+1
14830 ABAD 7E A2F2             JMP      EXITP
14840 ABB0 DE 19    INFORA LDX       FSPT     IN11A
14850 ABB2 A6 00              LDA A    X
14860 ABB4 84 0F              AND A    #$0F
14870 ABB6 97 2D    IN11A  STA A     REGID
14880 ABB8 7F 0005            CLR      S5
14890 ABBB BD AC06            JSR      SRRLOC    IN11B
14900 ABBE 96 05              LDA A    S5        IN11C
14910 ABC0 27 D8              BEQ      ININVM
14920 ABC2 7F 0004            CLR      S4        IN11D
14930 ABC5 DE 27              LDX      REGSAD
14940 ABC7 09                 DEX
14950 ABC8 DF 36              STX      ADDRES
14960 ABCA BD A86D IN11E  JSR       ADVISP    IN11E
14970 ABCD DE 1D              LDX      ISPT      IN11F
14980 ABCF A6 00              LDA A    X
14990 ABD1 81 30              CMP A    #'0
15000 ABD3 25 1B              BCS      IN12C
15010 ABD5 81 46              CMP A    #'F
15020 ABD7 22 17              BHI      IN12C
15030 ABD9 80 30              SUB A    #$30      IN11G    (ACCA = !ISPT)
15040 ABDB 97 01              STA A    S1
15050 ABDD 81 09              CMP A    #$9       IN11H
15060 ABDF 23 04              BLS      IN12A1
15070 ABE1 80 07              SUB A    #$7
15080 ABE3 97 01              STA A    S1
15090 ABE5 96 04    IN12A1 LDA A     S4        IN12A
15100 ABE7 91 05              CMP A    S5
15110 ABE9 27 AF              BEQ      ININVM
15120 ABEB BD AAA0            JSR      INSPCD    IN12B
15130 ABEE 20 DA              BRA      IN11E
15140 ABF0 96 05    IN12C  LDA A     S5        IN12C
15150 ABF2 90 04              SUB A    S4
15160 ABF4 DE 36              LDX      ADDRES
15170 ABF6 A7 00              STA A    X
15180 ABF8 7E AA7D             JMP      IN6G
15190 ABFB DE 19    INFORB LDX       FSPT
15200 ABFD A6 00              LDA A    X
15210 ABFF 84 0F              AND A    #$0F
15220 AC01 8B 10              ADD A    #$10
15230 AC03 7E ABB6             JMP      IN11A
15240             * SRRLOC
15250 AC06 86 A0    SRRLOC LDA A     #RGLOT/$100
15260 AC08 97 0C              STA A    IX1
15270 AC0A D6 2D              LDA B    REGID
15280 AC0C 58                 ASL B
15290 AC0D D7 0D              STA B    IX1+1
15300 AC0F DE 0C              LDX      IX1
15310 AC11 A6 86              LDA A    RGLOT*$100/$100,X
15320 AC13 C6 92              LDA B    #REGAR*$100/$100
15330 AC15 1B                 ABA
15340 AC16 97 28              STA A    REGSAD+1
15350 AC18 C6 00              LDA B    #REGAR/$100
```

```
15360 AC1A C9 00              ADC B    #0
15370 AC1C D7 27              STA B    REGSAD
15380 AC1E E6 87              LDA B    RGLOT*$100/$100+1,X
15390 AC20 D7 32              STA B    REGLTH
15400 AC22 C4 80              AND B    #$80
15410 AC24 26 01              BNE      SR2C1
15420 AC26 39                 RTS
15430 AC27 96 32      SR2C1   LDA A    REGLTH
15440 AC29 84 7F              AND A    #$7F
15450 AC2B 97 05              STA A    S5
15460 AC2D DE 27              LDX      REGSAD
15470 AC2F E6 00              LDA B    X
15480 AC31 10                 SBA
15490 AC32 97 32              STA A    REGLTH
15500 AC34 DE 27              LDX      REGSAD
15510 AC36 08                 INX
15520 AC37 DF 27              STX      REGSAD
15530 AC39 39                 RTS
15540 AC3A A9B5      INFTBL   FDB      INFOR0
15550 AC3C A9FC               FDB      INFOR1
15560 AC3E AA02               FDB      INFOR2
15570 AC40 AA08               FDB      INFOR3
15580 AC42 A97E               FDB      INFOR4
15590 AC44 A9A3               FDB      INFOR5
15600 AC46 A9A9               FDB      INFOR6
15610 AC48 A9AF               FDB      INFOR7
15620 AC4A AA0F               FDB      INFOR8
  720                    * OUTPUT PROCESSING ****
 5730 AC78 96 33     OUTMPR   LDA A    OUTMSG      OT1A
 5740 AC7A 48                 ASL A
 5750 AC7B 81 46              CMP A    #ROMOFE-ROMOFT
 5760 AC7D 25 03              BCS      OT1B
 5770 AC7F 7E AF3D             JMP      OTINVM
 5780 AC82 C6 A0     OT1B     LDA B    #ROMOFT/$100  OT1B
 5790 AC84 D7 0C              STA B    IX1
 5800 AC86 97 0D              STA A    IX1+1     (ACCA=2XOUTMSG)
 5810 AC88 DE 0C              LDX      IX1
 5820 AC8A EE 40              LDX      ROMOFT*$100/$100,X
 5830 AC8C DF 29              STX      OFSPT
 5840 AC8E 96 29              LDA A    OFSPT       OT1C
 5850 AC90 81 FF              CMP A    #$FF
 5860 AC92 26 0E              BNE      OT1D1
 5870 AC94 C6 D1              LDA B    #RAMFLT/$100
 5880 AC96 96 2A              LDA A    OFSPT+1
 5890 AC98 D7 0C              STA B    IX1
 5900 AC9A 97 0D              STA A    IX1+1
 5910 AC9C DE 0C              LDX      IX1
 5920 AC9E EE 19              LDX      RAMFLT*$100/$100,X
 5930 ACA0 DF 29              STX      OFSPT
 5940 ACA2 DE 29     OT1D1    LDX      OFSPT       OT1D1
 5950 ACA4 08                 INX
 5960 ACA5 DF 29              STX      OFSPT
 5970 ACA7 96 47              LDA A    OUTDEV      OT1E
 5980 ACA9 81 01              CMP A    #1
 5990 ACAB 26 04              BNE      OT1E1
 6000 ACAD DE 1B              LDX      FAEPT
 6010 ACAF DF 23              STX      IOEPT
 6020 ACB1 81 02     OT1E1    CMP A    #2
 6030 ACB3 26 06              BNE      OT1F1
 6040 ACB5 CE 022A             LDX      #SIA1
 6050 ACB8 09                 DEX
 6060 ACB9 DF 23              STX      IOEPT
 6070 ACBB 86 02     OT1F1    LDA A    #$02        OT1F (ASCII STX)
 6080 ACBD DE 23              LDX      IOEPT
 6090 ACBF A7 00              STA A    X
 6100 ACC1 BD AF63             JSR      ADVIOP
 6110 ACC4 BD AF48 OTNEXT     JSR      ADVOFP      OT2A
 6120 ACC7 DE 29              LDX      OFSPT       OT2B
 6130 ACC9 A6 00              LDA A    X
 6140 ACCB 84 F0              AND A    #$F0
 6150 ACCD 44                 LSR A
 6160 ACCE 44                 LSR A
 6170 ACCF 44                 LSR A
```

```
16180 ACD0 C6 AF            LDA B  #OTTBL/$100
16190 ACD2 D7 0C             STA B  IX1
16200 ACD4 97 0D             STA A  IX1+1
16210 ACD6 DE 0C             LDX    IX1
16220 ACD8 EE 9D             LDX    OTTBL*$100/$100,X
16230 ACDA 6E 00             JMP    X
16240 ACDC 7F 0034  OTFOR0  CLR    CHARCT      OT2C
16250 ACDF DE 29    OT2D    LDX    OFSPT       OT2D
16260 ACE1 A6 00            LDA A  X
16270 ACE3 84 0F             AND A  #$0F
16280 ACE5 9B 34             ADD A  CHARCT
16290 ACE7 97 34             STA A  CHARCT
16300 ACE9 96 34    OT2E    LDA A  CHARCT      OT2E
16310 ACEB 27 D7             BEQ    OTNEXT
16320 ACED 7A 0034           DEC    CHARCT      OT2F
16330 ACF0 BD AF48           JSR    ADVOFP
16340 ACF3 DE 29             LDX    OFSPT
16350 ACF5 A6 00             LDA A  X
16360 ACF7 DE 23             LDX    IOEPT
16370 ACF9 A7 00             STA A  X
16380 ACFB BD AF63           JSR    ADVIOP      OT2G
16390 ACFE 20 E9             BRA    OT2E        OT2H,I,J
16400 AD00 86 10    OTFOR1  LDA A  #$10        OT3A
16410 AD02 97 34             STA A  CHARCT
16420 AD04 20 D9             BRA    OT2D        OT3B
16430 AD06 86 20    OTFOR2  LDA A  #$20        OT3C
16440 AD08 97 34             STA A  CHARCT
16450 AD0A DE 29             LDX    OFSPT       OT3D
16460 AD0C E6 00             LDA B  X
16470 AD0E C4 0F             AND B  #$0F
16480 AD10 C1 0D             CMP B  #$D
16490 AD12 25 CB             BCS    OT2D
16500 AD14 22 18             BHI    OT4A        OT3E
16510 AD16 BD AF48  OT3F    JSR    ADVOFP      OT3F
16520 AD19 DE 29             LDX    OFSPT       OT3G
16530 AD1B A6 00             LDA A  X
16540 AD1D 81 5D             CMP A  #']
16550 AD1F 27 A3             BEQ    OTNEXT
16560 AD21 DE 29             LDX    OFSPT       OT3H
16570 AD23 A6 00             LDA A  X
16580 AD25 DE 23             LDX    IOEPT
16590 AD27 A7 00             STA A  X
16600 AD29 BD AF63           JSR    ADVIOP      OT3I
16610 AD2C 20 E8             BRA    OT3F
16620 AD2E C1 0F    OT4A    CMP B  #$F         OT4A
16630 AD30 27 19             BEQ    OT4F
16640 AD32 DE 23             LDX    IOEPT       OT4B
16650 AD34 86 00             LDA A  #0          *LF IF REQUIRED*
16660 AD36 A7 00             STA A  X
16670 AD38 BD AF63           JSR    ADVIOP
16680 AD3B DE 23             LDX    IOEPT       OT4C
16690 AD3D 86 0D             LDA A  #$0D        (ASCII CR)
16700 AD3F A7 00             STA A  X
16710 AD41 DE 23    OT4D    LDX    IOEPT       OT4D
16720 AD43 DF 16             STX    LASTTB
16730 AD45 BD AF63           JSR    ADVIOP      OT4E
16740 AD48 7E ACC4           JMP    OTNEXT
16750 AD4B DE 23    OT4F    LDX    IOEPT       OT4F
16760 AD4D 86 0B             LDA A  #$0B        (ASCII VT)
16770 AD4F A7 00             STA A  X
16780 AD51 20 EE             BRA    OT4D        OT4G
16790 AD53 DE 29    OTFOR3  LDX    OFSPT       OT5A
16800 AD55 A6 00             LDA A  X
16810 AD57 84 0F             AND A  #$0F
16820 AD59 91 35             CMP A  IPFRIX
16830 AD5B 25 03             BCS    *+5
16840 AD5D 7E ACC4           JMP    OTNEXT
16850 AD60 48               ASL A
16860 AD61 C6 01             LDA B  #IFPA2/$100
16870 AD63 D7 0C             STA B  IX1
16880 AD65 97 0D             STA A  IX1+1
16890 AD67 DE 0C             LDX    IX1
```

```
16900 AD69 EE 01              LDX     IFPA2+$100/$100,X
16910 AD6B DF 36              STX     ADDRES
16920 AD6D 44                 LSR A                       OT5B,C,D
16930 AD6E C6 01              LDA B   #IFPA1/$100
16940 AD70 D7 0C              STA B   IX1
16950 AD72 97 0D              STA A   IX1+1
16960 AD74 DE 0C              LDX     IX1
16970 AD76 A6 11              LDA A   IFPA1+$100/$100,X
16980 AD78 97 34              STA A   CHARCT
16990 AD7A 96 34    OT5E      LDA A   CHARCT      OT5E
17000 AD7C 26 03              BNE     *+5
17010 AD7E 7E ACC4            JMP     OTNEXT
17020 AD81 DE 36              LDX     ADDRES      OT5F
17030 AD83 A6 00              LDA A   X
17040 AD85 DE 23              LDX     IDEPT
17050 AD87 A7 00              STA A   X
17060 AD89 BD AF63            JSR     ADVIOP      OT5G
17070 AD8C DE 36              LDX     ADDRES      OT5H
17080 AD8E 08                 INX
17090 AD8F DF 36              STX     ADDRES
17100 AD91 7A 0034            DEC     CHARCT
17110 AD94 20 E4              BRA     OT5E        OT5I
17120 AD96 7F 0034 OTFOR4     CLR     CHARCT      OT6A
17130 AD99 DE 29   OT6B       LDX     OFSPT       OT6B
17140 AD9B A6 00              LDA A   X
17150 AD9D 84 0F              AND A   #$0F
17160 AD9F 9B 34              ADD A   CHARCT
17170 ADA1 4C                 INC A
17180 ADA2 97 34              STA A   CHARCT
17190 ADA4 86 20   OT6C       LDA A   #$20        (ASCII SP) OT6C
17200 ADA6 DE 23              LDX     IDEPT
17210 ADA8 A7 00              STA A   X
17220 ADAA BD AF63            JSR     ADVIOP      OT6D
17230 ADAD 7A 0034            DEC     CHARCT      OT6E
17240 ADB0 26 F2              BNE     OT6C        OT6F
17250 ADB2 7E ACC4            JMP     OTNEXT      OT6G
17260 ADB5 86 10   OTFOR5     LDA A   #$10        OT6H
17270 ADB7 97 34   OT6H1      STA A   CHARCT
17280 ADB9 20 DE              BRA     OT6B
17290 ADBB 86 20   OTFOR6     LDA A   #$20        OT6I
17300 ADBD 20 F8              BRA     OT6H1
17310 ADBF 86 30   OTFOR7     LDA A   #$30        OT6J
17320 ADC1 20 F4              BRA     OT6H1
17330 ADC3 7F 0034 OTFOR8     CLR     CHARCT      OT7A
17340 ADC6 DE 29   OT7B       LDX     OFSPT       OT7B
17350 ADC8 E6 00              LDA B   X
17360 ADCA C4 0F              AND B   #$0F
17370 ADCC DB 34              ADD B   CHARCT
17380 ADCE D7 34              STA B   CHARCT
17390 ADD0 96 17              LDA A   LASTTB+1
17400 ADD2 10                 SBA
17410 ADD3 4A                 DEC A
17420 ADD4 97 37              STA A   ADDRES+1
17430 ADD6 D6 16              LDA B   LASTTB
17440 ADD8 C2 00              SBC B   #0
17450 ADDA D7 36              STA B   ADDRES
17460 ADDC 96 23   OT7D       LDA A   IDEPT       OT7D
17470 ADDE 91 36              CMP A   ADDRES
17480 ADE0 24 03              BCC     *+5
17490 ADE2 7E ACC4            JMP     OTNEXT
17500 ADE5 26 09              BNE     OT7E1
17510 ADE7 96 24              LDA A   IDEPT+1
17520 ADE9 91 37              CMP A   ADDRES+1
17530 ADEB 24 03              BCC     *+5
17540 ADED 7E ACC4            JMP     OTNEXT
17550 ADF0 86 20   OT7E1      LDA A   #$20     (ASCIISP)   OT7E
17560 ADF2 DE 23              LDX     IDEPT
17570 ADF4 A7 00              STA A   X
17580 ADF6 BD AF63            JSR     ADVIOP      OT7F
17590 ADF9 20 E1              BRA     OT7D
17600 ADFB 86 10   OTFOR9     LDA A   #$10        OT7G
17610 ADFD 97 34   OT7G1      STA A   CHARCT
17620 ADFF 20 C5              BRA     OT7B
```

```
17630 AE01 86 20    OTFORA LDA A  #$20       OT7H
17640 AE03 20 F8           BRA    OT7G1
17650 AE05 86 30    OTFORB LDA A  #$30       OT7I
17660 AE07 20 F4           BRA    OT7G1
17670 AE09 7F 0001  OTFORC CLR    S1         OT8A
17680 AE0C 7F 0002         CLR    S2
17690 AE0F CE AE79  OT8B   LDX    #OTSR4D    OT8B
17700 AE12 DF 36           STX    ADDRES
17710 AE14 DE 29    OT8C   LDX    OFSPT      OT8C
17720 AE16 A6 00           LDA A  X
17730 AE18 84 0F           AND A  #$0F
17740 AE1A 9B 01           ADD A  S1
17750 AE1C 97 2D           STA A  REGID
17760 AE1E 16              TAB
17770 AE1F 84 18           AND A  #$18
17780 AE21 C4 07           AND B  #$7
17790 AE23 5C            INC B
17800 AE24 44              LSR A
17810 AE25 44              LSR A
17820 AE26 44              LSR A
17830 AE27 97 0D           STA A  IX1+1
17840 AE29 86 00           LDA A  #REGFLG/$100
17850 AE2B 97 0C           STA A  IX1
17860 AE2D DE 0C           LDX    IX1
17870 AE2F A6 2E           LDA A  REGFLG*$100/$100,X
17880 AE31 44      OT8C1   LSR A
17890 AE32 5A              DEC B
17900 AE33 26 FC           BNE    OT8C1
17910 AE35 25 03           BCS    *+5
17920 AE37 7E AE3A         JMP    *+3        ***JMP OTINVM FOR REGFLG CHEC
17930 AE3A BD AC06         JSR    SRRLOC     OT8D
17940 AE3D 96 02           LDA A  S2
17950 AE3F 27 03           BEQ    *+5
17960 AE41 7E AF1F         JMP    OT14A      OT8E
17970 AE44 DE 27    OT9A   LDX    REGSAD     OT9A
17980 AE46 A6 00           LDA A  X
17990 AE48 84 F0           AND A  #$F0
18000 AE4A 44              LSR A
18010 AE4B 44              LSR A
18020 AE4C 44              LSR A
18030 AE4D 44              LSR A
18040 AE4E 97 01           STA A  S1
18050 AE50 7A 0032         DEC    REGLTH
18060 AE53 DE 36           LDX    ADDRES     OT9B
18070 AE55 AD 00           JSR    X
18080 AE57 96 32           LDA A  REGLTH
18090 AE59 26 03           BNE    *+5
18100 AE5B 7E ACC4         JMP    OTNEXT
18110 AE5E DE 27           LDX    REGSAD     OT9C
18120 AE60 A6 00           LDA A  X
18130 AE62 84 0F           AND A  #$0F
18140 AE64 97 01           STA A  S1
18150 AE66 7A 0032         DEC    REGLTH
18160 AE69 DE 36           LDX    ADDRES     OT9D
18170 AE6B AD 00           JSR    X
18180 AE6D DE 27           LDX    REGSAD     OT9E
18190 AE6F 08              INX
18200 AE70 DF 27           STX    REGSAD
18210 AE72 96 32           LDA A  REGLTH     OT9F
18220 AE74 26 CE           BNE    OT9A
18230 AE76 7E ACC4         JMP    OTNEXT     OT9G
18240 AE79 96 01   OTSR4D  LDA A  S1         OT10A
18250 AE7B 8B 30           ADD A  #$30
18260 AE7D 97 01           STA A  S1
18270 AE7F 81 39           CMP A  #$39       OT10B
18280 AE81 23 04           BLS    OT10C1
18290 AE83 8B 07           ADD A  #$7
18300 AE85 97 01           STA A  S1
18310 AE87 DE 23   OT10C1  LDX    IDEPT      OT10C  A=S1
18320 AE89 A7 00           STA A  X
18330 AE8B BD AF63         JSR    ADVIOP     OT10D
18340 AE8E 39              RTS
18350 AE8F 96 02   OTSRGD  LDA A  S2         OT10E
```

```
18360 AE91 26 10              BNE        OT11A
18370 AE93 96 01              LDA  A     S1         OT10F
18380 AE95 84 0F              AND  A     #$0F
18390 AE97 48                 ASL  A
18400 AE98 48                 ASL  A
18410 AE99 97 03              STA  A     S3
18420 AE9B 7C 0002            INC        S2
18430 AE9E 96 32              LDA  A     REGLTH     OT10G,H
18440 AEA0 27 2F              BEQ        ID11H
18450 AEA2 39                 RTS
18460 AEA3 96 02    OT11A     LDA  A     S2         OT11A
18470 AEA5 81 01              CMP  A     #1
18480 AEA7 22 34              BHI        OT12A
18490 AEA9 96 01              LDA  A     S1         OT11B
18500 AEAB 84 0C              AND  A     #$0C
18510 AEAD 44                 LSR  A
18520 AEAE 44                 LSR  A
18530 AEAF 9A 03              ORA  A     S3
18540 AEB1 97 03              STA  A     S3
18550 AEB3 8A 40              ORA  A     #$40       OT11C
18560 AEB5 DE 23              LDX        IOEPT
18570 AEB7 A7 00              STA  A     X
18580 AEB9 BD AF63            JSR        ADVIOP     OT11D
18590 AEBC 96 01              LDA  A     S1         OT11E
18600 AEBE 84 03              AND  A     #$03
18610 AEC0 48                 ASL  A
18620 AEC1 48                 ASL  A
18630 AEC2 48                 ASL  A
18640 AEC3 48                 ASL  A
18650 AEC4 97 03              STA  A     S3
18660 AEC6 7C 0002            INC        S2         OT11F
18670 AEC9 96 32              LDA  A     REGLTH     OT11G
18680 AECB 26 03              BNE        *+5
18690 AECD 7E AED1            JMP        ID11H
18700 AED0 39                 RTS
18710 AED1 96 03    ID11H     LDA  A     S3         OT11H
18720 AED3 8A 40              ORA  A     #$40
18730 AED5 DE 23              LDX        IOEPT
18740 AED7 A7 00              STA  A     X
18750 AED9 BD AF63            JSR        ADVIOP     OT11I
18760 AEDC 39                 RTS                   OT11J
18770 AEDD 96 01    OT12A     LDA  A     S1
18780 AEDF 84 0F              AND  A     #$0F
18790 AEE1 9A 03              ORA  A     S3
18800 AEE3 97 03              STA  A     S3
18810 AEE5 7F 0002            CLR        S2         OT12B
18820 AEE8 20 E7              BRA        ID11H
18830 AEEA 86 10    OTFORD    LDA  A     #$10       OT12D
18840 AEEC 97 01              STA  A     S1
18850 AEEE 7F 0002            CLR        S2
18860 AEF1 7E AE0F            JMP        OTSB       OT12E
18870 AEF4 7F 0001  OTFOPE    CLR        S1         OT13A
18880 AEF7 96 18    OT13B     LDA  A     BFLAG      OT13B
18890 AEF9 97 02              STA  A     S2
18900 AEFB CE AE8F            LDX        #OTSPGD    OT13C
18910 AEFE DF 36              STX        ADDRES
18920 AF00 7E AE14            JMP        OTSC       OT13D
18930 AF03 DE 29    OTFORF    LDX        OFSPT      OT13E
18940 AF05 A6 00              LDA  A     X
18950 AF07 84 0F              AND  A     #$0F
18960 AF09 81 0F    CmpAc  A     #$0F
18970 AF0B 26 09              BNE        OT13E1
18980 AF0D DE 23              LDX        IOEPT
18990 AF0F 86 03              LDA  A     #HETX
19000 AF11 A7 00              STA  A     X
19010 AF13 BD AF63            JSR        ADVIOP
19020 AF16 7E A42F  OT13E1    JMP        STROUT
19030 AF19 86 10              LDA  A     #$10       OT13F
19040 AF1B 97 01              STA  A     S1
19050 AF1D 20 D8              BRA        OT13B
19060 AF1F DE 27    OT14A     LDX        REGIAD     OT14A
19070 AF21 A6 00              LDA  A     X
19080 AF23 DE 23              LDX        IOEPT
```

```
19090 AF25 A7 00             STA A  X
19100 AF27 BD AF63            JSR   ADVIOP    OT14B
19110 AF2A DE 27              LDX   REGSAD    OT14C,D
19120 AF2C 08                 INX
19130 AF2D DF 27              STX   REGSAD
19140 AF2F 7A 0032            DEC   REGLTH
19150 AF32 7A 0032            DEC   REGLTH
19160 AF35 7D 0032            TST   REGLTH
19170 AF38 2E E5              BGT   OT14A
19180 AF3A 7E ACC4            JMP   OTNEXT    OT14E
19190 AF3D 86 45     OTINVM   LDA A #'E
19200 AF3F 97 8E              STA A ERRMSG
19210 AF41 C6 41              LDA B #'A
19220 AF43 D7 8F              STA B ERRMSG+1
19230 AF45 7E A2F2            JMP   EXITP
19240                   * ADVOFF
19250 AF48 DE 29     ADVOFP   LDX   OFSPT
19260 AF4A 09                 DEX
19270 AF4B DF 29              STX   OFSPT
19280 AF4D 96 29              LDA A OFSPT
19290 AF4F 91 1B              CMP A FAEPT
19300 AF51 27 06              BEQ   SR5B1
19310 AF53 22 03              BHI   *+5
19320 AF55 7E A897            JMP   SR3B2     (WAS SR3C)
19330 AF58 39                 RTS
19340 AF59 96 2A     SR5B1    LDA A OFSPT+1
19350 AF5B 91 1C              CMP A FAEPT+1
19360 AF5D 24 03              BCC   *+5
19370 AF5F 7E A897            JMP   SR3B2     (WAS SR3C)
19380 AF62 39                 RTS
19390                   * ADVIOP
19400 AF63 DE 23     ADVIOP   LDX   IOEPT
19410 AF65 09                 DEX
19420 AF66 DF 23              STX   IOEPT
19430 AF68 96 47              LDA A OUTDEV
19440 AF6A 81 01              CMP A #1
19450 AF6C 01                 NOP             OUTPUT TO DEV. 2 IMMED.
19460 AF6D 01                 NOP
19470                   * CODE TO OUTPUT TO DEV #1 IMMEDIATELY: ***
19480 AF6E 86 00              LDA A #0        NUL
19490 AF70 A7 00              STA A X
19500 AF72 BD A42F            JSR   STPOUT
19510 AF75 DE 23              LDX   IOEPT
19520 AF77 08                 INX
19530 AF78 DF 23              STX   IOEPT
19540 AF7A 39                 RTS
19550 AF7B 96 24     SR4F1    LDA A IOEPT+1
19560 AF7D 91 49              CMP A I1EPT+1
19570 AF7F 23 01              BLS   SR4G
19580 AF81 39                 RTS
19590 AF82 86 45     SR4G     LDA A #'E
19600 AF84 97 8E              STA A ERRMSG
19610 AF86 C6 38              LDA B #'8
19620 AF88 D7 8F              STA B ERRMSG+1
19630 AF8A 7E A2F2            JMP   EXITP
19640 AF8D 96 23     SR4H     LDA A IOEPT
19650 AF8F 91 4A              CMP A I2EPT
19660 AF91 25 EF              BCS   SR4G
19670 AF93 27 01              BEQ   SR4I1
19680 AF95 39                 RTS
19690 AF96 96 24     SR4I1    LDA A IOEPT+1
19700 AF98 91 4B              CMP A I2EPT+1
19710 AF9A 23 E6              BLS   SR4G
19720 AF9C 39                 RTS
19730 AF9D ACDC     OTTBL     FDB   OTFOR0
19740 AF9F AD00               FDB   OTFOR1
19750 AFA1 AD06               FDB   OTFOR2
19760 AFA3 AD53               FDB   OTFOR3
19770 AFA5 AD96               FDB   OTFOR4
19780 AFA7 ADB5               FDB   OTFOR5
19790 AFA9 ADBB               FDB   OTFOR6
19800 AFAB ADBF               FDB   OTFOR7
19810 AFAD ADC3               FDB   OTFOR8
```

```
19820 AFAF ADFB           FDB     OTFOR9
19830 AFB1 AE01           FDB     OTFORA
19840 AFB3 AE05           FDB     OTFORB
19850 AFB5 AE09           FDB     OTFORC
19860 AFB7 AEEA           FDB     OTFORD
19870 AFB9 AEF4           FDB     OTFORE
19880 AFBB AF03           FDB     OTFORF
19890 AFBD 001E           RMB     30
19910                     * INITIALIZERPTRACEDES INTERFACE**REGISTER PROCE
19920                     *******************************************
19930                     *   INITIALIZE ***
19940 AFDB CE 0000 INITST LDX     #0
19950 AFDE 6F 00   INI01  CLR     X
19960 AFE0 08             INX
19970 AFE1 8C 03E3        CPX     #TPACFG+1
19980 AFE4 26 F8          BNE     INI01
19990 AFE6 CE 03DF        LDX     #STFA
20000 AFE9 DF 19          STX     FSPT
20010 AFEB DF 1B          STX     FREPT
20020 AFED DF 21          STX     OSPT
20030 AFEF DF 29          STX     OFSPT
20040 AFF1 DF 23          STX     IDEPT
20050 AFF3 CE 022A        LDX     #SIA1
20060 AFF6 DF 1D          STX     ISPT
20070 AFF8 DF 1F          STX     IENDPT
20080 AFFA CE 0019        LDX     #FSPT
20090 AFFD DF 25          STX     MFASPT
20100 AFFF CE 03DF        LDX     #STFA
20110 B002 DF 4D          STX     O1EPT
20120 B004 DF 3B          STX     D1DP
20130 B006 CE 0229        LDX     #SIA1-1
20140 B009 DF 53          STX     O2EPT
20150 B00B BD A1AC        JSR     INXID
20160 B00E 7E A1C1        JMP     BEGIN
20170 B011 86 03   INACIA LDA A   #3
20180 B013 B7 8408        STA A   MTTYSO
20190 B016 01             NOP
20200 B017 01             NOP
20210 B018 86 89          LDA A   #$89
20220 B01A B7 8408        STA A   MTTYSO
20230 B01D 20 F2          BRA     INACIA
20240                     *******************************************
20250                     *   RP TRACE ***
20260 B01F DF 56   RPRN1A STX     PROCTR
20270 B021 7D 03E2 RPRUNA TST     TRACFG
20280 B024 27 37          BEQ     TRACEN
20290 B026 96 56   TRACST LDA A   PROCTR
20300 B028 96 56          LDA A   PROCTR
20310 B02A BD B065        JSR     ASC
20320 B02D 96 57          LDA A   PROCTR+1
20330 B02F BD B088        JSR     ASCSP
20340 B032 CE 0076        LDX     #A1
20350 B035 BD B08F        JSR     REG
20360 B038 96 58          LDA A   A1DC
20370 B03A BD B088        JSR     ASCSP
20380 B03D CE 006E        LDX     #A2
20390 B040 BD B08F        JSR     REG
20400 B043 96 59          LDA A   A2DC
20410 B045 BD B088        JSR     ASCSP
20420 B048 CE 0066        LDX     #A3
20430 B04B BD B08F        JSR     REG
20440 B04E 96 5A          LDA A   A3DC
20450 B050 BD B088        JSR     ASCSP
20460 B053 96 5C          LDA A   CAR
20470 B055 BD B088        JSR     ASCSP
20480 B058 86 0D          LDA A   #$0D      CR
20490 B05A BD A285        JSR     CO
20500 B05D DE 56   TRACEN LDX     PROCTR
20510 B05F A6 00          LDA A   X
20520 B061 08             INX
20530 B062 7E B0E4        JMP     TRACEX
20540 B065 97 01   ASC    STA A   S1
20550 B067 44             LSR A
```

```
0560  B068 44              LSR   A
0570  B069 44              LSR   A
0580  B06A 44              LSR   A
0590  B06B BD B076          JSR   TRAOUT
0600  B06E 96 01            LDA A  S1
0610  B070 84 0F            AND A  #$0F
0620  B072 BD B076          JSR   TRAOUT
0630  B075 39               RTS
0640  B076 81 09    TRAOUT  CMP A  #9
0650  B078 23 02            BLS   TR8
0660  B07A 8B 07            ADD A  #$7
0670  B07C 8B 30    TR8     ADD A  #$30
0680  B07E BD A285          JSR   CO
0690  B081 39               RTS
0700  B082 86 20    SPACE   LDA A  #$20
0710  B084 BD A285          JSR   CO
0720  B087 39               RTS
0730  B088 BD B065  ASCSP   JSR   ASC
0740  B08B BD B082          JSR   SPACE
0750  B08E 39               RTS
0760  B08F DF 0C    REG     STX   IX1
0770  B091 08               INX
0780  B092 08               INX
0790  B093 08               INX
0800  B094 08               INX
0810  B095 08               INX
0820  B096 08               INX
0830  B097 08               INX
0840  B098 08               INX
0850  B099 DF 10            STX   IX3
0860  B09B DE 0C    REG1    LDX   IX1
0870  B09D 9C 10            CPX   IX3
0880  B09F 27 0A            BEQ   REG2
0890  B0A1 A6 00            LDA A  X
0900  B0A3 08               INX
0910  B0A4 DF 0C            STX   IX1
0920  B0A6 BD B065          JSR   ASC
0930  B0A9 20 F0            BRA   REG1
0940  B0AB BD B082  REG2    JSR   SPACE
0950  B0AE 39               RTS
0960                         ****************************************
0970                         ****************************************
0980                         *  REGISTER PROCESSING  ****************
0990  B0AF 001E             PMB   30
1000  B0CD 96 2B    PPDREG  LDA A  MSGTYP
1010  B0CF 80 04            SUB A  #4
1020  B0D1 48               ASL A
1030  B0D2 C6 A1            LDA B  #PPSAT/$100
1040  B0D4 D7 0C            STA B  IX1
1050  B0D6 97 0D            STA A  IX1+1
1060  B0D8 DE 0C            LDX   IX1
1070  B0DA EE 34            LDX   RPSAT*$100/$100,X
1080  B0DC DF 56            STX   PROCTR
1090  B0DE 7E B021  PPRUN   JMP   RPRUNA  (LDX PROCTR)
1100  B0E1 7E B01F  PPRUN1  JMP   RPRN1A  (LDAA X, INX) FOR TRACE
1110  B0E4 DF 56    TRACEX  STX   PROCTR  (TRACE RETURNS HERE)
1120  B0E6 81 A0            CMP A  #$A0   (ALL OTHERS - NOP)
1130  B0E8 25 09            BCS   RPC2A
1140  B0EA 81 DF            CMP A  #$DF   (2 DIGIT OPS:) ------------
1150  B0EC 22 F0            BHI   PPRUN
1160  B0EE 80 96            SUB A  #$96
1170  B0F0 48               ASL A
1180  B0F1 20 08            BRA   RPC2B
1190  B0F3 16       RPC2A   TAB            1 DIGIT OPS
1200  B0F4 C4 0F            AND B  #$F
1210  B0F6 44               LSR A
1220  B0F7 44               LSR A
1230  B0F8 44               LSR A
1240  B0F9 84 1E            AND A  #$1E
1250  B0FB 97 0D    RPC2B   STA A  IX1+1
1260  B0FD 86 B7            LDA A  #OPCODE/256
1270  B0FF 97 0C            STA A  IX1
```

```
21280 B101 DE 0C             LDX       IX1
21290 B103 EE C7             LDX       OPCODE+$100/$100,X
21300 B105 6E 00             JMP       X
21310 B107 CB 10    RPOP1    ADD B     #16         (X+16)
21320 B109 D7 2D    RPOP0    STA B     REGID
21330 B10B BD AC06           JSR       SRRLOC      REG LOC, LTH
21340 B10E CE 0076           LDX       #A1         CLR A1
21350 B111 BD B6B4           JSR       RPSC8B
21360 B114 DE 27             LDX       REGSAD
21370 B116 DF 0C             STX       IX1
21380 B118 96 32             LDA A     REGLTH
21390 B11A 97 58             STA A     A1DC
21400 B11C 97 03             STA A     S3
21410 B11E 7F 0001           CLR       S1
21420 B121 C6 10             LDA B     #16         A1 OFFSET
21430 B123 D0 03             SUB B     S3
21440 B125 2B 17             BMI       RPERR1      RPERR
21450 B127 17               TBA                    SET S2
21460 B128 84 01             AND A     #1
21470 B12A 97 02             STA A     S2
21480 B12C 54               LSR B
21490 B12D 86 76             LDA A     #A1+256/256
21500 B12F 1B               ABA
21510 B130 97 0F             STA A     IX2+1
21520 B132 86 00             LDA A     #A1/256
21530 B134 89 00             ADC A     #0
21540 B136 97 0E             STA A     IX2
21550 B138 BD B63D           JSR       RPSTDL      TRANS. DIGITS
21560 B13B 7E B0DE           JMP       RPRUN
21570 B13E 7E B1AB  RPEPP1   JMP       RPEPP
21580                       *A1 TO REG X
21590 B141 CB 10    RPOP3    ADD B     #16         (X+16)
21600 B143 D7 2D    RPOP2    STA B     REGID
21610 B145 96 58             LDA A     A1DC
21620 B147 97 03             STA A     S3
21630 B149 7F 0005           CLR       S5
21640 B14C BD AC06           JSR       SRRLOC      REG LC,LTH
21650 B14F DE 27             LDX       REGSAD
21660 B151 DF 0E             STX       IX2
21670 B153 96 05             LDA A     S5          IS LTH FIXED?
21680 B155 27 2B             BEQ       RPC8A       NO, VARIABLE:
21690 B157 09               DEX
21700 B158 16               TAB
21710 B159 90 58             SUB A     A1DC
21720 B15B 2A 06             BPL       RPC7A       REG TOO SHORT:
21730 B15D D7 03             STA B     S3
21740 B15F 6F 00             CLR       X           CLEAR REG OFFSET
21750 B161 20 02             BRA       RPC7B       REG LTH CK:
21760 B163 A7 00    RPC7A    STA A     X           SET OFFSET
21770 B165 C6 10    RPC7B    LDA B     #16         A1 OFFSET:
21780 B167 D0 03             SUB B     S3
21790 B169 2B 40             BMI       RPERR
21800 B16B 17               TBA                    SET S1:
21810 B16C 84 01             AND A     #1
21820 B16E 97 01             STA A     S1
21830 B170 54               LSR B
21840 B171 86 76             LDA A     #A1+256/256
21850 B173 1B               ABA
21860 B174 97 0D             STA A     IX1+1
21870 B176 86 00             LDA A     #A1/256
21880 B178 89 00             ADC A     #0
21890 B17A 97 0C             STA A     IX1
21900 B17C BD B63D           JSR       RPSTDL      TRANS DIGITS
21910 B17F 7E B0DE           JMP       RPRUN
21920                       * REGISTER LTH IS FIXED:
21930 B182 96 32    RPC8A    LDA A     REGLTH
21940 B184 16               TAB
21950 B185 90 03             SUB A     S3          (A=REG OFFSET)
21960 B187 2B 1D             BMI       RPC8F       RESULT IS POS:
21970                       *RIGHT JUSTIFY RESULT:
21980 B189 DE 0E             LDX       IX2         CLEAR REG:
21990 B18B 6F 00    RPC8B    CLR       X
22000 B18D 08               INX
```

```
22010 B18E 5A               DEC B
22020 B18F 27 03            BEQ   RPC8D
22030 B191 5A               DEC B
22040 B192 26 F7            BNE   RPC8B
22050 B194 16      RPC8D    TAB              (A=REG OFFSET)
22060 B195 C4 01            AND B  #1
22070 B197 D7 02            STA B  S2
22080 B199 44               LSR A
22090 B19A 9B 28            ADD A  REGAD+1
22100 B19C 97 0F            STA A  IX2+1
22110 B19E 96 27            LDA A  REGAD
22120 B1A0 89 00            ADC A  #0
22130 B1A2 97 0E            STA A  IX2
22140 B1A4 20 BF            BRA    RPC7B
22150              *FIXED LTH REG TOO SHORT
22160 B1A6 D7 03   RPC8F    STA B  S3
22170 B1A8 4F               CLR A
22180 B1A9 20 E9            BRA    RPC8D
22190 B1AB 7E AB9A RPERR    JMP    ININVM
22200              *CALL BYTE X XX + RBASE
22210 B1AE 96 56   RPOP5    LDA A  PROCTR
22220 B1B0 36               PSH A
22230 B1B1 96 57            LDA A  PROCTR+1
22240 B1B3 36               PSH A
22250              *RPOP4 MUST FOLLOW
22260              * BRANCH TO BYTE X XX + RPBASE
22270 B1B4 DE 56   RPOP4    LDX    PROCTR
22280 B1B6 A6 00            LDA A  X
22290 B1B8 97 57            STA A  PROCTR+1
22300 B1BA CB B8            ADD B  #RPBASE/256
22310 B1BC D7 56            STA B  PROCTR
22320 B1BE 7E B0DE          JMP    RPRUN
22330 B1C1 D7 5C   RPOP6    STA B  SAR
22340 B1C3 7E B0DE          JMP    RPRUN
22350 B1C6 58      RPOP7    ASL B
22360 B1C7 58               ASL B
22370 B1C8 58               ASL B
22380 B1C9 86 A0            LDA A  #MASKEY/$100
22390 B1CB 97 0C            STA A  IX1
22400 B1CD D7 0D            STA B  IX1+1
22410 B1CF DE 0C             LDX    IX1
22420 B1D1 EE B4            LDX    MASKEY*$100/$100,X
22430 B1D3 DF 7E            STX    KEYREG
22440 B1D5 DE 0C            LDX    IX1
22450 B1D7 EE B6            LDX    MASKEY*$100/$100+2,X
22460 B1D9 DF 80            STX    KEYREG+2
22470 B1DB DE 0C            LDX    IX1
22480 B1DD EE B8            LDX    MASKEY*$100/$100+4,X
22490 B1DF DF 82            STX    KEYREG+4
22500 B1E1 DE 0C            LDX    IX1
22510 B1E3 EE BA            LDX    MASKEY*$100/$100+6,X
22520 B1E5 DF 84            STX    KEYREG+6
22530 B1E7 7E B0DE          JMP    RPRUN
22540 B1EA 96 58   RPOPA0   LDA A  A1DC
22550 B1EC D6 59            LDA B  A2DC
22560 B1EE 97 59            STA A  A2DC
22570 B1F0 D7 58            STA B  A1DC
22580 B1F2 CE 006E          LDX    #A2
22590 B1F5 DF 10   PRA01    STX    IX3
22600 B1F7 CE 0076          LDX    #A1
22610 B1FA DF 0C            STX    IX1
22620 B1FC DE 0C            LDX    IX1
22630 B1FE A6 00   PRA02    LDA A  X
22640 B200 DE 10            LDX    IX3
22650 B202 E6 00            LDA B  X
22660 B204 A7 00            STA A  X
22670 B206 08               INX
22680 B207 DF 10            STX    IX3
22690 B209 DE 0C            LDX    IX1
22700 B20B E7 00            STA B  X
22710 B20D 08               INX
22720 B20E DF 0C            STX    IX1
22730 B210 8C 007E          CPX    #A1+8
```

```
12740 B213 26 E9              BNE     PRA02
12750 B215 7E B0DE             JMP     RPRUN
12760 B218 96 58     RPOPA1    LDA A   A1DC
12770 B21A D6 5A               LDA B   A3DC
12780 B21C 97 5A               STA A   A3DC
12790 B21E D7 58               STA B   A1DC
12800 B220 CE 0066              LDX    #A3
12810 B223 20 D0               BRA     PRA01
12820 B225 96 58     RPOPA2    LDA A   A1DC
12830 B227 D6 5B               LDA B   A4DC
12840 B229 97 5B               STA A   A4DC
12850 B22B D7 58               STA B   A1DC
12860 B22D CE 005E              LDX    #A4
12870 B230 20 C3               BRA     PRA01
12880 B232 DE 76     RPOPA3    LDX     A1
12890 B234 DF 6E               STX     A2
12900 B236 DE 78               LDX     A1+2
12910 B238 DF 70               STX     A2+2
12920 B23A DE 7A               LDX     A1+4
12930 B23C DF 72               STX     A2+4
12940 B23E DE 7C               LDX     A1+6
12950 B240 DF 74               STX     A2+6
12960 B242 96 58               LDA A   A1DC
12970 B244 97 59               STA A   A2DC
12980 B246 7E B0DE              JMP    RPRUN
12990 B249 CE 0076   RPOPA4    LDX     #A1
13000 B24C BD B6B4              JSR    RPSC8B
13010 B24F 7F 0058              CLR    A1DC
13020 B252 7E B0DE              JMP    RPRUN
13030 B255 CE 0066   RPOPA5    LDX     #A3
13040 B258 DF 10               STX     IX3
13050 B25A CE 006E              LDX    #A2
13060 B25D DF 0C               STX     IX1
13070 B25F DE 10     RPA51     LDX     IX3
13080 B261 A6 00               LDA A   X
13090 B263 08                  INX
13100 B264 DF 10               STX     IX3
13110 B266 DE 0C               LDX     IX1
13120 B268 A8 00               EOR A   X
13130 B26A A7 00               STA A   X
13140 B26C 08                  INX
13150 B26D DF 0C               STX     IX1
13160 B26F 8C 0076             CPX     #A2+8
13170 B272 26 EB               BNE     RPA51
13180 B274 7E B0DE              JMP    RPRUN
13190 B277 96 7D     RPOPA6    LDA A   A1+7
13200 B279 8B 01               ADD A   #1
13210 B27B 97 7D               STA A   A1+7
13220 B27D 25 03               BCS     *+5
13230 B27F 7E B0DE   JRPRUN    JMP     RPRUN
13240 B282 CE 007D              LDX    #A1+7
13250 B285 09        RPA61     DEX
13260 B286 A6 00               LDA A   X
13270 B288 89 00               ADC A   #0
13280 B28A A7 00               STA A   X
13290 B28C 24 F1               BCC     JRPRUN
13300 B28E 8C 0076             CPX     #A1
13310 B291 27 EC               BEQ     JRPRUN
13320 B293 20 F0               BRA     RPA61
13330 B295 96 7D     RPOPA7    LDA A   A1+7
13340 B297 80 01               SUB A   #1
13350 B299 97 7D               STA A   A1+7
13360 B29B 24 E2               BCC     JRPRUN
13370 B29D CE 007D              LDX    #A1+7
13380 B2A0 09        RPA71     DEX
13390 B2A1 A6 00               LDA A   X
13400 B2A3 82 00               SBC A   #0
13410 B2A5 A7 00               STA A   X
13420 B2A7 24 D6               BCC     JRPRUN
13430 B2A9 8C 0076             CPX     #A1
13440 B2AC 27 D1               BEQ     JRPRUN
13450 B2AE 20 F0               BRA     RPA71
13460 B2B0 DE 86     RPOPA8    LDX     RANDOM
```

```
23470 B2B2 DF 6E              STX     A2
23480 B2B4 DE 88              LDX     RANDOM+2
23490 B2B6 DF 70              STX     A2+2
23500 B2B8 DE 8A              LDX     RANDOM+4
23510 B2BA DF 72              STX     A2+4
23520 B2BC DE 8C              LDX     RANDOM+6
23530 B2BE DF 74              STX     A2+6
23540 B2C0 7E B0DE            JMP     RPRUN
23550 B2C3 96 58   RPOPA9     LDA A   A1DC
23560 B2C5 97 5C              STA A   SAR
23570 B2C7 7E B0DE            JMP     RPRUN
23580 B2CA 96 59   RPOPAA     LDA A   A2DC
23590 B2CC 97 5C              STA A   SAR
23600 B2CE 7E B0DE            JMP     RPRUN
23610 B2D1 96 5C   RPOPAB     LDA A   SAR
23620 B2D3 97 58              STA A   A1DC
23630 B2D5 7E B0DE            JMP     RPRUN
23640 B2D8 7C 005C RPOPAC     INC     SAR
23650 B2DB 7E B0DE            JMP     RPRUN
23660 B2DE 7A 005C RPOPAD     DEC     SAR
23670 B2E1 2B 0E              BMI     RPERR2   RPERR
23680 B2E3 7E B0DE            JMP     RPRUN
23690 B2E6 96 5C   RPOPAE     LDA A   SAR
23700 B2E8 D6 5D              LDA B   SARTWO
23710 B2EA 97 5D              STA A   SARTWO
23720 B2EC D7 5C              STA B   SAR
23730 B2EE 7E B0DE            JMP     RPRUN
23740 B2F1 7E B1AB RPERR2     JMP     RPERR
23750 B2F4 86 10   RPOPAF     LDA A   #16
23760 B2F6 90 5C              SUB A   SAR
23770 B2F8 2B F7              BMI     RPERR2
23780 B2FA 97 5C              STA A   SAR
23790 B2FC 7E B0DE            JMP     RPRUN
23800 B2FF 96 5C   RPOPB0     LDA A   SAR
23810 B301 97 59              STA A   A2DC
23820 B303 7E B0DE            JMP     RPRUN
23830                    * PARTIAL PIC A2->A3
23840 B306 CE 0066 RPOPC3     LDX     #A3

24300                    * SHIFT A1 RIGHT BY SAR
24310 B369 CE 0075 RPOPB2     LDX     #A1-1
24320 B36C DF 12              STX     IX4      IX4: LEFT END
24330 B36E CE 007D            LDX     #A1+7
24340 B371 DF 0E   RPC11A     STX     IX2      IX2: DEST PTR
24350 B373 DF 10              STX     IX3      IX3=IX2
24360 B375 D6 5C              LDA B   SAR
24370 B377 54                 LSR B            B=NUM BYTES TO SHIFT
24380 B378 96 0F              LDA A   IX2+1
24390 B37A 10                 SBA
24400 B37B 97 0D              STA A   IX1+1
24410 B37D 96 0E              LDA A   IX2
24420 B37F 82 00              SBC A   #0
24430 B381 97 0C              STA A   IX1      IX1:SOURCE PTR
24440 B383 DE 0C   RPC12A     LDX     IX1      SOURCE
24450 B385 9C 12              CPX     IX4      LEFT END
24460 B387 27 0E              BEQ     RPC12B
24470 B389 A6 00              LDA A   X
24480 B38B 09                 DEX
24490 B38C DF 0C              STX     IX1
24500 B38E DE 0E              LDX     IX2      DEST
24510 B390 A7 00              STA A   X
24520 B392 09                 DEX
24530 B393 DF 0E              STX     IX2
24540 B395 20 EC              BRA     RPC12A
24550                    * SOURCE PTR HAS REACHED BOUNDRY: CLR REST
24560 B397 DE 0E   RPC12B     LDX     IX2
24570 B399 9C 12   RPC12C     CPX     IX4
24580 B39B 27 05              BEQ     RPC13A
24590 B39D 6F 00              CLR     X
24600 B39F 09                 DEX
24610 B3A0 20 F7              BRA     RPC12C
24620                    * BYTE MOVE COMPLETE: CHECK FOR DIGIT MOVE
```

```
24630 B3A2 96 5C    RPC13A  LDA A   SAR
24640 B3A4 44               LSR A
24650 B3A5 25 03            BCS     *+5
24660 B3A7 7E B0DE           JMP     PPRUN
24670                *DIGIT MOVE REQUIRED
24680 B3AA DE 10            LDX     IX3
24690 B3AC E6 00            LDA B   X           B LT=LAST DIGIT
24700 B3AE 09               DEX
24710 B3AF A6 00    RPC14A  LDA A   X
24720 B3B1 44               LSR A               SHIFT A INTO B
24730 B3B2 56               ROR B
24740 B3B3 44               LSR A
24750 B3B4 56               ROR B
24760 B3B5 44               LSR A
24770 B3B6 56               ROR B
24780 B3B7 44               LSR A
24790 B3B8 56               ROR B
24800 B3B9 E7 01            STA B   1,X
24810 B3BB 09               DEX
24820 B3BC 9C 12            CPX     IX4
24830 B3BE 27 07            BEQ     RPC15A
24840 B3C0 16               TAB
24850 B3C1 58               ASL B
24860 B3C2 58               ASL B
24870 B3C3 58               ASL B
24880 B3C4 58               ASL B
24890 B3C5 20 E8            BRA     RPC14A
24900                *DONE: STORE LAST BYTE
24910 B3C7 A7 01    RPC15A  STA A   1,X
24920 B3C9 7E B0DE  RPC15C  JMP     RPRUN
24930                * SHIFT A2 RIGHT BY SAR
24940 B3CC CE 006D  RPOPB6  LDX     #A2-1
24950 B3CF DF 12            STX     IX4
24960 B3D1 CE 0075          LDX     #A2+7
24970 B3D4 20 9B            BRA     RPC11A
24980                * SHIFT A1 LEFT BY SAR
24990 B3D6 CE 0076  RPOPB3  LDX     #A1
25000 B3D9 DF 0E            STX     IX2         SET DESTINATION
25010 B3DB CE 007E          LDX     #A1+8
25020 B3DE 86 10    RPC16F  LDA A   #16
25030 B3E0 DF 10    RPC16B  STX     IX3         IX3=END POINTER
25040 B3E2 D6 5C            LDA B   SAR
25050 B3E4 10               SBA
25060 B3E5 97 03    RPC16C  STA A   S3          (NUM DIGITS)
25070 B3E7 7F 0001  RPC16D  CLR     S1          SET SOURCE
25080 B3EA 7F 0002          CLR     S2
25090 B3ED 54               LSR B
25100 B3EE 24 03            BCC     RPC16A
25110 B3F0 7C 0001          INC     S1
25120 B3F3 96 0F    RPC16A  LDA A   IX2+1
25130 B3F5 1B               ABA
25140 B3F6 97 0D            STA A   IX1+1
25150 B3F8 96 0E            LDA A   IX2
25160 B3FA 89 00            ADC A   #0
25170 B3FC 97 0C            STA A   IX1
25180 B3FE BD B63D          JSR     PPSTDL
25190                *CLEAR TO RIGHT
25200 B401 DE 0E            LDX     IX2
25210 B403 9C 10    RPC17A  CPX     IX3
25220 B405 27 C2            BEQ     RPC15C      (GO TO RPRUN)
25230 B407 6F 00            CLR     X
25240 B409 08               INX
25250 B40A 20 F7            BRA     RPC17A
25260                * SHIFT A2 LEFT BY SAR
25270 B40C CE 006E  RPOPB7  LDX     #A2
25280 B40F DF 0E            STX     IX2
25290 B411 CE 0076          LDX     #A2+8
25300 B414 20 C8            BRA     RPC16F
25310                * SHIFT A1 LT BY 16-SAR
25320 B416 CE 0076  RPOPB4  LDX     #A1
25330 B419 DF 0E            STX     IX2
25340 B41B CE 007E          LDX     #A1+8
25350 B41E DF 10            STX     IX3
```

```
25360 B420 C6 10            LDA B    #16
25370 B422 D0 5C            SUB B    SAR
25380 B424 96 5C            LDA A    SAR
25390 B426 20 BD            BRA      RPC16C
25400               * SHIFT A2 AND A1 LEFT BY SAR, BUT DO NOT SHIFT DATA
25410               * MADE IS LESS THAN SAR, SKIP 2. ADJUST A1DC AND A2D
25420 B428 CE 006E RPOPB5 LDX    #A2
25430 B42B DF 0E            STX      IX2
25440 B42D CE 007E          LDX      #A1+8
25450 B430 86 10            LDA A    #16
25460 B432 D6 59            LDA B    A2DC
25470 B434 10               SBA               (A=A2 OFFSET)
25480 B435 91 5C            CMP A    SAR
25490               * BRANCH IF A2 OFFSET LESS THAN SAR
25500 B437 25 0E            BCS      RPC20A
25510               * SAR LESS OR EQUAL A2 OFFSET: ADJ A1DC, A2DC :
25520 B439 DB 5C            ADD B    SAR
25530 B43B D7 59            STA B    A2DC
25540 B43D D6 58            LDA B    A1DC
25550 B43F D0 5C            SUB B    SAR
25560 B441 D7 58            STA B    A1DC
25570 B443 86 20            LDA A    #32
25580 B445 20 13            BRA      RPC16B
25590               * A2 OFFSET LESS THAN SAR
25600 B447 DF 10  RPC20A STX    IX3      (END POINTER)
25610 B449 CB 10            ADD B    #16
25620 B44B D7 03            STA B    S3       SET NUM DIGITS=OFFSET
25630 B44D 16               TAB               (B=A2 OFFSET)
25640 B44E 96 58            LDA A    A1DC     ADJUST A1DC:
25650 B450 10               SBA
25660 B451 97 58            STA A    A1DC
25670 B453 86 10            LDA A    #16      ADJUST A2DC
25680 B455 97 59            STA A    A2DC
25690 B457 DE 56            LDX      PROCTR   SET SKIP
25700 B459 08               INX
25710 B45A 08               INX
25720 B45B DF 56            STX      PROCTR
25730 B45D 7E B3E7          JMP      PPC16D
25740               * SKIP 2 IF A1=0
25750 B460 CE 0076 RPOPB9 LDX    #A1
25760 B463 A6 00  PRB9A  LDA A    X
25770 B465 26 38            BNE      GRPRUN
25780 B467 08               INX
25790 B468 8C 007E          CPX      #A1+8
25800 B46B 27 35            BEQ      CONDSK
25810 B46D 20 F4            BRA      PRB9A
25820               *SKIP 2 IF A1=A2
25830 B46F DE 76  RPOPBA LDX      A1
25840 B471 9C 6E            CPX      A2
25850 B473 26 2A            BNE      GRPRUN
25860 B475 DE 78            LDX      A1+2
25870 B477 9C 70            CPX      A2+2
25880 B479 26 24            BNE      GRPRUN
25890 B47B DE 7A            LDX      A1+4
25900 B47D 9C 72            CPX      A2+4
25910 B47F 26 1E            BNE      GRPRUN
25920 B481 DE 7C            LDX      A1+6
25930 B483 9C 74            CPX      A2+6
25940 B485 26 18            BNE      GRPRUN
25950 B487 20 19            BRA      CONDSK
25960 B489 96 5C  RPOPBB LDA A    SAR
25970 B48B 27 15            BEQ      CONDSK
25980 B48D 7E B0DE          JMP      RPRUN
25990 B490 96 5C  RPOPBC LDA A    SAR
26000 B492 81 10            CMP A    #16
26010 B494 27 0C            BEQ      CONDSK
26020 B496 7E B0DE          JMP      RPRUN
26030 B499 96 5C  RPOPBD LDA A    SAR
26040 B49B 91 5D            CMP A    SARTWO
26050 B49D 27 03            BEQ      CONDSK
26060 B49F 7E B0DE GRPRUN JMP      RPRUN
26070 B4A2 DE 56  CONDSK LDX      PROCTR
26080 B4A4 08               INX
```

```
26090 B4A5 08                    INX
26100 B4A6 DF 56                 STX     PROCTR
26110 B4A8 7E B0DE               JMP     RPRUN
26120      7CC0     DSM    EQU   $7CC0   DSM BASE
26130      0002     KEYENT EQU   $2
26140      0001     KEYXFR EQU   $1       RESET ON WRITE
26150      0000     DATLD  EQU   $0
26160      0005     ENCY   EQU   $5
26170      0004     DECY   EQU   $4
26180      0002     STAT   EQU   $2
26190      0006     RDSM   EQU   $6
26200                   * ENCRYPT WITH DSM A2->A3
26210 B4AB 8D 2A    XXXXC0 BSR   DSMLKD   LOAD KEY, DATA
26220 B4AD B7 7CC5             STA A     DSM+ENCY ENCRYPT
26230                   * CHECK STATUS FOR "BUSY"
26240 B4B0 CE FFFF  DSMCKS LDX   #$FFFF
26250 B4B3 09       DSM1   DEX
26260 B4B4 8C 0000         CPX   #0
26270 B4B7 27 1B           BEQ   DSMERR   START OVER IF TIMEOUT
26280 B4B9 B6 7CC2         LDA A DSM+STAT
26290 B4BC 44              LSR A
26300 B4BD 26 F4           BNE   DSM1     LOOP IF BUSY
26310                   * READ DSM OUTPUT:
26320 B4BF CE 0066         LDX   #A3
26330 B4C2 B6 7CC6  DSM2   LDA A DSM+RDSM
26340 B4C5 A7 00           STA A X
26350 B4C7 08              INX
26360 B4C8 8C 006E         CPX   #A3+8
26370 B4CB 26 F5           BNE   DSM2
26380 B4CD 86 10           LDA A #16
26390 B4CF 97 5A           STA A A3DC
26400 B4D1 7E B0DE         JMP   RPRUN
26410 B4D4 7E B4D4 DSMERR JMP    *
26420                   * LOAD KEY, DATA
26430 B4D7 97 01    DSMLKD STA A KEYXFR
26440 B4D9 CE 007E         LDX   #KEYREG
26450 B4DC A6 00    DSM3   LDA A X
26460 B4DE B7 7CC2         STA A DSM+KEYENT
26470 B4E1 08              INX
26480 B4E2 8C 0086         CPX   #KEYREG+8
26490 B4E5 26 F5           BNE   DSM3
26500 B4E7 B6 7CC1         LDA A DSM+KEYXFR
26510 B4EA CE 006E         LDX   #A2
26520 B4ED A6 00    DSM4   LDA A X
26530 B4EF B7 7CC0         STA A DSM+DATLD
26540 B4F2 08              INX
26550 B4F3 8C 0075         CPX   #A2+7
26560 B4F6 26 F5           BNE   DSM4
26570 B4F8 A6 00           LDA A X
26580 B4FA 39              RTS
26590                   *DECRYPT WITH DSM    A2->A3
26600 B4FB 8D DA    XXXXC1 BSR   DSMLKD
26610 B4FD B7 7CC4         STA A DSM+DECY
26620 B500 20 AE           BRA   DSMCKS
26630                   * CLEAR A2,A2DC
26640 B502 CE 006E  RPOPB1 LDX   #A2
26650 B505 BD B6B4         JSR   RPSC8B
26660 B508 7F 9059         CLR   A2DC
26670 B50B 7E B0DE         JMP   RPRUN
26680 B50E DE 66    RPOPC2 LDX   A3
26690 B510 DF 7E           STX   KEYREG
26700 B512 DE 68           LDX   A3+2
26710 B514 DF 80           STX   KEYREG+2
26720 B516 DE 6A           LDX   A3+4
26730 B518 DF 82           STX   KEYREG+4
26740 B51A DE 6C           LDX   A3+6
```

```
26750 B51C DF 84              STX       KEYREG+6
26760 B51E 7E B0DE            JMP       RPRUN
26770 B521 DE 56    RPOPC5    LDX       PROCTR
26780 B523 A6 00              LDA A     X
26790 B525 08                 INX
26800 B526 DF 56              STX       PROCTR
26810 B528 9A 2E              ORA A     REGFLG
26820 B52A 97 2E              STA A     REGFLG
26830 B52C 7E B0DE            JMP       RPRUN
26840 B52F DE 56    RPOPC6    LDX       PROCTR
26850 B531 A6 00              LDA A     X
26860 B533 08                 INX
26870 B534 DF 56              STX       PROCTR
26880 B536 9A 2F              ORA A     REGFLG+1
26890 B538 97 2F              STA A     REGFLG+1
26900 B53A 7E B0DE            JMP       RPRUN
26910 B53D DE 56    RPOPC7    LDX       PROCTR
26920 B53F A6 00              LDA A     X
26930 B541 08                 INX
26940 B542 DF 56              STX       PROCTR
26950 B544 9A 30              ORA A     REGFLG+2
26960 B546 97 30              STA A     REGFLG+2
26970 B548 7E B0DE            JMP       RPRUN
26980 B54B CE 002E RPOPC8    LDX       #REGFLG
26990 B54E 6F 00              CLR       X
27000 B550 6F 01              CLR       1,X
27010 B552 6F 02              CLR       2,X
27020 B554 6F 03              CLR       3,X
27030 B556 7E B0DE            JMP       RPRUN
27040 B559 C6 01    RPOPC9    LDA B     #1
27050 B55B 20 0F              BRA       PROPMG
27060 B55D F6 03E0 RPOPCA    LDA B     DV21FG
27070 B560 26 F7              BNE       RPOPC9
27080 B562 C6 02              LDA B     #2
27090 B564 20 06              BRA       PROPMG
27100 B566 C6 03    RPOPCB    LDA B     #3
27110 B568 20 02              BRA       PROPMG
27120 B56A C6 04    RPOPCC    LDA B     #4
27130 B56C D7 47    PROPMG    STA B     OUTDEV
27140 B56E DE 56              LDX       PROCTR
27150 B570 A6 00              LDA A     X
27160 B572 08                 INX
27170 B573 DF 56              STX       PROCTR
27180 B575 97 33              STA A     OUTMSG
27190 B577 BD AC78            JSR       OUTMPR
27200 B57A 7E B0DE            JMP       RPRUN
27210 B57D CE 0066 RPOPCD    LDX       #A3
27220 B580 DF 10              STX       IX3
27230 B582 CE 0076            LDX       #A1
27240 B585 DF 0C              STX       IX1
27250 B587 7F 0004            CLR       S4
27260 B58A 7F 0002            CLR       S2
27270 B58D DE 10    PPCD1     LDX       IX3
27280 B58F 8C 006E            CPX       #A3+8
27290 B592 27 12              BEQ       PPCD2
27300 B594 BD B6C5            JSR       FETCH
27310 B597 DF 10              STX       IX3
27320 B599 81 09              CMP A     #9
27330 B59B 22 F0              BHI       PRCD1
27340 B59D DE 0C              LDX       IX1
27350 B59F BD B6DE            JSR       STORE
27360 B5A2 DF 0C              STX       IX1
27370 B5A4 20 E7              BRA       PRCD1
27380 B5A6 CE 0066 PPCD2     LDX       #A3
27390 B5A9 DF 10              STX       IX3
27400 B5AB 7F 0004            CLR       S4
27410 B5AE DE 10    PRCD3     LDX       IX3
27420 B5B0 8C 006E            CPX       #A3+8
27430 B5B3 27 14              BEQ       PRCD5
27440 B5B5 BD B6C5            JSR       FETCH
27450 B5B8 DF 10              STX       IX3
```

```
27460 B5BA 81 0A              CMP A    #$A
27470 B5BC 25 F0              BCS      PRCD3
27480 B5BE 80 0A              SUB A    #$0A
27490 B5C0 DE 0C              LDX      IX1
27500 B5C2 BD B6DE            JSR      STORE
27510 B5C5 DF 0C              STX      IX1
27520 B5C7 20 E5              BRA      PRCD3
27530 B5C9 7E B0DE  PRCD5     JMP      RPRUN
27540                * DECIMAL ADD WITHOUT CARRY
27550 B5CC CE B617  RPOPCE LDX         #RPADD
27560 B5CF DF 36    RPCE1     STX      ADDRES
27570 B5D1 CE 0066            LDX      #A3
27580 B5D4 DF 10              STX      IX3
27590 B5D6 CE 006E            LDX      #A2
27600 B5D9 DF 0C              STX      IX1
27610 B5DB A6 00    PRCE2     LDA A    X
27620 B5DD 44                 LSR A
27630 B5DE 44                 LSR A
27640 B5DF 44                 LSR A
27650 B5E0 44                 LSR A
27660 B5E1 DE 10              LDX      IX3
27670 B5E3 E6 00              LDA B    X
27680 B5E5 54                 LSR B
27690 B5E6 54                 LSR B
27700 B5E7 54                 LSR B
27710 B5E8 54                 LSR B
27720 B5E9 DE 36              LDX      ADDRES
27730 B5EB AD 00              JSR      X
27740 B5ED 48                 ASL A
27750 B5EE 48                 ASL A
27760 B5EF 48                 ASL A
27770 B5F0 48                 ASL A
27780 B5F1 97 01              STA A    S1
27790 B5F3 DE 10              LDX      IX3
27800 B5F5 E6 00              LDA B    X
27810 B5F7 C4 0F              AND B    #$F
27820 B5F9 08                 INX
27830 B5FA DF 10              STX      IX3
27840 B5FC DE 0C              LDX      IX1
27850 B5FE A6 00              LDA A    X
27860 B600 84 0F              AND A    #$F
27870 B602 DE 36              LDX      ADDRES
27880 B604 AD 00              JSR      X
27890 B606 DE 0C              LDX      IX1
27900 B608 9A 01              ORA A    S1
27910 B60A A7 00              STA A    X
27920 B60C 08                 INX
27930 B60D DF 0C              STX      IX1
27940 B60F 8C 0076            CPX      #A2+8
27950 B612 26 C7              BNE      PRCE2
27960 B614 7E B0DE            JMP      RPRUN
27970                * ADD SUBROUTINE
27980 B617 1B      RPADD      ABA
27990 B618 81 0A              CMP A    #$A
28000 B61A 25 02              BCS      *+4
28010 B61C 80 0A              SUB A    #$A
28020 B61E 39                 RTS
28030                * PER DIGIT SUBTRACT A2-A3>A2
28040 B61F CE B624 RPOPCF LDX         #RPSUBT
28050 B622 20 AB              BRA      RPCE1
28060                *SUBTRACT SUBROUTINE
28070 B624 10      RPSUBT     SBA
28080 B625 2A 02              BPL      *+4
28090 B627 8B 0A              ADD A    #10
28100 B629 39                 RTS
28110 B62A 32      RPOPD0     PUL A
28120 B62B 97 57              STA A    PROCTR+1
28130 B62D 32                 PUL A
28140 B62E 97 56              STA A    PROCTR
28150 B630 DE 56              LDX      PROCTR
28160 B632 08                 INX
```

```
28170 B633 7E B0E1          JMP     RPRUN1
28180                * GET SECOND OPCODE DIGIT
28190 B636 DE 56    RPSGSD  LDX     PROCTR
28200 B638 A6 00            LDA A   X
28210 B63A 84 0F            AND A   #$0F
28220 B63C 39               RTS
28230                * TRANSFER DIGITS, LEFT-TO-RIGHT:
28240                *   IX1=SOURCE STARTING BYTE ADDRESS
28250                *   IX2=DEST. STARTING BYTE ADDRESS
28260                *   S1=SOURCE STARTING DIGIT POS'N (0=LT) (1=RT)
28270                *   S2=DEST STARTING DIGIT POS'N (0=LT) (1=RT)
28280                *   S3=DIGIT COUNT
28290                * AT END, IX2 POINTS AT BYTE BEYOND LAST BYTE
28300 B63D 96 03    RPSTDL  LDA A   S3
28310 B63F 27 38            BEQ     RPSR3B    RTN
28320 B641 81 20            CMP A   #32
28330 B643 22 34            BHI     RPSR3B
28340 B645 96 01            LDA A   S1
28350 B647 91 02            CMP A   S2
28360 B649 27 3E            BEQ     RPS4B     NOT IN PHASE:
28370 B64B 4D              TST A
28380 B64C 26 2C            BNE     RPS4A     DEST IS RT, SOURCE LT:
28390 B64E 4F               CLR A
28400 B64F 44     PPS2A     LSR A
28410 B650 44               LSR A
28420 B651 44               LSR A
28430 B652 44               LSR A
28440 B653 DE 0C            LDX     IX1
28450 B655 E6 00            LDA B   X
28460 B657 08               INX
28470 B658 DF 0C            STX     IX1
28480 B65A 58               ASL B
28490 B65B 49               ROL A
28500 B65C 58               ASL B
28510 B65D 49               ROL A
28520 B65E 58               ASL B
28530 B65F 49               ROL A
28540 B660 58               ASL B
28550 B661 49               ROL A
28560 B662 DE 0E            LDX     IX2
28570 B664 A7 00            STA A   X
28580 B666 08               INX
28590 B667 DF 0E            STX     IX2
28600 B669 7A 0003          DEC     S3
28610 B66C 27 0B            BEQ     PPSR3B    RTN
28620 B66E 17               TBA
28630 B66F 7A 0003 RPSR3A   DEC     S3
28640 B672 26 DB            BNE     RPS2A
28650 B674 A7 00            STA A   X
28660 B676 08               INX
28670 B677 DF 0E            STX     IX2
28680 B679 39     RPSR3B    RTS
28690                * NOT IN PHASE, DEST IS LEFT
28700 B67A DE 0C   RPS4A    LDX     IX1
28710 B67C A6 00            LDA A   X
28720 B67E 48               ASL A
28730 B67F 48               ASL A
28740 B680 48               ASL A
28750 B681 48               ASL A
28760 B682 08               INX
28770 B683 DF 0C            STX     IX1
28780 B685 DE 0E            LDX     IX2
28790 B687 20 E6            BRA     RPSR3A
28800                *IN PHASE
28810 B689 4D     RPS4B     TST A
28820 B68A 27 05            BEQ     RPS5A     DEST IS RT:
28830 B68C DE 0C            LDX     IX1
28840 B68E A6 00            LDA A   X
28850 B690 84 0F            AND A   #$0F
28860 B692 08     RPS4C     INX
28870 B693 DF 0C            STX     IX1
28880 B695 DE 0E            LDX     IX2
28890 B697 A7 00            STA A   X
28900 B699 08               INX
```

```
28910 B69A DF 0E            STX     IX2
28920 B69C 7A 0003          DEC     S3
28930 B69F 27 D8            BEQ     RPSR3B   RTS
28940 B6A1 DE 0C    RPS5A   LDX     IX1      (DEST IS LT:)
28950 B6A3 A6 00            LDA A   X
28960 B6A5 7A 0003          DEC     S3
28970 B6A8 26 E8            BNE     RPS4C
28980 B6AA 84 F0            AND A   #$F0
28990 B6AC DE 0E            LDX     IX2
29000 B6AE A7 00            STA A   X
29010 B6B0 08               INX
29020 B6B1 DF 0E            STX     IX2
29030 B6B3 39               RTS
29040                       * CLEAR 8 BYTES, STARTING WITH X (UNCHANGED)
29050 B6B4 6F 07    RPSC8B  CLR     7,X
29060 B6B6 6F 06            CLR     6,X
29070 B6B8 6F 05            CLR     5,X
29080 B6BA 6F 04            CLR     4,X
29090 B6BC 6F 03            CLR     3,X
29100 B6BE 6F 02            CLR     2,X
29110 B6C0 6F 01            CLR     1,X
29120 B6C2 6F 00            CLR     X
29130 B6C4 39               RTS
29140                       * SUBROUTINE FETCH
29150 B6C5 D6 04    FETCH   LDA B   S4
29160 B6C7 26 0C            BNE     FCH1
29170 B6C9 A6 00            LDA A   X
29180 B6CB 84 F0            AND A   #$F0
29190 B6CD 44               LSR A
29200 B6CE 44               LSR A
29210 B6CF 44               LSR A
29220 B6D0 44               LSR A
29230 B6D1 7C 0004          INC     S4
29240 B6D4 39               RTS
29250 B6D5 A6 00    FCH1    LDA A   X
29260 B6D7 84 0F            AND A   #$0F
29270 B6D9 08               INX
29280 B6DA 7F 0004          CLR     S4
29290 B6DD 39               RTS
29300                       * SUBROUTINE STORE
29310 B6DE D6 02    STORE   LDA B   S2
29320 B6E0 26 0A            BNE     STO1
29330 B6E2 48               ASL A
29340 B6E3 48               ASL A
29350 B6E4 48               ASL A
29360 B6E5 48               ASL A
29370 B6E6 A7 00            STA A   X
29380 B6E8 7C 0002          INC     S2
29390 B6EB 39               RTS
29400 B6EC E6 00    STO1    LDA B   X
29410 B6EE D7 03            STA B   S3
29420 B6F0 9A 03            ORA A   S3
29430 B6F2 A7 00            STA A   X
29440 B6F4 08               INX
29450 B6F5 7F 0002          CLR     S2
29460 B6F8 39               RTS
29470                       * LOAD XX INTO LSB OF A1
29480 B6F9 DE 56    PPOPD3  LDX     PROCTR
29490 B6FB A6 00            LDA A   X
29500 B6FD 08               INX
29510 B6FE DF 56            STX     PROCTR
29520 B700 97 7D            STA A   A1+7
29530 B702 7E B0DE          JMP     RPRUN
29540                       * SKIP IF LS BYTE A1 GTR LS BYTE A2
29550 B705 96 7D    PPOPD4  LDA A   A1+7
29560 B707 91 75            CMP A   A2+7
29570 B709 22 03            BHI     *+5
29580 B70B 7E B0DE          JMP     RPRUN
29590 B70E 7E B4A2          JMP     CONDSK
```

```
29600                  * RETURN FROM SUBROUTINE SKIPPING 2 BYTES
29610 B711 32    RPOPD5 PUL  A
29620 B712 97 57        STA  A    PROCTR+1
29630 B714 32           PUL  A
29640 B715 97 56        STA  A    PROCTR
29650 B717 DE 56        LDX       PROCTR
29660 B719 08           INX
29670 B71A 08           INX
29680 B71B 08           INX
29690 B71C 7E B0E1      JMP       RPRUN1
29700                  * INCREMENT A1 BY $100
29710 B71F 96 7C RPOPD6 LDA  A    A1+6
29720 B721 8B 01        ADD  A    #1
29730 B723 97 7C        STA  A    A1+6
29740 B725 25 03        BCS       *+5
29750 B727 7E B0DE      JMP       RPRUN
29760 B72A CE 007C      LDX       #A1+6
29770 B72D 7E B285      JMP       RPA61
29780                  * CLEAR A1, A1DC UNCHANGED
29790                  ****************TEMPORARY ONLY:  CHANGE RPOPA4::::****
29800 B730 CE 0076 RPOPD7 LDX    #A1
29810 B733 BD B6B4      JSR       RPSC8B
29820 B736 7E B0DE      JMP       RPRUN
29830                  * SHIFT LEFT A2, A1 UNCOND.  SAR=:A2DC
29840 B739 7F 0059 RPOPD8 CLR    A2DC
29850 B73C 7E B428      JMP       RPOPB5
29860                  * SET AUTHORIZATION
29870 B73F 86 07  RPOPBF LDA  A  #7
29880 B741 B7 03E1      STA  A    AUTHFG
29890 B744 7E B0DE      JMP       RPRUN
29900                  * CLEAR AUTHORIZATION:
29910 B747 7F 03E1 RPOPC4 CLR    AUTHFG
29920 B74A 7E B0DE      JMP       RPRUN
29930                  * TEST AUTHORIZATION, SKIP IF SET
29940 B74D 7D 03E1 RPOPBE TST    AUTHFG
29950 B750 26 03        BNE       *+5
29960 B752 7E B0DE      JMP       RPRUN
29970 B755 7E B4A2      JMP       CONDSK
29980                  *** LKEYI: LOAD INTERCHANGE KEY
29990 B758 DE F9  RPOPD9 LDX     IXKEY
30000 B75A DF 7E        STX       KEYREG
30010 B75C DE FB        LDX       IXKEY+2
30020 B75E DF 80        STX       KEYREG+2
30030 B760 DE FD        LDX       IXKEY+4
30040 B762 DF 82        STX       KEYREG+4
30050 B764 DE FF        LDX       IXKEY+6
30060 B766 DF 84        STX       KEYREG+6
30070 B768 7E B0DE      JMP       RPRUN
30080                  *** SKEYI: STORE INTERCHNAGE KEY FROM A1 ***
30090 B76B DE 76  RPOPDC LDX     A1
30100 B76D DF F9        STX       IXKEY
30110 B76F DE 78        LDX       A1+2
30120 B771 DF FB        STX       IXKEY+2
30130 B773 DE 7A        LDX       A1+4
30140 B775 DF FD        STX       IXKEY+4
30150 B777 DE 7C        LDX       A1+6
30160 B779 DF FF        STX       IXKEY+6
30170 B77B 7E B0DE      JMP       RPRUN
30180                  *** A1TSAR: TRANSFER LST BYTE OF A1 TO SAR ***
30190 B77E 96 7D  RPOPDD LDA  A  A1+7
30200 B780 97 5C        STA  A    SAR
30210 B782 7E B0DE      JMP       RPRUN
30220                  *** CASE16: JUMP TO CODE F(R16), 3 CASES ***
30230 B785 96 CA  RPOPDA LDA  A  REGN16
30240 B787 84 0F        AND  A    #$F
30250 B789 81 03        CMP  A    #3
30260 B78B 23 01  RPDA1 BLS       RPDA4
30270 B78D 4F           CLR  A              TOO LARGE, TAKE FIRST
30280 B78E DE 56  RPDA4 LDX       PROCTR
30290 B790 4D           TST  A
```

```
30300 B791 27 05    RPDA3  BEQ    RPDA2    FOUND
30310 B793 08              INX
30320 B794 08              INX
30330 B795 4A              DEC A
30340 B796 20 F9            BRA    RPDA3
30350 B798 EE 00    RPDA2  LDX    X        VALUE FOUND
30360 B79A 7E B0E1          JMP    RPRUN1
30370                *** CASE 17: JUMP TO CODE F(R17), 4 CASES ***
30380 B79D 96 CB    RPOPDB LDA A  REGN17
30390 B79F 84 0F            AND A  #$F
30400 B7A1 81 04            CMP A  #4       LIM = 4
30410 B7A3 20 E6            BRA    RPDA1
30420                *INC1LD: INCR A1 LSB IN DECIMAL*
30430 B7A5 96 7D    RPOPDE LDA A  A1+7
30440 B7A7 8B 01            ADD A  #1
30450 B7A9 19              DAA
30460 B7AA 97 7D            STA A  A1+7
30470 B7AC 7E B0DE          JMP    RPRUN
30480                *DEC1LD: DECR A1 LSB IN DECIMAL*
30490 B7AF 96 7D    RPOPDF LDA A  A1+7
30500 B7B1 16              TAB
30510 B7B2 27 09            BEQ    RPDF1
30520 B7B4 C4 0F            AND B  #$0F
30530 B7B6 26 09            BNE    RPDF2
30540 B7B8 CB F9            ADD B  #$F9
30550 B7BA 17              TBA
30560 B7BB 20 05            BRA    RPDF3
30570 B7BD 86 99    RPDF1  LDA A  #$99
30580 B7BF 20 01            BRA    RPDF3
30590 B7C1 4A      RPDF2  DEC A
30600 B7C2 97 7D    RPDF3  STA A  A1+7
30610 B7C4 7E B0DE          JMP    RPRUN
30620 B7C7 B109    OPCODE FDB    RPOP0
30630 B7C9 B107            FDB    RPOP1
30640 B7CB B143            FDB    RPOP2
30650 B7CD B141            FDB    RPOP3
30660 B7CF B1B4            FDB    RPOP4
30670 B7D1 B1A2            FDB    RPOP5
30680 B7D3 B1C1            FDB    RPOP6
30690 B7D5 B1C6            FDB    RPOP7
30700 B7D7 B0DE            FDB    RPRUN
30710 B7D9 B0DE            FDB    RPRUN
30720 B7DB B1EA            FDB    RPOPA0
30730 B7DD B218            FDB    RPOPA1
30740 B7DF B225            FDB    RPOPA2
30750 B7E1 B232            FDB    RPOPA3
30760 B7E3 B249            FDB    RPOPA4
30770 B7E5 B255            FDB    RPOPA5
30780 B7E7 B277            FDB    RPOPA6
30790 B7E9 B295            FDB    RPOPA7
30800 B7EB B2B0            FDB    RPOPA8
30810 B7ED B2C3            FDB    RPOPA9
30820 B7EF B2CA            FDB    RPOPAA
30830 B7F1 B2D1            FDB    RPOPAB
30840 B7F3 B2D8            FDB    RPOPAC
30850 B7F5 B2DE            FDB    RPOPAD
30860 B7F7 B2E6            FDB    RPOPAE
30870 B7F9 B2F4            FDB    RPOPAF
30880 B7FB B2FF            FDB    RPOPB0
30890 B7FD B502            FDB    RPOPB1
30900 B7FF B369            FDB    RPOPB2
30910 B801 B3D6            FDB    RPOPB3
30920 B803 B416            FDB    RPOPB4
30930 B805 B428            FDB    RPOPB5
30940 B807 B3CC            FDB    RPOPB6
30950 B809 B40C            FDB    RPOPB7
30960 B80B B0DE            FDB    RPRUN
30970 B80D B460            FDB    RPOPB9
30980 B80F B46F            FDB    RPOPBA
30990 B811 B489            FDB    RPOPBB
31000 B813 B490            FDB    RPOPBC
```

```
31010 B815 B499            FDB    RPOPBD
31020 B817 B74D            FDB    RPOPBE
31030 B819 B73F            FDB    RPOPBF
31040 B81B BCB0            FDB    DESENC
31050 B81D BCB3            FDB    DESDEC
31060 B81F B50E            FDB    RPOPC2
31070 B821 B306            FDB    RPOPC3
31080 B823 B747            FDB    RPOPC4
31090 B825 B521            FDB    RPOPC5
31100 B827 B52F            FDB    RPOPC6
31110 B829 B53D            FDB    RPOPC7
31120 B82B B54B            FDB    RPOPC8
31130 B82D B559            FDB    RPOPC9
31140 B82F B55D            FDB    RPOPCA
31150 B831 B566            FDB    RPOPCB
31160 B833 B56A            FDB    RPOPCC
31170 B835 B57D            FDB    RPOPCD
31180 B837 B5CC            FDB    RPOPCE
31190 B839 B61F            FDB    RPOPCF
31200 B83B B62A            FDB    RPOPD0
31210 B83D B0DE            FDB    RPRUN
31220 B83F B2F2            FDB    EXITP
31230 B841 B6F9            FDB    RPOPD3
31240 B843 B705            FDB    RPOPD4
31250 B845 B711            FDB    RPOPD5
31260 B847 B71F            FDB    RPOPD6
31270 B849 B730            FDB    RPOPD7
31280 B84B B739            FDB    RPOPD8
31290 B84D B758            FDB    RPOPD9,RPOPDA,RPOPDB
      B84F B785
      B851 B79D
31300 B853 B76B            FDB    RPOPDC,RPOPDD
      B855 B77E
31310 B857 B7A5            FDB    RPOPDE,RPOPDF
      B859 B7AF
31320 B85B 0000            FDB    0,0
      B85D 0000
31330 B85F 0014            RMB    20

31350                      * CRYPTOGRAPHIC PROCESSING ***
31360                      ******************************************
31370                      * DEFINITIONS FOR PP ASSEMBLER ***
31380        B873          PPBASE EQU    *
31390        B800          PPBAS2 EQU    PPBASE/256*256
31400        0000          FR     EQU   0         FETCH REG X TO A1, A1DC
31410        0020          SR     EQU   $20       STORE A1 IN REG X
31420        8800          JUMP   EQU   $4000-PPBAS2
31430        9800          CALL   EQU   $5000-PPBAS2
31440        0060          LSAR   EQU   $60       X TO SAR
31450        0070          LKEY   EQU   $70       MASTER KEY X TO KEYREG
31460        00A0          E12    EQU   $A0       EXCHANGE A1,A2; A1DC,A2DC
31470        00A1          E13    EQU   $A1       EXCHANGE A1,A3; A1DC,A3DC
31480        00A2          E14    EQU   $A2       EXCHANGE A1,A4; A1DC,A4DC
31490        00A3          T12    EQU   $A3       TRANSFER A1 TO A2; A1DC TO A2
31500        00A4          CL1    EQU   $A4       CLEAR A1, A1DC
31510        00A5          XOR32  EQU   $A5       A3 XOR A2 TO A2
31520        00A6          INC1   EQU   $A6       INCREMENT A1
31530        00A7          DEC1   EQU   $A7       DECREMENT A1
31540        00A8          RAND2  EQU   $A8       RANDOM REGISTER TO A2
31550        00A9          A1SAR  EQU   $A9       A1DC TO SAR
31560        00AA          A2SAR  EQU   $AA       A2DC TO SAR
31570        00AB          SAR1   EQU   $AB       SAR TO A1DC
31580        00AC          ISAR   EQU   $AC       INCREMENT SAR
31590        00AD          DSAR   EQU   $AD       DECREMENT SAR
31600        00AE          ESAR   EQU   $AE       EXCHANGE SAR AND SAR2
31610        00AF          CSAR   EQU   $AF       16-SAR TO SAR
31620        00B0          SAR2   EQU   $B0       SAR TO A2DC
31630        00B1          CL2    EQU   $B1       CLEAR A2, A2DC
31640        00B2          S1R    EQU   $B2       SHIFT A1 RIGHT BY SAR
31650        00B3          S1L    EQU   $B3       SHIFT A1 LEFT BY SAR
31660        00B4          S1LCOM EQU   $B4       SHIFT A1 LEFT BY 16-SAR
31670        00B5          S12L   EQU   $B5       SHIFT A2,A1 LT W/O A2 OVERFLO
```

```
31680      00B6      S2R      EQU      $B6       SHIFT A2 RIGHT BY SAR
31690      00B7      S2L      EQU      $B7       SHIFT A2 LEFT BY SAR
31700      00B9      SKP1Z    EQU      $B9       SKIP (2) IF A1 = 0
31710      00BA      SKP12    EQU      $BA       SKIP IF A2 = A1
31720      00BB      SKPSZ    EQU      $BB       SKIP IF SAR = 0
31730      00BC      SKPS16   EQU      $BC       SKIP IF SAR = 16
31740      00BD      SKPSS2   EQU      $BD       SKIP IF SAR = SAR2
31750      00D4      SKP1G2   EQU      $D4       SKIP IF L.S. BYTE A1 LESS THA
31760      00BE      SKPAUT   EQU      $BE       SKIP IF AUTH. FLAG SET
31770      00BF      AUTHSE   EQU      $BF       SET AUTH. FLAG
31780      00C4      AUTHCL   EQU      $C4       CLEAR AUTH. FLAG
31790      00C0      ENCR     EQU      $C0       ENCRYPT A2, RESULT TO A3, 16
31800      00C1      DECR     EQU      $C1       DECRYPT A2, RESULT TO A3, 16
31810      00C2      LKEY3    EQU      $C2       A3 TO KEY REGISTER
31820      00C3      PARPIC   EQU      $C3       PARTIAL PIC OF A2 TO A3, 2 TO
31830      C500      SETRF1   EQU      $C500     SET RIGISTER FLAGS, FIRST BYT
31840      C600      SETRF2   EQU      $C600     SET REGISTER FLAGS, SECOND BY
31850      C700      SETRF3   EQU      $C700     SET REGISTER FLAGS, THIRD BYT
31860      C900      OMSG1    EQU      $C900     PREPARE OUTPUT MESSAGE #XX FO
31870      CA00      OMSG2    EQU      $CA00     AS ABOVE, DEVICE 2
31880      CB00      OMSG3    EQU      $CB00     AS ABOVE, DEVICE 3
31890      CC00      OMSG4    EQU      $CC00     AS ABOVE, DEVICE 4
31900      00C8      CLRRF    EQU      $C8       CLEAR ALL REGISTER FLAGS
31910      00CD      CVDEC    EQU      $CD       CONVERT A3 TO DECIMAL, RESULT
31920      00CE      DECADD   EQU      $CE       PER-DIGIT DECIMAL ADD, A2+A3>
31930      00CF      DECSUB   EQU      $CF       PER-DIGIT DECIMAL SUBTRACT, A
31940      00D0      SRTN     EQU      $D0       SUBROUTINE RETURN
31950      00D2      EXIT     EQU      $D2       EXIT PP
31960      D300      LOAD1    EQU      $D300     LOAD XX INTO L.S. BYTE OF A1
31970      00D5      SRTNSK   EQU      $D5       RETURN FROM SUBROUTINE, SKIPP
31980      00D6      INC2B1   EQU      $D6       INCREMENT A1 BY $100
31990      00D7      CLA1D    EQU      $D7       CLEAR A1, LEAVE A1DC UNCHANGE
32000      00D8      S12LU    EQU      $D8
32010      00D9      LKEYI    EQU      $D9       LOAD INTERCHANGE KEY TO KEYRE
32020      00DC      SKEYI    EQU      $DC       STORE INX KEY FROM A1
32030      00DA      CASE16   EQU      $DA       JUMP TO CODE F(R16)
32040      00DB      CASE17   EQU      $DB       JUMP TO CODE F(R17)
32050      00DD      A1TSAR   EQU      $DD       A1 LSB TO SAR
32060      00B8      NOP      EQU      $B8
32070      00DE      INC1LD   EQU      $DE       INCR A1 LSB IN DECIMAL
32080      00DF      DEC1LD   EQU      $DF       DECR A1 LSB IN DECIMAL
32090                *END OF PP INSTRUCTION DEFINITIONS
32100                *
32110                ***************************************************
32120                *MASTER KEYS:
32130 A0B4                     ORG      MASKEY
32140 A0B4 88D5                FDB      $88D5,$5E54,$83EA,$48FD  MK0
      A0B6 5E54
      A0B8 83EA
      A0BA 48FD
32150 A0BC 537A                FDB      $537A,$5840,$0258,$7F1C  MK1
      A0BE 5840
      A0C0 0258
      A0C2 7F1C
32160 A0C4 3055                FDB      $3055,$322A,$06DB,$971A  MK2
      A0C6 322A
      A0C8 06DB
      A0CA 971A
32170 A0CC 1AEA                FDB      $1AEA,$C325,$930C,$2BC4  MK3
      A0CE C325
      A0D0 930C
      A0D2 2BC4
32180 A0D4 DF35                FDB      $DF35,$276F,$F750,$C006  MK4 (AUTH.)
      A0D6 276F
      A0D8 F750
      A0DA C006
32190 A0DC 9592                FDB      $9592,$024D,$1FFA,$8904  MK5
      A0DE 024D
      A0E0 1FFA
      A0E2 8904
```

```
32200 A0E4 CE7A          FDB     $CE7A,$2055,$178C,$0994   MK6
     A0E6 2055
     A0E8 178C
     A0EA 0994
32210 A0EC 19D0          FDB     $19D0,$3CFA,$5495,$4F64   MK7
     A0EE 3CFA
     A0F0 5495
     A0F2 4F64
32220 A0F4 29F5          FDB     $29F5,$5150,$DA1D,$A25D   MK8  (AUTHORIZ
     A0F6 5150
     A0F8 DA1D
     A0FA A25D
32230                    *
32240 B873              ORG      RPBASE
32250              ********************************************
32260              *RP PROGRAMS
32270              ********************************************
32280              *** ISSUE PIC, PRINT MAILER ***
32290 B873 5405   PICISS FDB     CALL+VERAUT
32300 B875 4314          FDB     JUMP+NOAUTH
32310 B877 DA            FCB     CASE16
32320 B878 BAD1          FDB     PICPAN
32330 B87A BAD1          FDB     PICRAN
32340 B87C B89C          FDB     PICEAN
32350              ********************************
32360              *** RE-ISSUE PIC, PRINT MAILER ***
32370 B87E 5405   PICRIS FDB     CALL+VERAUT
32380 B880 4314          FDB     JUMP+NOAUTH
32390 B882 DA            FCB     CASE16
32400 B883 B889          FDB     PICRI1    ENCR DB VALUE
32410 B885 B897          FDB     PICRI2    CARD VALUE
32420 B887 B89C          FDB     PICEAN    ACCT NUM
32430              ** PIC REISSUE: PIC FROM ENCR DB VALUE:
32440 B889 03     PICRI1 FCB     FR+3
32450 B88A A3            FCB     T12
32460 B88B 72            FCB     LKEY+2,DECR  PIC TO A3
     B88C C1
32470 B88D 0C     PICRI3 FCB     FR+12    PIC LTH.
32480 B88E DD            FCB     A1TSAR
32490 B88F A1            FCB     E13,CSAR,S1L,S1R
     B890 AF
     B891 B3
     B892 B2
32500 B893 AF            FCB     CSAR,SAR1
     B894 AB
32510 B895 42D3          FDB     JUMP+PICRN2
32520              ** PIC REISSUE: PIC FROM CARD VALUE:
32530 B897 5344   PICRI2 FDB     CALL+DPSDC  PIC TO A1 RJ
32540 B899 A1            FCB     E13
32550 B89A 408D          FDB     JUMP+PICRI3
32560              ** PIC FROM ENCRYPTED ACCOUNT NUMBER:
32570 B89C 04     PICEAN FCB     FR+4    ACCT NUM
32580 B89D A3            FCB     T12
32590 B89E 53FB          FDB     CALL+GENPIC+1
32600 B8A0 42D3          FDB     JUMP+PICRN2
32610              ********************************************
32620              *** TERMINAL-RELATED CODE ***
32630              ********************************************
32640              *** TERMINAL TYPE 1 - BLOCK ENCRYPTED PIC ***
32650              ********************************************
32660              *LOCAL TRANSACTION*
32670 B8A2 DA     PICCPV FCB     CASE16
32680 B8A3 BA13          FDB     DPFDB,DPSDC,DPFAN
     B8A5 BB44
     B8A7 BA0F
32690 B8A9 50A2   REPVER FDB     CALL+PICCPV  PIC COMP. VAL NOW IN A1
32700 B8AB A2            FCB     E14       COMP. VAL. TO A4
32710 B8AC 5446          FDB     CALL+SDTKEY
32720 B8AE 01            FCB     FR+1,T12,DECR,E13  PT PIC TO A1
     B8AF A3
     B8B0 C1
     B8B1 A1
```

```
32730 B8B2 6A            FCB    LSAR+10,S1L,S1R  PIC ALONE RJ IN A1
      B8B3 B3
      B8B4 B2
32740 B8B5 A0    EPVER3  FCB    E12,E14  PIC VALUES IN A1,A2
      B8B6 A2
32750 B8B7 525E          FDB    CALL+PICCHK  (SKIP ON VALID)
32760 B8B9 40C1          FDB    JUMP+EPVER4  (PIC NOT VALID)
32770 B8BB 50C4          FDB    CALL+GACODE  VALID PIC: GEN ACODE
32780 B8BD 28            FCB    SR+8     ACODE TO R8
32790 B8BE CA02          FDB    OMSG2+2  ------------------
32800 B8C0 D2            FCB    EXIT
32810 B8C1 CA01  EPVER4  FDB    OMSG2+1  PIC INVALID ------------------
32820 B8C3 D2            FCB    EXIT
32830 B8C4 DB    GACODE  FCB    CASE17
32840 B8C5 BA3F          FDB    NACODE   NONE
32850 B8C7 BA37          FDB    ACODE1   ACODE R18-21
32860 B8C9 BA20          FDB    ACODE2   R22,R18-21
32870 B8CB BA3D          FDB    ACOD22   R22: SUPPLIED
32880                    ********************************
32890                    *TT1: INTERCHANGE TRANSACTION*
32900 B8CD 5446  BEPINX  FDB    CALL+SDTKEY
32910 B8CF 01            FCB    FR+1,T12,DECR,E13  A1=PT PIC
      B8D0 A3
      B8D1 C1
      B8D2 A1
32920 B8D3 4115          FDB    JUMP+IBMIX2
32930                    ********************************
32940                    *TT1: INTERCHANGE RESPONSE*
32950 B8D5 5256  BEPIXR  FDB    CALL+VRRMAC
32960 B8D7 40DC          FDB    JUMP+INVRMC
32970 B8D9 CA0D          FDB    OMSG2+13 ------------------
32980 B8DB D2            FCB    EXIT
32990 B8DC CA0L  INVRMC  FDB    OMSG2+14 INVALID RMAC ------------------
33000 B8DE D2            FCB    EXIT
33010                    ********************************
33020                    *** TERMINAL TYPE 2: IBM ATM ***
33030                    ********************************
33040                    *SUBROUTINES*
33050                    ********************************
33060                    *SUBROUTINE: IBM PIC DECRYPTION*
33070 B8DF 50FC  IBMPD   FDB    CALL+IBMCOM  GET COMM KEY
33080 B8E1 01            FCB    FR+1     GET FIRST 8 BYTES
33090 B8E2 A3            FCB    T12,DECR,E13  PSLT TO A1
      B8E3 C1
      B8E4 A1
33100 B8E5 B1            FCB    CL2,LSAP+2,S12L  MS BYTE TO A2
      B8E6 62
      B8E7 B5
33110 B8E8 A0            FCB    E12      A2 = 7 BYTES ENCR PIC
33120 B8E9 A1            FCB    E13      A3 = P.T. BYTE
33130 B8EA B6            FCB    S2R      RJ ENCR PIC BYTES
33140 B8EB 0E            FCB    FR+14    GET LAST ENCR PIC BYTE
33150 B8EC B4            FCB    S1LCOM   LJ LAST PIC BYTE
33160 B8ED B5            FCB    S12L     A2 = ENCR PIC
33170 B8EE A1            FCB    E13,SR+14  PT BYTE TO R14
      B8EF 2E
33180 B8F0 02            FCB    FR+2     GET PIN KEY
33190 B8F1 71            FCB    LKEY+1
33200 B8F2 A0            FCB    E12      ENCR PIC TO A1
33210 B8F3 C1            FCB    DECR,LKEY3  PIN KEY TO KEYREG
      B8F4 C7
33220 B8F5 A0            FCB    E12,DECR,E13  PT PIC TO A1
      B8F6 C1
      B8F7 A1
33230 B8F8 6A            FCB    LSAR+10,S1L,S1R,SRTN  CLR HIGH ORDER B
      B8F9 B3
      B8FA B2
      B8FB D0
33240                    ***SUBROUTINE: DECRYPT (MK8) IBM COMM KEY =: KEYREG*
```

```
33250 B8FC 00      IBMCOM FCB     FR+0
33260 B8FD 78             FCB     LKEY+8,T12,DECR,LKEY3,SRTN
      B8FE A3
      B8FF C1
      B900 C2
      B901 D0
33270                     ••••••••••••••••••••••••••••••••••
33280                     •••TT2: LOCAL TRANSACTION•••
33290                     •   R0 = ENCR COMM KEY, R1 = BLOCK ENCR VAL
33300                     •   R2 = ENCR PIC KEY
33310                     •   R14 = EXCESS BYTE
33320 B902 50A2    IBMVER FDB     CALL+PICCPY  PIC COMP VAL TO A1
33330 B904 A2             FCB     E14
33340 B905 50DF           FDB     CALL+IBMPD  PIC DECR.  PT PIC TO A1
33350 B907 A0             FCB     E12,E14
      B908 A2
33360 B909 525E           FDB     CALL+PICCHK
33370 B90B 40C1           FDB     JUMP+COVER4  (PIC NOT VALID)
33380 B90D 50C4           FDB     CALL+GACODE  PIC VALID: GEN ACODE:
33390 B90F 28             FCB     SR+8
33400 B910 CA1B           FDB     OMSG2+27 -------------
33410 B912 D2             FCB     EXIT
33420              •   RETURN MSG NOT GENERATED CONCURRENTLY
33430                     ••••••••••••••••••••••••••••••••••
33440                     •••TT2: INTERCHANGE TRANSACTION•••
33450 B913 50DF    IBMINX FDB     CALL+IBMPD
33460 B915 52C4    IBMIX2 FDB     CALL+AIXMAC
33470 B917 CA1F           FDB     OMSG2+31 -----------
33480 B919 D2             FCB     EXIT
33490                     ••••••••••••••••••••••••••••••••••
33500                     •••TT2: INTERCHANGE RESPONSE•••
33510                     •   R1 = DATA TO BE ENCR., R13,R18-21 PMAC
33520 B91A 5256    IBMIXP FDB     CALL+VPRMAC
33530 B91C 40DC           FDB     JUMP+INVPMC
33540 B91E 50FC           FDB     CALL+IBMCOM  VALID PMAC
33550 B920 01             FCB     FR+1,T12,ENCR,E13,SR+1
      B921 A3
      B922 C0
      B923 A1
      B924 21
33560 B925 CA13           FDB     OMSG2+19 -----------
33570 B927 D2             FCB     EXIT
33580                     ••••••••••••••••••••••••••••••
33590                     •••ENCR. IN IBM COMM KEY•••
33600                     •   R1 = DATA TO BE ENCR, R0 = ENCR COMM KEY
33610                     •   RESULT TO R1
33620 B928 50FC    IBMCEN FDB     CALL+IBMCOM
33630 B92A 01             FCB     FR+1,T12,ENCR,E13,SR+1
      B92B A3
      B92C C0
      B92D A1
      B92E 21
33640 B92F CA19           FDB     OMSG2+25 -----------
33650 B931 D2             FCB     EXIT
33660                     ••••••••••••••••••••••••••••••
33670                     •••DECRYPT IN IBM COMM KEY•••
33680 B932 50FC    IBMCDE FDB     CALL+IBMCOM
33690 B934 01             FCB     FR+1,T12,DECR,E13,SR+1
      B935 A3
      B936 C1
      B937 A1
      B938 21
33700 B939 CA19           FDB     OMSG2+25 -----------
33710 B93B D2             FCB     EXIT
33720                     ••••••••••••••••••••••••••••••
33730                     •••GEN. NEW IBM COMM KEY•••
33740                     •   IN: R2: BASE KEY IN MK1
33750                     •   OUT: R0: COMM KEY IN MK8; R2, IN BASE KEY
33760 B93C A8     IBMNCC FCB     RAND2,LKEY+3,ENCR,E13  NEW KEY TO A1
      B93D 73
      B93E C0
      B93F A1
```

```
33770 B940 A2              FCB    E14
33780 B941 5446             FDB    CALL+SDTKEY   BASE KEY
33790 B943 A2              FCB    E14,E12,ENCR,E13
      B944 A0
      B945 C0
      B946 A1
33800 B947 22              FCB    SR+2,LKEY+8,ENCR,E13,SR+0
      B948 78
      B949 C0
      B94A A1
      B94B 20
33810 B94C CA1A             FDB    DMSG2+26 -----------
33820 B94E D2              FCB    EXIT
33830         ****************************
33840         *** TERMINAL TYPE 3: DEC. ENCR PIC PAD W KEY UPDATE
33850         ****************************
33860         *TT3: LOCAL TRANSACTION*
33870         * R6 = CYC CT (TERM), R7 = CYC CT (BANK)
33880         * R8 = DEC. ENCR PIC, ACODE FOR OUTPUT
33890         * OUT: R13 = AUTHEN. CODE
33900 B94F 50A2    EPPADL  FDB    CALL+PICCPV
33910 B951 A2              FCB    E14       COMP. VAL.
33920 B952 5175             FDB    CALL+SUDKEY   KE UPDATE
33930 B954 5190             FDB    CALL+DPDECP   PT PIC TO A2
33940 B956 A2              FCB    E14
33950 B957 525E             FDB    CALL+PICCHK
33960 B959 4161             FDB    JUMP+EPPDL1  (PIC INVALID)
33970 B95B 50C4             FDB    CALL+GACODE
33980 B95D 28              FCB    SR+8      ACODE
33990 B95E CA14             FDB    DMSG2+20 VALID PIC ----------
34000 B960 D2              FCB    EXIT
34010 B961 CA15    EPPDL1  FDB    DMSG2+21 INVALID PIC --------
34020 B963 D2              FCB    EXIT
34030         ****************************
34040         *TT3: INTERCHANGE TRANS.*
34050 B964 5175    EPPADI  FDB    CALL+SUDKEY
34060 B966 5190             FDB    CALL+DPDECP
34070 B968 A0              FCB    E12
34080 B969 52C4             FDB    CALL+AIXMAC
34090 B96B CA0B             FDB    DMSG2+11 ----------
34100 B96D D2              FCB    EXIT
34110         ****************************
34120         *TT3: INTERCHANGE RESPONSE*
34130 B96E 5256    EPPDIR  FDB    CALL+VRRMAC
34140 B970 40DC             FDB    JUMP+INVRMC
34150 B972 CA0D             FDB    DMSG2+13 ----------
34160 B974 D2              FCB    EXIT
34170         ****************************
34180         *SUBROUTINES*
34190         *UPDATE KEY: R6=CY CT TV, R7=BV*
34200 B975 5446    SUDKEY  FDB    CALL+SDTKEY
34210 B977 07              FCB    FR+7,T12,FR+6,LSAR+14
      B978 A3
      B979 06
      B97A 6E
34220 B97B 4184             FDB    JUMP+SUDK3
34230 B97D A0      SUDK1   FCB    E12,INC1LD,E12,S2L
      B97E DE
      B97F A0
      B980 B7
34240 B981 B6              FCB    S2R,ENCR,LKEY3
      B982 C0
      B983 C2
34250 B984 FA      SUDK3   FCB    SKP12
34260 B985 417D             FDB    JUMP+SUDK1
34270         * UPDATE COMPLETE, ENCR NEW KEY:
34280 B987 27              FCB    SR+7     FINAL CYCLE CT
34290 B988 A1              FCB    E13,T12  A1,A2=NEW KEY
      B989 A3
```

```
34300  B98A 71            FCB     LKEY+1,ENCR,E13,LKEY3   (RELOAD KEY)
       B98B C0
       B98C A1
       B98D C2
34310  B98E 22            FCB     SR+2,SRTN   P2=UPDATED KEY
       B98F D0
34320           *SR: TT3, DECRYPT PIC*
34330  B990 B1    DPDECP  FCB     CL2         ENCR ZEROS FOR "KEY"
34340  B991 C0            FCB     ENCR,CVDEC,CL2,LSAR+6
       B992 CD
       B993 B1
       B994 66
34350  B995 B5            FCB     S12L,LSAR+10,S1R,SR+13   R13=AUTHEN COD
       B996 6A
       B997 B2
       B998 2D
34360  B999 08            FCB     FR+8,E12,E13,DECSUB
       B99A A0
       B99B A1
       B99C CF
34370  B99D B7            FCB     S2L,S2R,SRTN   PT PIC IN A2
       B99E B6
       B99F D0
34380          ********************************
34390          *TT3: CUSTOMER PIC SEL*
34400          *  R8=MGR ENCR PIC, R10=CUST ENCR PIC,
34410          *  R3=MGR ENCR PIC FR DB (MK6), R4=ACCT ID
34420          *  R6=CYC CT FM TERM AFT. CUST PIC
34430  B9A0 03    CPSFT   FCB     FR+3,LKEY+6,T12,DECR,E13   MGR PIC COMP
       B9A1 76
       B9A2 A3
       B9A3 C1
       B9A4 A1
34440  B9A5 6A            FCB     LSAR+10,S1L,S1R,E14,FR+6
       B9A6 B3
       B9A7 B2
       B9A8 A2
       B9A9 06
34450  B9AA DF            FCB     DEC1LD,SR+6   MGR PIC PRECEDES CUST
       B9AB 26
34460  B9AC 5175          FDB     CALL+SUDKEY
34470  B9AE 5190          FDB     CALL+DPDECP   MGR PIC TO A2
34480  B9B0 A2            FCB     E14
34490  B9B1 BA            FCB     SKP12
34500  B9B2 41C2          FDB     JUMP+CPSFT2   (MGR PIC INVALID)
34510          *  MGR PIC VALID, DECR CUST PIC:
34520  B9B4 0A            FCB     FR+10       R10 (CUS PIC) TO R8
34530  B9B5 28            FCB     SP+8
34540  B9B6 06            FCB     FR+6,INC1LD,SR+6   RESTORE R6
       B9B7 DE
       B9B8 26
34550  B9B9 5175          FDB     CALL+SUDKEY
34560  B9BB 5190          FDB     CALL+DPDECP   PT CUST PIC TO A2
34570  B9BD 04            FCB     FR+4,E12,SP+18
       B9BE A0
       B9BF 32
34580  B9C0 4322          FDB     JUMP+CUSPI1
34590  B9C2 CA18  CPSFT2  FDB     DMSG2+24  MGR PIC INVAL.----------
34600  B9C4 D2            FCB     EXIT
34610          ********************************
34620          *TT3: MGR PIC SEL FROM TERM*
34630  B9C5 5405  MPSFT   FDB     CALL+VERAUT,JUMP+MPSFT1
       B9C7 41D4
34640  B9C9 5175          FDB     CALL+SUDKEY,CALL+DPDECP
       B9CB 5190
34650  B9CD 76            FCB     LKEY+6,ENCR,E13,SR+3
       B9CE C0
       B9CF A1
       B9D0 23
34660  B9D1 CA16          FDB     DMSG2+22 -------------
34670  B9D3 D2            FCB     EXIT
34680  B9D4 C90F  MPSFT1  FDB     DMSG1+15  NOT AUTH ---------
```

```
34690 B9D6 CA10          FDB     DMSG2+16 -------------
34700 B9D8 D2            FCB     EXIT
34710          ****************************
34720          *** INTERCHANGE MESSAGE RECEIVED BY ISSUER ***
34730          ****************************
34740          * R18-22,R13:RMAC
34750          *
34760 B9D9 50A2  IIXMAC  FDB     CALL+PICCPV
34770 B9DB A2            FCB     E14       COMP VAL
34780 B9DC D9            FCB     LKEYI
34790 B9DD 52B1          FDB     CALL+AUTMG3  ENCR PIC IN A2
34800 B9DF C1            FCB     DECR,E13,LSAR+10,S1L,S1R
      B9E0 A1
      B9E1 6A
      B9E2 B3
      B9E3 B2
34810 B9E4 A3            FCB     T12,E14
      B9E5 A2
34820 B9E6 525E          FDB     CALL+PICCHK
34830 B9E8 4203          FDB     JUMP+IIXMC2 (PIC INVALID)
34840 B9EA 50C?          FDB     CALL+GACODE  VALID, GEN ACODE =:A1
34850 B9EC A9            FCB     A1SAR,SKPSZ  CK IF ACODE EXISTS
      B9ED BB
34860 B9EE 41F2          FDB     JUMP+IIXMC3 ("YES")
34870 B9F0 41FD          FDB     JUMP+IIXMC4 (NO: GEN RMAC)
34880          * ACODE EXISTS: COMBINE WITH R20:
34890 B9F2 A3   IIXMC3   FCB     T12,FR+20,E12,LSAR+10
      B9F3 14
      B9F4 A0
      B9F5 6A
34900 B9F6 B3            FCB     S1L,LSAR+6
      B9F7 66
34910 B9F8 B5            FCB     S12L,NOP,NOP,E12,SR+20
      B9F9 B3
      B9FA B8
      B9FB A0
      B9FC 34
34920 B9FD 5241  IIXMC4  FDB     CALL+GNRMAC  GENERATE RMAC =:A1
34930 B9FF 2D            FCB     SR+13
34940 BA00 CA0C          FDB     DMSG2+12 OUTPUT RMAC ----------
34950 BA02 D2            FCB     EXIT
34960 BA03 CA01  IIXMC2  FDB     DMSG2+1   INVALID PIC REC --------
34970 BA05 D2            FCB     EXIT
34980          ****************************
34990          *** LOAD INTERCHANGE KEY ***
35000          * R2 = INX KEY ENCR IN MK5:
35010 BA06 02   LIXKEY   FCB     FR+2,LKEY+5,T12,DECR
      BA07 75
      BA08 A3
      BA09 C1
35020 BA0A A1            FCB     E13,SKEYI
      BA0B DC
35030 BA0C CA1C          FDB     DMSG2+28 -------------
35040 BA0E D2            FCB     EXIT
35050          ****************************
35060          *** SUBROUTINES ******
35070          ****************************
35080          *SR: DETERMINE PIC FM ACCT NUM*
35090 BA0F 04   DPFAN    FCB     FR+4,T12
      BA10 A3
35100 BA11 43FB          FDB     JUMP+GENPIC+1  PIC IN A1
35110          *SR: DETER. PIC FM ENCR DATA BASE VALUE*
35120 BA13 03   DPFDB    FCB     FR+3,LKEY+2,T12,DECR
      BA14 72
      BA15 A3
      BA16 C1
35130 BA17 A1            FCB     E13,LSAR+10,CL2,S12L,E12
      BA18 6A
      BA19 B1
      BA1A B5
      BA1B A0
```

```
35140  BA1C 24            FCB     SR+4,E12,S1R,SRTN   ACCT NUM=R4,A1=PIC
       BA1D A0
       BA1E B2
       BA1F D0
35150                  *SR: GEN ACODE ON R22,R18-21*
35160  BA20 78     ACODE2 FCB    LKEY+8,CL2,CL1,E13,FR+22
       BA21 B1
       BA22 A4
       BA23 A1
       BA24 16
35170  BA25 53CF          FDB    CALL+SRMAC
35180  BA27 12     ACODE3 FCB    FR+18

35190  BA28 53CF          FDB    CALL+SRMAC
35200  BA2A 13            FCB    FR+19
35210  BA2B 53CF          FDB    CALL+SRMAC
35220  BA2D 14            FCB    FR+20
35230  BA2E 53CF          FDB    CALL+SRMAC
35240  BA30 15            FCB    FR+21
35250  BA31 53DA          FDB    CALL+SRMACF  RESIDUE IN A3
35260  BA33 CD            FCB    CVDEC,LSAR+10,S1R,SRTN   ACODE IN A1
       BA34 6A
       BA35 B2
       BA36 D0
35270                  *SR: GEN ACODE ON R18-21*
35280  BA37 78     ACODE1 FCB    LKEY+8,CL2,CL1,E13
       BA38 B1
       BA39 A4
       BA3A A1
35290  BA3B 4227          FDB    JUMP+ACODE3
35300                  *SR: ACODE SUPPLIED IN R22*
35310  BA3D 16     ACOD22 FCB    FR+22,SRTN
       BA3E D0
35320                  *SR: NO ACODE*
35330  BA3F A4     NACODE FCB    CL1,SRTN
       BA40 D0
35340                  *SR: GENERATE RMAC*
35350  BA41 D9     GNRMAC FCB    LKEYI,CL2,CL1,E13,FR+18
       BA42 B1
       BA43 A4
       BA44 A1
       BA45 12
35360  BA46 53CF          FDB    CALL+SRMAC
35370  BA48 13            FCB    FR+19
35380  BA49 53CF          FDB    CALL+SRMAC
35390  BA4B 14            FCB    FR+20
35400  BA4C 53CF          FDB    CALL+SRMAC
35410  BA4E 15            FCB    FR+21
35420  BA4F 53DA          FDB    CALL+SRMACF
35430  BA51 A1            FCB    E13,LSAR+10,S1L,S1R
       BA52 6A
       BA53 B3
       BA54 B2
35440  BA55 D0            FCB    SRTN      RMAC IN A1 (6 DIG HEX)
35450                  *SR: VERIFY RMAC (ACQUIRER), SKIP IF OK*
35460  BA56 5241   VRRMAC FDB    CALL+GNRMAC
35470  BA58 A3            FCB    T12,FR+13,SKP12,SRTN,NOP,SRTNSK
       BA59 0D
       BA5A BA
       BA5B D0
       BA5C B8
       BA5D D5
35480                  ******END OF NEW CODE 11/19/77*****
35490                  *SR: CHECK PIC,SKIP IF OK, PP CK IF NOT*
35500  BA5E BA     PICCHK FCB    SKP12
35510  BA5F 4264          FDB    JUMP+INVPIC
35520                  * PIC OK: RTNSK:
35530  BA61 D7            FCB    CLA10
35540  BA62 29            FCB    CR+9      CLEAR P9
35550  BA63 D5            FCB    SRTNSK
35560                  * INVALID PIC:
```

```
25860 BA83 D0              FCB     SRTN
36260                *MESSAGE AUTHENTICATION SUBROUTINE
36270                *  R1  = ENCRYPTED PIC/MAC (TERMINAL KEY)
36280                *  R2  = ENCR TERM KEY
36290                *  R11 = ACCOUNT NUMBER
36300                *  R12 = AMOUNT
36310                *  R13 = TERMINAL ID
36320                *  R14 = TRANSATION SEQUENCE NUMBER
36330 BAAF 5446     AUTHMG  FDB     CALL+SDTKEY   GET TERM KEY
36340 BAB1 A4       AUTMG3  FCB     CL1,E13
      BAB2 A1
36350 BAB3 B1       AUTMG2  FCB     CL2,FR+18
      BAB4 12
36360 BAB5 53CF             FDB     CALL+SRMAC
36370 BAB7 13               FCB     FR+19
36380 BAB8 53CF             FDB     CALL+SRMAC
36390 BAB9 14               FCB     FR+20
36400 BABB 53CF             FDB     CALL+SRMAC
36410 BABD 15               FCB     FR+21
36420 BABE 53DA             FDB     CALL+SRMACF
36430 BAC0 01               FCB     FR+1      FETCH MAC
36440 BAC1 A3               FCB     T12
36450 BAC2 A5               FCB     XOR32
36460                *  A2 = ENCRYPTED PIC
36470 BAC3 D0               FCB     SRTN
36480                *SR: ACQUIRER INX MSG: GEN MAC*
36490 BAC4 D9       AIXMAC  FCB     LKEYI
36500 BAC5 64               FCB     LSAR+4,S1L,S1R   CLR. DIGITS FOR KEY CH
      BAC6 B3
      BAC7 B2
36510 BAC8 A0               FCB     E12,ENCR,E13,SR+1  PIC IN INX KEY
      BAC9 C0
      BACA A1
      BACB 21
36520 BACC 52B1             FDB     CALL+AUTMG3
36530 BACE A0               FCB     E12,SR+1
      BACF 21
36540 BAD0 D0               FCB     SRTN
36550                ***************************************************
36560                *PIC MANAGEMENT:
36570                *  1. VERIFY AUTHORIZATION
36580                *  2. GEN. BANK ASSIGNED RANDOM PIC:
36590 BAD1 53FA     PICRAN  FDB     CALL+GENPIC
36600 BAD3 32       PICRN2  FCB     SR+18     PT PIC =:R18
36610                *  3. GENERATE PARTIAL PIC
36620 BAD4 A3               FCB     T12,PARPIC,E13,SR+11
      BAD5 C3
      BAD6 A1
      BAD7 2B
36630                *  4. GEN. ENCR ACC'T REF NUM:
36640 BAD8 04               FCB     FR+4      R4=ACCT ID
36650 BAD9 5409             FDB     CALL+DECENC
36660 BADB 25               FCB     SR+5      DECIMAL ENCR ACCT ID
36670 BADC C905             FDB     DMSG1+5   PRINT PIC MAILER
36680 BADE C906             FDB     DMSG1+6   ----------
36690                *  5. ENCRYPT PIC FOR DATA BASE
36700 BAE0 04               FCB     FR+4      ACCT ID
36710 BAE1 A3               FCB     T12,LKEY+2,FR+18   LD KEY, GET PT PIC
      BAE2 72
      BAE3 12
36720 BAE4 543E             FDB     CALL+ENCPIC
36730 BAE6 23               FCB     SR+3      R3 = ENCR PIC (MASTER KEY)
36740 BAE7 52EB             FDB     CALL+EPSDC
36750 BAE9 430D             FDB     JUMP+PICRN3
36760                *ENCRYPT PIC FOR STORAGE ON CARD*
36770 BAEB 12       EPSDC   FCB     FR+18     PT PIC
36780 BAEC B1               FCB     CL2,LSAR+8,S1L,LSAR+4,S12L
      BAED 68
      BAEE B3
      BAEF 64
      BAF0 B5
```

```
36790 BAF1 6C        FCB    LSAR+12,S1R,E12   START WITH LST
      BAF2 B2
      BAF3 A0
36800 BAF4 A2        FCB    E14,LKEY+2
      BAF5 72
36810 BAF6 5335      FDB    CALL+EPSDCS
36820 BAF8 CE        FCB    DECADD
36830 BAF9 5335      FDB    CALL+EPSDCS
36840 BAFB CE        FCB    DECADD,E14,E12,S1L,LSAR+4
      BAFC A2
      BAFD A0
      BAFE B3
      BAFF 64
36850 BB00 D0        FCB    SAR2,S12L,E12,E14,FR+4   ACCT ID
      BB01 B5
      BB02 A0
      BB03 A2
      BB04 04
36860 BB05 533D      FDB    CALL+EPSDCT
36870 BB07 A2        FCB    E14,E12,DECADD,E12,SR+15  ENC. PIC FOR
      BB08 A0
      BB09 CE
      BB0A A0
      BB0B 2F
36880 BB0C D0        FCB    SRTN
36890 BB0D D7 PICRN3 FCB    CLA10,LSAR+8,SAR1,SR+18   CLR PT PIC
      BB0E 68
      BB0F AB
      BB10 32
36900 BB11 CA16      FDB    OMSG2+22 ENCR PIC TO CPU --------
36910 BB13 D2        FCB    EXIT
36920 BB14 CA08 NOAUTH FDB  OMSG2+8   NO AUTHORIZATION
36930 BB16 D2        FCB    EXIT
36940              * 6. PROCESS CUSTOMER-SELECTED PIC:
36950 BB17 05 CUSPIC FCB    FR+5
36960 BB18 5416      FDB    CALL+DECDCR
36970 BB1A 24        FCB    SR+4      ACCT ID =: F4
36980 BB1B 6A        FCB    LSAR+10   LTH OF ACCT ID
36990              *   VERIFY TWO MS DIGITS = 0
37000 BB1C A3        FCB    T12,S1R,SKP1Z
      BB1D B2
      BB1E B9
37010 BB1F 4332      FDB    JUMP+CPL12  NOT VALID
37020              *   ENCRYPT PIC CONCAT. WITH ACCT ID
37030 BB21 12        FCB    FR+18     PT PIC
37040 BB22 72 CUSPI1 FCB    LKEY+2
37050 BB23 543E      FDB    CALL+ENCPIC
37060 BB25 23        FCB    SR+3
37070 BB26 52EB      FDB    CALL+EPSDC  GEN ENC PIC FOR CARD
37080 BB28 12        FCB    FR+18,T12,CLA10,SR+18  CL PT PIC
      BB29 A3
      BB2A D7
      BB2B 32
37090 BB2C C3        FCB    PARPIC,E13,SR+11   GEN, STO PAR PIC
      BB2D A1
      BB2E 2B
37100 BB2F CA17      FDB    OMSG2+23 OUT. TO CPU --------
37110 BB31 D2        FCB    EXIT
37120              * ACC'T ID NOT VALID*
37130 BB32 C909 CPL12 FDB   OMSG1+9
37140 BB34 D2        FCB    EXIT
37150              *SR: GEN 4 DEC DIGIT ENCR VALUE*
37160 BB35 C0 EPSDCS FCB    ENCR,E12,E14,E12  (E24)
      BB36 A0
      BB37 A2
      BB38 A0
37170 BB39 CD        FCB    CVDEC,S1R,E13,SRTN
      BB3A B2
      BB3B A1
      BB3C D0
37180              *SR: ENCR ACCT ID*
```

```
37190 BB3D A3    EPSDCT FCB   T12,ENCR,CVDEC,LSAR+8
      BB3E C0
      BB3F CD
      BB40 68
37200 BB41 B2           FCB   S1R,E13,SRTN  RSLT TO A3
      BB42 A1
      BB43 D0
37210                 *SP: DECR PIC FROM CARD*
37220 BB44 04    DPSDC  FCB   FR+4,LKEY+2   (ACCT. ID)
      BB45 72
37230 BB46 533D         FDB   CALL+EPSDCT
37240 BB48 0F          FCB   FR+15,T12,DECSUB,E12  (R15=ENC PIC FM
      BB49 A3
      BB4A CF
      BB4B A0
37250 BB4C B1          FCB   CL2,LSAR+8,S1L,LSAR+4
      BB4D 68
      BB4E B3
      BB4F 64
37260 BB50 B5          FCB.  S12L,LSAR+12,S1R,E14
      BB51 6C
      BB52 B2
      BB53 A2
37270 BB54 72          FCB   LKEY+2
37280 BB55 5335        FDB   CALL+EPSDCS
37290 BB57 CF          FCB   DECSUB
37300 BB58 5335        FDB   CALL+EPSDCS
37310 BB5A CF          FCB   DECSUB,E14,S1L,LSAR+4,SAR2
      BB5B A2
      BB5C B3
      BB5D 64
      BB5E B0
37320 BB5F B5          FCB   S12L,E12,SRTN  PT PIC IN A1, RJ
      BB60 A0
      BB61 D0
37330                 **********************************************
37340                 *ENTER AND CHECK AUTHORIZATION CODES:
37350 BB62 01    AUTSET FCB   FR+1,T12,FR+2,E13
      BB63 A3
      BB64 02
      BB65 A1
37360 BB66 A5          FCB   XOR32,E12,E13,LKEY3
      BB67 A0
      BB68 A1
      BB69 C2
37370 BB6A B1          FCB   CL2,ENCR,E13,E14,LKEY+4
      BB6B C0
      BB6C A1
      BB6D A2
      BB6E 74
37380 BB6F C0          FCB   ENCR,E13,E12,E14
      BB70 A1
      BB71 A0
      BB72 A2
37390 BB73 BA          FCB   SKP12
37400 BB74 4384        FDB   JUMP+AUTHDL
37410 BB76 BF          FCB   AUTHSE
37420 BB77 D7          FCB   CLA10,CF+1,CF+2  CLR AUTH CODES
      BB78 21
      BB79 22
37430                 * AUTHCK MUST FOLLOW IMMEDIATELY:
37440                 *CHECK AUTHORIZATION CODES:
37450                 * R1 = FIRST AUTHORIZATION CODE
37460                 * R2 = SECOND AUTHORIZATION CODE
37470 BB7A 5405  AUTHCK FDB   CALL+VERAUT
37480 BB7C 4381        FDB   JUMP+INAUTH
37490 BB7E C90A        FDB   DMSG1+10
37500 BB80 D2          FCB   EXIT
37510 BB81 C908  INAUTH FDB   DMSG1+8    NOT AUTHORIZED
37520 BB83 D2          FCB   EXIT
37530                 *DELETE AUTHORIZATION:
```

```
37540 BB84 C4       AUTHDL FCB    AUTHCL
37550 BB85 437A            FDB    JUMP+AUTHCK
37560                *DEBUG USE: BLOCK ENCR PIC IN TK*
37570 BB87 5446     DEBUG1 FDB    CALL+SDTKEY
37580 BB89 01              FCB    FR+1,T12,ENCR,E13,SR+1
      BB8A A3
      BB8B C0
      BB8C A1
      BB8D 21
37590 BB8E C920            FDB    OMSG1+32 --------
37600 BB90 D2              FCB    EXIT
37610                ***********
37620                *GENERATE TERMINAL KEY*
37630 BB91 A8       GENKEY FCB    RAND2,LKEY+3,ENCR  NEW KEY
      BB92 73
      BB93 C0
37640 BB94 A1              FCB    E13,SR+1  P.T. KEY
      BB95 21
37650 BB96 C912            FDB    OMSG1+18
37660 BB98 A3              FCB    T12,LKEY+1,ENCR  ENCR IN MK1
      BB99 71
      BB9A C0
37670 BB9B A1              FCB    E13,SR+1
      BB9C 21
37680 BB9D CA11            FDB    OMSG2+17
37690 BB9F D2              FCB    EXIT
37700                **********************************************
37710                *  SUBROUTINE:  GENERATE ACODE:
37720 BBA0 D7       ACODE  FCB    CLA10,SR+1
      BBA1 21
37730 BBA2 78              FCB    LKEY+8
37740 BBA3 52B1            FDB    CALL+AUTMG3
37750 BBA5 A0              FCB    E12,E13,CVDEC
      BBA6 A1
      BBA7 CD
 7760 BBA8 A3              FCB    T12
 7770 BBA9 6A              FCB    LSAR+10,S2R,S2L  6 DEC. DIGIT ACODE IN
      BBAA F6
      BBAB B7
37780 BBAC 14              FCB    FR+20,E12  COMBINE WITH TT
      BBAD A0
37790 BBAE 66              FCB    LSAR+6,S12L
      BBAF E5
37800 BBB0 B8              FCB    NOP,NOP
      BBB1 B8
37810 BBB2 A0              FCB    E12,SR+20
      BBB3 34
37820 BBB4 D0              FCB    SRTN
37830                *  VERIFY ACODE:
37840 BBB5 14       VACODE FCB    FR+20,SR+0
      BBB6 20
37850 BBB7 66              FCB    LSAR+6,S1R
      BBB8 B2
37860 BBB9 A9              FCB    A1SAR,DSAR,DSAR,DSAR
      BBBA AD
      BBBB AD
      BBBC AD
37870 BBBD AD              FCB    DSAR,DSAR,DSAR,SAR1
      BBBE AD
      BBBF AD
      BBC0 AB
37880 BBC1 34              FCB    SR+20    ELIM ACODE FM R20
37890 BBC2 53A0            FDB    CALL+ACODE
37900 BBC4 A3              FCB    T12,FR+0,SKP12  TEST ACODE
      BBC5 00
      BBC6 EA
37910 BBC7 43CC            FDB    JUMP+INVACO  ACODE NOT VALID
37920 BBC9 CA1D            FDB    OMSG2+29 CODE VALID ---------
37930 BBCB D2              FCB    EXIT
```

```
37940 BBCC CA1E   INVACO FDB    OMSG2+30 ACODE INVAL. --------
37950 BBCE D2            FCB    EXIT
37960            ****************************************************
37970            *CP SUBROUTINES
37980            ****************************************************
37990            * MAC SUBROUTINE
38000            *   A3 = RESIDUE
38010            *   A1 = NEW VALUE
38020 BBCF A9    SRMAC  FCB    A1SAR,S1LCOM,S12L,SRTN,NOP
      BBD0 B4
      BBD1 B5
      BBD2 D0
      BBD3 B8
38030            *    COMBINE WITH RESIDUE, ENCRYPT:
38040 BBD4 A5           FCB    XOR32,ENCR,CL2,A1SAR
      BBD5 C0
      BBD6 B1
      BBD7 A9
38050 BBD8 B5           FCB    S12L,SRTN  LOAD REST OF 1 INTO 2
      BBD9 D0
38060            * FINAL REGISTER, MAC GENERATION
38070 BBDA A9    SRMACF FCB    A1SAR,S1LCOM,S12L
      BBDB B4
      BBDC B5
38080 BBDD 43E7         FDB    JUMP+MACPAD
38090            *  A2 FILLED:
38100 BBDF A5           FCB    XOR32,ENCR,CL2,A1SAR,SKPSZ
      BBE0 C0
      BBE1 B1
      BBE2 A9
      BBE3 BB
38110 BBE4 43E7         FDB    JUMP+MACPAD
38120 BBE6 D0           FCB    SRTN    (NO DIGITS LEFT)
38130            *  PAD REMAINDER OF REGISTER WITH ZEROS
38140 BBE7 A9    MACPAD FCB    A1SAR,S12L,,A2SAR,CSAR
      BBE8 B5
      BBE9 00
      BBEA AA
      BBEB AF
38150 BBEC B7           FCB    S2L,XOR32,ENCR,SRTN
      BBED A5
      BBEE C0
      BBEF D0
38160            *   FINAL RESIDUE IS LEFT IN A3
38170            * IF PARPIC A1 = PARPIC A2, SKIP
38180 BBF0 C3    SCKPP  FCB    PARPIC,T12,E13,PARPIC
      BBF1 A3
      BBF2 A1
      BBF3 C3
38190 BBF4 A3           FCB    T12,E13,SKP12,SRTN
      BBF5 A1
      BBF6 BA
      BBF7 D0
38200 BBF8 B8           FCB    NOP,SRTNSK
      BBF9 D5
38210            * PIC MANAGEMENT SUBROUTINES **********
38220            * 1. GENERATE PIC =: A1
38230 BBFA A8    GENPIC FCB    RAND2,LKEY+3,FR+12  R12=PIC LTH
      BBFB 73
      BBFC 0C
38240 BBFD DD           FCB    A1TSAR,ENCR,CVDEC,CSAR
      BBFE C0
      BBFF CD
      BC00 AF
38250 BC01 B2           FCB    S1R,CSAR,SAR1,SRTN
      BC02 AF
      BC03 AB
      BC04 D0
38260            * 2. VERIFY AUTHORIZATION. SKIP ON RTN IF OK
38270 BC05 BE    VERAUT FCB    SKPAUT,SRTN,NOP,SRTNSK
      BC06 D0
      BC07 B8
      BC08 D5
```

```
38280              * 3. DECIMAL ENCRYPT OF 12 DIGITS IN A1
38290 BC09 542C  DECENC FDB    CALL+DEDPRE
38300 BC0B 5436         FDB    CALL+DEDLOP
38310 BC0D CE           FCB    DECADD
38320 BC0E 5436         FDB    CALL+DEDLOP
38330 BC10 CE           FCB    DECADD
38340 BC11 5436         FDB    CALL+DEDLOP
38350 BC13 CE           FCB    DECADD
38360 BC14 4423         FDB    JUMP+DEDEND
38370              * 4. DECIMAL DECRYPT OF 12 DIGITS IN A1
38380 BC16 542C  DECDCR FDB    CALL+DEDPRE
38390 BC18 5436         FDB    CALL+DEDLOP
38400 BC1A CF           FCB    DECSUB
38410 BC1B 5436         FDB    CALL+DEDLOP
38420 BC1D CF           FCB    DECSUB
38430 BC1E 5436         FDB    CALL+DEDLOP
38440 BC20 CF           FCB    DECSUB
38450 BC21 4423         FDB    JUMP+DEDEND
38460              *    END OF ENCRYPT/DECRYPT
38470 BC23 A2    DEDEND FCB    E14,E12,LSAR+10,S1L
      BC24 A0
      BC25 6A
      BC26 B3
38480 BC27 66           FCB    LSAR+6,SAR2,S12L,E12,SRTN
      BC28 B0
      BC29 B5
      BC2A A0
      BC2B D0
38490              *    PREPARE FOR ENCRYPT/DECRYPT
38500 BC2C B1    DEDPRE FCB    CL2,LSAR+4,S1L,LSAR+6
      BC2D 64
      BC2E B3
      BC2F 66
38510 BC30 D8           FCB    S12LU,LSAR+10,S1R
      BC31 6A
      BC32 B2
38520 BC33 A2           FCB    E14,LKEY+7,SRTN
      BC34 77
      BC35 D0
38530              *    A2 HAS 6 MS DIGITS, A4 6 LS DIGITS
38540              *    DECIMAL ENCRYPT/DECRYPT LOOP
38550 BC36 C0    DEDLOP FCB    ENCR,E12,E14,E12
      BC37 A0
      BC38 A2
      BC39 A0
38560 BC3A CD           FCB    CVDEC,S1R,E13,SRTN
      BC3B B2
      BC3C A1
      BC3D D0
38570              * 5. CONCATENATE PIC WITH ACCT ID AND ENCRYPT
38580              *    A1 = PLAIN PIC; A2 = ACCT ID; KEYREG = KEY
38590              *    RESULT TO A1
38600 BC3E 6A    ENCPIC FCB    LSAR+10,S1L,LSAR+6,S12LU
      BC3F B3
      BC40 66
      BC41 D8
38610 BC42 C0           FCB    ENCR,CVDEC,E13,SRTN
      BC43 CD
      BC44 A1
      BC45 D0
38620              * 6. DECRYPT R2 (TERM KEY) WITH MK1 =: KEYREG
38630 BC46 02    SDTKEY FCB    FR+2,LKEY+1,T12
      BC47 71
      BC48 A3
38640 BC49 C1           FCB    DECR,LKEY3,SRTN
      BC4A C2
      BC4B D0
38650 BC4C 0064         RMB    100
38660 BCB0 0003  DESENC RMB    3
38670 BCB3 0003  DESDEC RMB    3
38680              *FOR IRO*
```

```
38690 CFF8                ORG     $CFF8
38700 CFF8 A46B           FDB     PROIPØ
38710 FF00                ORG     $FF00
38720 FF00 CFFF           FDB     $CFFF
38730                     END
```

TOTAL ERRORS 00000

M6800 ASSEMBLER VERSION 1.2
ENTER PASS : 1P,1S,2P,2L,2T

APPENDIX II

0X  | REG X ⟶ A1 RT JST. NUM OF
    | DIGITS IN REG X ⟶ A1DC

1X  | REG 16 + X ⟶ A1 RT JST. NUM DIGITS
    | IN REG ⟶ A1DC

2X  | A1 ⟶ REG X: NUM OF DIGITS
    | DETERMINED BY A1DC, TAKEN
    | FROM A1 RT. JST. REG.
    | OFFSET SET IN ACCORDANCE
    | WITH A1DC

3X  | A1 ⟶ REG 16 + X; OTHERWISE SAME
    | AS "2X"

4XXX | BRANCH TO BYTE : RPBASE + XXX

5XXX | CALL BYTE  RPBASE + XXX

© 1977 Interbank Card Association

| | |
|---|---|
| 6X | LOAD SAR [SHIFT AMOUNT REGISTER] WITH X |
| 7X | LOAD KEY REGISTER WITH MASTER KEY "X" |

MANIPULATE ACCUMULATORS:

| | |
|---|---|
| A0 | A1 ⟷ A2;   A1DC ⟷ A2DC |
| A1 | A1 ⟷ A3;   A1DC ⟷ A3DC |
| A2 | A1 ⟷ A4;   A1DC ⟷ A5DC |
| A3 | A1 ⟶ A2;   A1DC ⟶ A2DC |
| A4 | 0 ⟶ A1;   0 ⟶ A1DC |
| A5 | A3 X$\emptyset$R A2 ⟶ A2 |
| A6 | INCREMENT A1   (A1DC NOT CHANGED) |
| A7 | INCREMENT A1   (A1DC NOT CHANGED) |
| A8 | RANDOM REG ⟶ A2 (A2DC NOT CHANGED) |

SAR $\emptyset$PERATI$\emptyset$NS:

| | |
|---|---|
| A9 | A1DC ⟶ SAR |
| AA | A2DC ⟶ SAR |
| AB | SAR ⟶ A1DC |
| AC | INCR SAR |
| AD | DECR SAR |

| | |
|---|---|
| AE | SAR ⟷ SAR 2 |
| AF | 16 - SAR ⟶ SAR |
| B0 | SAR ⟶ A2DC |
| B1 | CLEAR A2, A2DC |

SHIFT ACCUMULATORS:

| | |
|---|---|
| B2 | A1 R BY SAR (DIGITS) |
| B3 | A1 L BY SAR |
| B4 | A1 L BY 16 - SAR |
| B5 | A2, A1 L BY SAR, OR UNTIL A2 FILLED (A2DC = 16). ADJUST A1DC AND A2DC ASSUMING A1 VALUE WAS LEFT JUSTIFIED.<br><br>IF A2DC = 16 AT COMPLETION, SKIP NEXT 2 INSTRUCTION BYTES |
| B6 | A2 R BY SAR |
| B7 | A2 L BY SAR |

CONDITIONAL SKIP:

| | |
|---|---|
| B9 | SKIP 2 IF A1 = 0 |
| BA | SKIP 2 IF A1 = A2 |
| BB | SKIP 2 IF SAR = 0 |

| | |
|---|---|
| BC | SKIP 2 IF SAR = 16 |
| BD | SKIP 2 IF SAR = SAR 2 |

ENCRYPT:

| | |
|---|---|
| C0 | ENCRYPT A2 ⟶ A3, 16 ⟶ A3DC |
| C1 | DECRYPT A2 ⟶ A3, 16 ⟶ A3DC |
| C2 | A3 ⟶ KEY REGISTER |
| C3 | PARTIAL PIC  A2 ⟶ A3,  2 ⟶ A3DC |

ØUTPUT PREPARATIØN:

| | |
|---|---|
| C5XX | SET REGFLG BITS IN FIRST BYTE (REG 0 - 7) CORRESPONDING TO BITS IN XX |
| C6XX | AS ABOVE, BUT FOR 2nd REGFLG BYTE (REG 8 - 15) |
| C7XX | AS ABOVE, BUT FOR 3rd REGFLG BYTE (REG 16 - 23) |
| C8 | CLEAR ALL REGFLG BITS |
| C9XX | PREPARE ØUTPUT MSG ※ XX  FØR DEVICE 1 |
| CAXX | SAME, DEV. 2 |
| CBXX | SAME, DEV. 3 |
| CCXX | SAME, DEV. 4 |

ØTHER:

| | |
|---|---|
| CD | CONVERT A3 TO DECIMAL ⟶ A1:<br>    START WITH A3 MSD. IF DECIMAL,<br>    ⟶ A1 MSD. CONTINUE UNTIL<br>    ALL A3 DECIMAL DIGITS USED,<br>    THEN GO THRU A3 AGAIN, USING<br>    HEX DIGITS AND SUBTRACTING<br>    HEX "A" |
| CE | PER-DIGIT DEC ADD (W/O CARRY):<br>    A2 + A3 ⟶ A2 |
| CF | PER-DIGIT DEC SUBTR (W/O BORROW)<br>    A2 - A3 ⟶ A2 |
| D0 | SUBROUTINE RETURN |
| D1 YX XX | CALL MICROCODE AT XX XX |
| D2 | EXIT |

INPUT MESSAGE PROCESSING

NEW MSG
    [A NEW MESSAGE HAS BEEN RECEIVED.
    INSPT POINTS TO FIRST CHAR. BEYOND
        STX MSG TYPE FOLLOWS]

[IF MSG. STARTS WITH SPECIAL CHAR,
        START AT "NMSGSC"]

LSD (: ISPT) → S1 [DECIMAL DIGIT]

CALL "ADVISP" [ADV INSPT TO NEXT DEC. DIGIT]

[SR]

LSD (! ISPT)→ S2: CONVERT S1 x 10 + S2 TO

HEX MSGTYP [DETERMINE MESSAGE

TYPE]   IF MSGTYP x 2≥ 1 |RØMIFE|

- |RØMIFT|   [INVALID MSG TYPE] , GO TO

ININVM [10]

NMSGSC   IS MSGTYP< "04" ?   IF YES, GO

TO SPECIAL CODE FOR THIS MESSAGE

TYPE: MSG00 [FA], MSG01 [ ], MSG02 [ ],

MSG03 [ ].
[FIND INPUT FORMAT DEFINITION FOR

THIS MESSAGE:]

IS !(|RØMIFT| + 2 x MSGTYP) = "FF"?      A

IF NO: 2 BYTES ! (|ROMIFT| +

2 x MSGTYP)→ MFASPT [START OF

MSG. FORMAT AREA] , GO TO "IN2D"

[FIRST BYTE IS "FF" - INDICATES DEFINABLE

FORMAT]

!(|RØMIFT| + (2 x MSGTYP) +1)→ S1         B

2 BYTES (!(|RAMFLT| +S1))→ MFASPT. IF MFASPT   C

=0, GO TO "INUNDF" [10]   [UNDEFINED

FORMAT]

IN2D   MFASPT +1→ FSPT [FORMAT SCAN PTR,    [

[T]

RETARDED BY 1 SO CAN BE ADVANCED ]

0→ IPFAIX   [CLEAR INDEX INTO INPUT       E

PRINT FIELD AREA]

[READY FOR NEW FIELD DEFINITION:]

| | | | |
|---|---|---|---|
| INFLDF [T,SC,GG 4M] | CALL "ADVFSP" [ADVANCE FSPT] [R3] | | |
| | JUMP TO CODE "INFØRX", WHERE X = | | |
| All others | M.S.D. ! FSPT | | |
| INFØR 4 | [4: SKIP "X" +1 CHAR. POSITIONS] | | |
| | 0→S1 [NUM. OF CHAR. POS'N IN ADDITION TO X+1] | | |
| IN3C [F] | CALL "IN3SR" [T] [S.R. USED SO SAME CODE CAN BE USED BY "PRINT" INSTR] ; | | |
| | GO TO "INFLDF" [T] | | |
| [SUBROUTINE:] | | | |
| IN3SR [T, 4] | S1 + (L.S.D. ! FSPT)→ S1; 0→CHARCT. | | |
| IN3F [T] | CALL "ADVISP" [ADV. INPUT SCAN PTR] : | | |
| | CHARCT +1→CHARCT. | | |
| | IF S1 ≠ 0 : S1-1→S1; GO TO "IN3F". | | |
| | RETURN | | |
| | [NOTE: CHARCT USED AT IN4] | | |
| INFØR 5 | [SKIP - 15 + x + 1] | | |
| | "10" → S1 | A | |
| | GO TO "IN3C" | B | |
| INFØR 6 | [SKIP 32 + x + 1] | | |
| | "20"→ S1 | C | |
| | GO TO "IN3C" | D | |

| | |
|---|---|
| INFØR 7 | [SKIP 48 + x + 1] |
| | "30" → S1 |
| | GO TO "IN3C" |
| INFØR 0 | ["X+1" CHAR. FROM INPUT MSG TO BE PRINTED] |
| | 0 → S1 [ONLY X+1 CHAR] |
| IN4H | |"IN3SR"| → S2, S3 [SUBROUTINE CALLED IN "K"] |
| IN4I | IF IPFAIX [INDEX INTO INPUT PRINT FIELD AREA] ≥ "10" :《E5》 ERRMSG [TOO MANY PRINT FIELDS], GO TO "EXIT" |
| | INSP + 1 → ! ( |IFPA2| + IPFAIX x 2) [STORE POINTER TO START OF PRINT AREA] |
| | CALL ! (S2, S3) [S.R. "IN3SR" OR "IN5SR"] |
| | CHARCT → ! ( |IFPA1| + IPFAIX) |
| | IPFAIX + 1 → IPFAIX; GO TO "INFLDF" [3] |
| INFØR 1 | [1: PRINT FIELD OF 15 x +1 CHAR] |
| | S1 = "10"; GO TO "IN4H" |
| INFØR 2 | [2: PRINT FIELD OF 32 x +1 CHAR] |
| | S1 + "20"; GO TO "IN4H" |
| INFØR 3 | [3: PRINT TO (BUT NOT INCLUDING) $x^{TH}$ OCCURRENCE OF FOLLOWING DELIM] |
| | |"IN5SR"| S2, S3 [FOR S.R. CALLED AT 4K] |
| | GO TO "IN4I" |

E

F

| | | |
|---|---|---|
| INFØR 8 | [SKIP TO DELIM (NEXT BYTE)  x+1 TIMES] | |
| | CALL "IN5SR" [T]  [S.R. USED TO SHARE CODE WITH PRINT] | A |
| | GO TO "INFLDF" [3] | B |
| [SUBROUTINE] IN5SR [T,4] | LSD ! FSPT → S1;  0 → CHARCT.  [S1 = "OCCURRENCE" COUNT] | C |
| | CALL "ADVFSP"  [GET NEXT BYTE FROM FORMAT AREA (THE DELIMITER)] ; ! FSPT → S2 [DELIM] | D |
| | [SR1] | |
| IN5D [T] | CALL "ADVISP"  [GET NEXT CHAR. FROM INPUT BUFFER: CHECK IF DELIM:] | E |
| | IF CHARCT ≠ "FF":  CHARCT +1 → CHARCT. | F |
| | IF ! INSP ≠ S2, GO TO "IN5D" | G |
| | IF S1 ≠ 0:  S1-1 → S1, GO TO "IN5D" | H |
| | CHARCT -1 → CHARCT   [TO ELIM. LAST DELIM] ; | I |
| | RETURN | |
| INFØR C | [LOAD REGISTER "X", 4 BITS/CHAR] [HEX FORMAT: 0-9,A-F] | |
| | 0 → AREG   [AS REG "X" +0] | A |
| IN6B [B3] | AREG + L.S.D. ! FSPT → REGID  [REGISTER ID] | B |
| | IF REGID > 24 [LIMIT OF USER-LOADABLE REG] : GO TO "ININVM"  [10] | B1 |
| | [DETERMINE REGISTER STARTING POSITION AND REGISTER LENGTH] | |
| | CALL "SRRLØC"  [SR2]  [REG EFFECTIVE STARTING ADDR. → REG SAD, LENGTH IN DIGITS → REGLTH] ;  0 → S4 [DIGIT CTR] | C |

IN6E [T]

CALL "ADVISP" [SR1] ; ! INSPT - "30"→ S1 [CHAR]    D

IF S1>"⌒": S1-7→ S1  [CONV. A-F TO HEX]    E

CALL "INSRSD" [7] [STORE DIGIT IN REG]    F

IF REGLTH> S4: GO TO "INGE".    G

IN6G [9C] [9E] [2D]

SET BIT IN REGFLG (4 BYTES) CORRES. TO REGID    H
    [SET REG "IN USE" FLG] : GO TO "INFLDF" [3]

INSRSD (6E, 9A) 12 A

[STORE DIGIT IN L.S.D. S1 IN NEXT REG. POSITION]

IF L.S.B. S4 = 0 [EVEN NUM. DIGITS] :    A

L.S.D. S1 [INPUT VALUE] ⟶

M.S.D. ! REGSAD [REGISTER]

S4 + 1  S4;    RETURN

[S4 IS ODD;]

L.S.D. S1 → L.S.D. ! REGSAD;    B

REGSAD + 1 → REGSAD;

S4 + 1 → S4;

RETURN

INFØRD

["D" + LOAD REG 16 + x, 4 BITS/CHAR]

"10"→ AREG [AS REG 16 + "x"]

GO TO "IN6B"

INFØRE

["E" = LOAD REG x, "B" BITS/CHAR]

["B" = 6 IF BFLAG = 0, "B" = 8
    IF BLFAG = "FF"]

L.S.D. ! FSPT→ REGID [GET REG. ID]

IN8D [10]

IF REGID> 24, GO TO "ININVM" [10]

IN8F
[9B]

INSRGD
[SR:8E]

IN9G
[8E,T]

CALL "SRRLØC" [SR2] [PUT REG LOC→REGSAD, REG LTH (DIGITS) → REGLTH]

0→ S2;   0→ S4 [DIGIT COUNTER]

IF BFLAG ≠ 0: [8 BITS/CH] :GO TO "IN9G
[6 BITS/CH.]

CALL "INSRGD" [9] [GET NEXT 4 BIT VALUE FROM INPUT (6 BITS/CHAR)→ S1]

[NOTE: BITS ARE M.S. ORIENTED]
CALL "INSRS D" [7] [STORES DIGIT IN S1 IN APPROPRIATE REG. LOC.]     A

IF REGLTH > S4:  GO TO "IN8F     B

GO TO "IN6G"   [REG. HAS BEEN LOADED]     C

[GET NEXT 4 BITS FROM INPUT @ 6 BITS/CHAR]

IF S2=0 [NO REMAIN. BITS] : CALL "ADVISP" [SR];     D

BITS 5, 4, 3, 2 OF ! INSP→ L.S.D. S1,
  BITS 1, 0 OF ! INSP→ BITS 3, 2 OF S3;
  [S2 = "STATE" INDICATOR: S3 HOLDS BITS
  FOR NEXT TIME. S1 IS CURRENT DIGIT]
  1→ S2; RETURN

IF S2=1 [2 BITS REMAINING] : CALL "ADVISP"     E
  [SR] ; S3→S1;   BITS 5, 4 OF ! INSP→
  BITS 0, 1 OF S1; L.S.D. ! INSP→ S3;
  2→ S2; RETURN
[S2=2:  4 BITS REMAIN:]

S3→ S1; 0→ S2; RETURN     F

[8 BITS/CHAR] [BITS ARE L.S. ORIENTED]

CALL "ADVISP"   [SR]     G

| | | |
|---|---|---|
| | ! INSP → ! REG SAD | H |
| | REGSAD +1 → REGSAD; REGLTH - 2 → REGLTH | I |
| | [LTH IS IN DIGITS: ONE BYTE JUST LOADED] | |
| | IF REGLTH > 0, GO TO "IN9G | J |
| | GO TO "IN6G" | K |
| INFØRF | [F: LOAD REG. 16+F, 6 BITS/IN CHAR. HOWEVER, "FF" = END OF DEFINITION] | |
| → | IF L.S.D. ! FSPT = "F", GO TO "PRØREG" [ ] | A |
| | [PROCESS REGISTERS] | |
| | L.S.D. ! FSPT + "10" → REGID. | B |
| | GO TO "IN8D" | C |
| ININVM [E] [11] [12] 6,8,11 | [INVALID MSG TYPE] | |
| | ≪ E3 ≫ → 2 BYTES ERRMSG: GO TO "EXIT" | D |
| INUNDF [2C] | [FORMAT UNDEFINED FOR THIS MSG. TYPE] | |
| | ≪ E4 ≫ → 2 BYTES ERRMSG: GO TO "EXIT" | E |
| INFØRA | [LOAD REG X, 4 BITS PER CHAR, UP TO FIRST NON-DIGIT (SKIPPED)] | |
| | L.S.D. ! FSPT → REGID [GET REG. I.D.] ; | A |
| | 0 → S5 [USED BY SRRLØC: MAX. LTH. IF VAR] | |
| | IF REGID > 24, GO TO ININVM [10] | A1 |
| | CALL "SRRLØC" [SR2] | B |
| | IF S5 = 0 : GO TO "ININVM: [10] | C |
| | [REGISTER LENGTH IS FIXED] | |
| | 0 → S4 [DIGIT COUNTER] ; REGSAD - 1 —2B→ ADDRES [ADDRES = LOCATION OF OFFSET] | D |

IN11E  
[N]

CALL ADVISP [SR1]                                           E

IF ! INSPT < « 0 » [ZERO] OR > « F »                        F

[NOT A HEX DIGIT] : GO TO IN12C

→

! INSP - "30" → S1                                          G

IF S1 > "9" : S1 - 7 → S1 [CONV. TO HEX]                    H

IN 12

IF S4 [DIGITS STORED]                                       A

= S5 [MAX REG LTH] : GO TO

ININVM [10] [TOO MANY DIGITS]

CALL INSRSD [7] [STORE S1 DIGIT IN                          B

REG] : GO TO IN11E

IN12C   [DONE: NON-HEX CHAR. FOUND] :

S5 - S4 → ! ADDRES [STORE OFFSET]                           C

GO TO IN6G                                                  D

SUBROUTINES
                                                          SR 1

ADVISP      [ADVANCE ISPT: CHECK IF AT BUFFER
IN1,3,5,9,
9G,11           END] [INPUT AREA SCAN POINTER]

2 BYTES

INSPT + 1 → INSPT.                              A

2 BYTES    2 BYTES
            IF ISPT ≥ IENDPT [END I/O AREA],                B

GO TO "WAIT" [ ]

RETURN                                          C

SRRLØC
[IN6,8,11
0 T8D

[GIVEN REG. ID. IN REGID, EFFECTIVE

STARTING LOCATION (BYTE)→ REGSAD,

LENGTH IN DIGITS → REGLTH] [CHANGES S5]

! (|RGLOT| + 2 x REGID) + |REGAR| $\overset{2B}{\longrightarrow}$ REGSAD    A

! (|RGLOT| + 2 x REGID + 1) → REGLTH

READ 2 BYTES IN REGISTER LOC TBL]

IF MS.B. REGLTH = 0 [REG. LTH. IS CONSTANT] :    B

RETURN

[REG LTH IS VARIABLE:]

(7 L.S.B. REGLTH) → S5; S5 - ! REGSAD → REGLTH    C

[SUBTRACT OFFSET (FIRST REG. BYTE) FROM

LENGTH IN DIGITS] ;

REG SAD + 1 → REGSAD [ACTUAL REG. IS

ONE BYTE BEYOND AREA START] ;

RETURN.

SR 3

ADVFSP
[IN,FA

[ADVANCE FORMAT SCAN POINTER (FSPT)]

2 BYTES

FSPT - 1 → FSPT [DECREMENT TO    A

ADVANCE]

2 BYTES

IF FSPT > FAEPT, RETURN    B

[FSPT HAS REACHED END OF FORMAT

AREA:]

SR 3C
[5]

《 E 7 》 TO ERRMSG; GO TO "EXIT"    C

SR 4

ADVFEP
[FA]

[ADVANCE (DECREMENT) AND TEST FAEPT]

FAEPT - 1 → FAEPT                                              A

IF (FAEPT ≤ IENDPT):                                           B

⟪ E 8 ⟫ —→ ERRMSG, GØ TØ "EXIT"
    2 BYTES

RETURN                                                         C

ADVIØP
[OT]

[ADVANCE (DECREMENT) AND TEST IØEPT]                           ①

IØEPT - 1 → IØEPT                                          D  ①

IF ØUTDEV ≠ 1, GØ TØ SR4H                                  E

IF IØEPT > I1EPT. (TWO BYTE                                F  ①
        VALUES) : RETURN

[ØUT ØF RANGE, DEV 1 (AND 2):]

SR4G     ⟪ E9 ⟫ —→ 2 BYTES ERRMSG; GO TO                       G
             "EXIT"

[DEV.2:]

SR4H    IF IØEPT > I2EPT (2 BYTES): RETURN                     H  ①

GØ TØ SR4G                                             I

ADVØFP  [ADV. OUTPUT FORMAT PTR, ØFSPT]

2 BYTES ØFSPT - 1 → ØFSPT [DECREMENT

TO ADVANCE]

IF 2 BYTES ØFSPT < FAEPT, RETURN,

GO TO "SR3C"

OUTPUT MSG. PREPARATION

ØUTMPR

[ØUTMSG = TYPE OF OUTPUT MESSAGE]

[OUTDEV = OUTPUT DEVICE ID]

IF ØUTMSG × 2 ≥ |RØMØFE| − |RØMØFT|

[INVALID MSG. TYPE], GO TO ØTINVM

[14].

2 BYTES ! (|RØMØFT| + (2× ØUTMSG))

ØFSPT [OUTPUT FORMAT SCAN PTR]

IF FIRST BYTE (ØFSPT) = "FF" [DEFINED

IN RAM] : 2 BYTES ! (|RAMFLT| +

(2ND BYTE (ØFSPT))) ⟶ ØFSPT

[GET LOCATION FROM RAM TABLE]

ØFSPT + 1 ⟶ ØFSPT. [SO MAY BE ADV. BEFORE USE]

IF OUTDEV = 1, FAEPT ⟶ IØEPT. IF OUTDEV = 2,

|SIA1| − 1 ⟶ IØEPT. [SET IØ AREA POINTER]

《STX》 ⟶ ! IØEPT

CALL "ADVIØP" [ADVANCE IØEPT] [SR4]

ØTNEXT
[T, 3G
5H, 7D
6G, 9H
14E

CALL "ADVØFP [SR5] [ADVANCE OUTPUT

FORMAT POINTER, ØFSPT (MOVES BACKWARDS)]

JUMP TO CODE INDICATED BY

M.S.D. ! ØFSPT [i.e. GO TO

ØTFØRO THRU ØTFØRF]

ØTFOR0

[ASCII LIT VAL OF X CHAR FOLLOWS]

0 ⟶ CHARCT [L.S.D. ! ØFSPT = TOTAL CT]

| | |
|---|---|
| ⌀T2D [N] | CHARCT + L.S.D. ! ⌀FSPT ⟶ CHARCT |
| ⌀T2E [T] | IF CHARCT = 0, GO TO "⌀TNEXT" [T] |
| | CHARCT - 1 ⟶ CHARCT |
| | CALL ADV⌀FP [SR] [ADV. ⌀FSPT] |
| | ! ⌀FSPT ⟶ ! I⌀EPT |
| | CALL "ADVI⌀P" [SR] [ADV. I⌀EPT] |
| | GO TO ⌀T2E |
| ⌀TF⌀R1 | [ASCII LIT VAL. OF 16 + x CHAR. FOLLOWS:] |
| | "10" ⟶ CHARCT [16 + L.S.D. ! ⌀FSPT] |
| | GO TO "⌀T2D" |
| ⌀TF⌀R2 | [ASCII LIT VAL OF 32 + x CHAR. FOLLOWS:] |
| | "20" ⟶ CHARCT |
| | IF L.S.D. ! ⌀FSPT < "D", GO TO "⌀T2D" |
| | ["D" OR GREATER: SPECIAL CONDITIONS:] |
| | IF ! ⌀FSPT > "D", GO TO "⌀T4A" |
| | ["D" = ASCII LIT VAL TO «]»] |
| ⌀T3F [T] | CALL "ADV⌀FP" [SR5] [ADV. ⌀FSPT] |
| | IF ! ⌀FSPT = ASCII «]» , GO TO |
| | "⌀TNEXT" [2] |
| | ! ⌀FSPT ⟶ ! IOEPT |
| | CALL "ADVI⌀P" [SR] ; GO TO "⌀T3F" |

ØT4A
[3E]

IF ! ØFSPT = "F", GO TO "ØT4F"

["E" = "ĈR"]

ASCII ≪ L̂F ≫ ⟶ ! IOEPT; CALL

"ADVIØP" [SR]

ASCII ≪ĈR≫ ⟶ ! IØEPT.

ØT4D
[T]

IØEPT $\xrightarrow{2B}$ LASTTB   [OUTPUT BFR POS'N SAVED

FOR "8X" ETC]

CALL "ADVIØP" [SR]; GO TO "ØTNEXT" [2]

ØT4F

ASCII ≪ V̂T ≫ ⟶ ! IØEPT  ["F" = "TAB"]

GO TO "ØT4D"

ØT 5

ØTFØR3

[INSERT PRINT FIELD INDICATED BY "X":]

BYTES ! ( !IPFA2! + 2x (L.S.D. ! ØFSPT)) ⟶  A

ADDRES.

! ( !IPFA1! + L.S.D. ! ØFSPT) ⟶ CHARCT.   B

[ADDRES POINTS TO FIRST INPUT MSG. BYTE –

CHARCT. INDICATES NUM OF CHAR]

ØT5E
[T]

IF CHARCT + 0, GO TO "ØTNEXT" [ALL CHAR. MOVED]  E

! ADDRES ⟶   ! IØEPT   F

CALL "ADVIØP"   G

ADDRES + 1 ⟶ ADDRES; CHARCT - 1 ⟶ CHARCT   H

GO TO ØT5E   J

| | |
|---|---|
| ØTFØR4 | [INSERT X+1 SPACES] |
| | 0 → CHARCT [AS NOT MORE THAN X+1] |
| ØT6B [T] | CHARCT + L.S.D. ! ØFSPT ["X"] + 1 → CHARCT |
| | [1 ADD'L FOR SUBSEQUENT DECR & TEST] |
| ØT6C [T] | ASCII ≪ SP ≫ → ! IØEPT |
| | CALL "ADVIOP" [SR] |
| | DECR. CHARCT |
| | IF CHARCT ≠ 0, GO TO "ØT6C" |
| | GO TO "ØTNEXT" |
| ØTFØR5 | [INSERT 16 + X + 1 SPACES:] |
| | "10" → CHARCT: GO TO "ØT6B" |
| ØTFØR6 | [INSERT 32 + X + 1 SPACES:] |
| | "20" → CHARCT; GO TO "ØT6B" |
| ØTFØR7 | [INSERT 48 + X + 1 SPACES:] |
| | "30" → CHARCT; GO TO "ØT6B" |
| ØTFØR8 | [8 INSERT SPACES THRU POS'N X=1 FROM TAB OR CR] |
| | 0 → CHARCT |
| ØT7B [T] | CHARCT + L.S.D. ! ØFSPT + 1 → CHARCT |
| | LAST TB $\overset{2B}{-}$ CHARCT $\overset{2B}{\longrightarrow}$ ADDRES [BACKWARDS IN MF |
| | ["ADDRESS" POINTS TO LAST LOCATION TO RECEIVE A SPACE"] |

| | |
|---|---|
| ⌀T7D<br>[T] | IF I⌀EPT < ADDRES, GO TO "⌀TNEXT" [2]<br><br>ASCII ≪ SP ≫ → ! I⌀EPT<br><br>CALL "ADVI⌀P"   [SR] ; GO TO "⌀T7D" |
| ⌀TF⌀R9 | [SPACES TO 16 + X 1 ...]<br><br>"10" → CHARCT; GO TO "⌀T7B" |
| ⌀TF⌀RA | [SPACES TO 32 + X 1 ...]<br><br>"20" → CHARCT; GO TO "⌀T7B" |
| ⌀TF⌀RB | [SPACES TO 48 + X 1 ...]<br><br>"30" → CHARCT; GO TO "⌀T7B" |
| ⌀TF⌀RC | [C = INSERT REGISTER "X", 4 BITS PER<br><br>OUTPUT CHARACTER]<br><br>0 → SL [AS ONLY "X"] ; 0 → S2 [FOR FLAG] |
| ⌀T8B<br>[12E] | \|"⌀TSR4D"\|  [10]  [OUTPUT 4 REGISTER DIGITS]$\frac{2B}{}$<br><br>ADDRES [HOLDS ADDR. OF<br><br>SUBROUTINE TO PLACE REG. DATA<br><br>IN OUTPUT BUFFER] |
| ⌀T8C<br>[13C] | L.S.D. ! ⌀FSPT + S1 → REGID<br><br>IF BIT IN REGFLG [4 BYTES]  CORRESPONDING TO<br><br>REGID = 0: GO TO ⌀TINUM [14] [REG NOT US<br><br>CALL "SRRL⌀C"  [SR2] [REG S5 ADDR →<br><br>REGSAD, LTH → REGLTH]<br><br>IF S2 ≠ 0 [8 BITS/CHAR.] , GO TO "⌀T14A" |

ØT9A
[T]

M.S.D. ! REGSAD ⟶ S1; DECR. REGLTH

CALL ! ADDRES [S.R. TO PLACE DATA

IN OUTPUT BUFFER]

IF REGLTH = 0, GO TO "ØTNEXT" [2]

L.S.D. ! REGSAD ⟶ S1; DECR. REGLTH

CALL ! ADDRES.

INCR. REGSAD.

IF REGLTH ≠ 0, GO TO ØT9A

[DONE:]

GO TO "ØTNEXT" [2]

ØTSR4D
[SR-8B

[SUBROUTINE: PLACE DIGITS IN OUTPUT BUFFER,

4 BITS/CHAR IN PRINTED HEX CHAR.

(0-9, A-F). 4 BIT VALUE IN L.S.D. S1]

S1 + "30" ⟶ S1 [CONV. TO CHAR.]

IF S1 > "39" [《?》] : S1 + 7 ⟶ S1 [CONV.

TO ≪ A-F ≫]

S1 ⟶ ! IØEPT [WRITE TO BUFFER]

CALL ADVIØP [SR4] ; RETURN

ØTSR6D
[SR-13C

[SUBROUTINE: PLACE L.S.D. S1 BITS IN OUTPUT

BUFFER, 6 BITS/CHAR.]

IF S2 ≠ 0, GO TO "∅T11A"

[S2 = 0: NO LEFT-OVER BITS FROM BEFORE]

L.S.D. S1→BITS 5, 4, 3, 2: S3, 0→BITS 1,0:S3;

S2 + 1 ⟶ S2.

IF REGLTH ≠ 0, RETURN

GO TO "∅T11H" [FOR LAST CHAR.]

[2 OR 4 LEFT-OVER BITS]

∅T11A
[10]

IF S2 > 1, GO TO I∅12A

[S2 = 1: 4 LEFT-OVER BITS]

BITS 3, 2: S1⟶ BITS 1, 0: S3 [INCLUDE 2 NEW [

"40" OR S3 ⟶ ! I∅EPT [EXCLUDE CONTROL CHAR.]

CALL "ADVI∅P" [SR4]

BITS 1, 0: S1⟶BITS 5, 4: S3; 0→BITS 3-0: S3

INCR. S2

IF REGLTH ≠ 0, RETURN

[PREPARE TO OUTPUT RESIDUE (LAST REG. DIGIT)]

∅T11H
[PIN]

"40" OR S3 ⟶ ! I∅EPT

CALL "ADVI∅P" [SR4]

RETURN
[S.R. CONT.]

I∅12A
["]

[S2 = 2: 2 BITS LEFT OVER]

L.S.D. S1→BITS 3, 2, 1, 0: S3

0→S2 [NO LEFT-OVER BITS]

GO TO ∅T11H

[END OF SUBROUTINE]

ØTFØRD        [D = INSERT REG. 16 + X, 4 BITS/CHAR]

"10" → S1 [FOR 16 + X], 0 → SR [FLAG];

GO TO "ØT8B"
ØTFØRE        [E = "X" REG. TRANSFER TO OUTPUT BUFFER,
                 "B" BITS/CHAR]

0 → S1 [AS NO MORE THAN ※ "X"];

ØT13B         BFLAG → S2 [FLAG: 6 (0) OR 8 (1) BITS/CHAR]
[T]
              !"ØTSR6D:| —[10]→ ADDRES [LOC. OF 6 DIGIT
                 OUTPUT SUBROUTINE]

GO TO "ØT8C"

ØTFØRF        [F = REG. "X + 16 CONTENTS TO OUTPUT BFR]

[FF = "END"]

IF L.S.D. ! ØFSPT = "F", GO TO "STRØUT"
                                                   [I/O]

"10" → S1, GO TO "ØT13B
ØT14A         [TRANSFER REGISTER, 8 BITS/CHAR. TO OUTPUT
[P] [T]
[8]              BUFFER]

! REGSAD → ! IØEPT

CALL "ADVIØP  [SR4]

REGLTH - 2 → REGLTH, INCR REGSAD

```
                    IF REGLTH ≤ 0, GO TO "∅T14A"

[DONE:]

GO TO "∅TNEXT" [2]

∅TINUM              [INVALID OUTPUT MESSAGE TYPE]
[8]
                    《EA》→ 2 BYTES ERRMSG; GO TO "EXIT"
             CONVENTIONS USED:

XYZ        :      CONTENTS OF MEMORY AREA XYZ

XYZ        :      ADDRESS OF MEMORY AREA XYZ

!XYZ       :      CONTENTS OF THE MEMORY LOCATION
                                WHOSE ADDRESS IS IN XYZ.
                                NOTE: ! XYZ = XYZ

12                THE DECIMAL NUMBER 12

"12"              THE HEX NUMBER 12 (DEC 18)

"XYZ"             A PROGRAM LABEL

XYZ               A DATA LABEL
             FORMAT ASSEMBLER

MSG00               [FOLLOWING CODE IS TO PROCESS
[N]
                         MESSAGE TYPE "00"]

[ISPT (INPUT SCAN POINTER) PRESENTLY
                         POINTS TO LAST CHAR. OF
[C, 6H                   THE MESSAGE TYPE INDICATOR "00"]
10F

FA NEXT             0 → N HOLD  [STORAGE FOR VALUE "N"]        A
6,14B,C,D

FA1B                ADVANCE (INCR TEST) INSPT. IF ! ISPT =      B
[5B]
[7]                      ASCII 《ETX》, GO TO "FAEND" [15]

•
```

|  |  |  |
|---|---|---|
|  | IF ! ISPT = ASCII SP, LF OR CR, GO TO FA1B | B1 |
|  | DOES ! ISPT FALL OUTSIDE OF ASCII<br>  UPPER-CASE LETTER COLUMNS? (IE<br>   < 40, ≥ 60 IGNORING PARITY?) | C |
|  |   IF "YES" GO TO "FAEFERR" [15]<br>[FORMAT ERROR] |  |
|  | JUMP !(|FATBL| [FORMAT ASSEMB. TBL.] +2 x<br>  (5 L.S.B. ! ISPT) [JUMP TO CODE<br>  FOR THIS CHAR.] | D |
| FALRI | [LETTER "I" FOUND - INDICATES DEF.<br>  FOR THE INPUT MSG INDICATED BY<br>  FOLLOWING DECIMAL NUMBER] |  |
| FA2A<br>[19] | CALL "DH1T3" [16] [TAKES 1-3 FOLLOWING<br>  NUMERIC CHAR. CONV. TO HEX,<br>  ADVANCES ISPT] AREG → MSGTYP |  |
|  | IS 2x(MSGTYP) ≥ |R∅MIFE| - |R∅MIFT| ?<br> [MSGTYP TOO BIG] : IF<br>  YES, GO "FAFERR [15] [FORMAT<br>  ERROR] |  |
|  | DOES !(|ROMIFT| + (2xMSGTYP)) = "FF"<br>  IF NO, GO TO FAARDF" [15]<br>  [ALREADY DEFINED] [AS IS DEFINED<br>  IN ROM] |  |
|  | !(|R∅MIFT| + (2xMSGTYP) + 1) → S1<br>  [RAM INPUT FORMAT INDEX]<br>  [THIS VALUE IS IN BYTES x 2] |  |

FA

FA3A  IF ! ( S1 + |RAMFLT|) ≠ 0, GO TO
[!']         "FAARDF" [15] [ALREADY
             DEFINED]
             [AS FORMAT IS DEFINED IN RAM]

FAEPT ⟶ ! (S1 + |RAMFLT| ) [ADDR. OF
             OLD   END OF FORMAT INFOR ⟶
             FORMAT INFO FOR THIS MESSAGE
             TYPE]

GO TO "FANEXT" [1]

FA 4

FALRT  ["T" = PRINT FIELD OF "WXY" CHAR]

FA4B   CALL "DH1T3" [16]; AREG-1 ⟶ S1
             [CONV. NEXT 1-3 NUMERIC
             CHAR. (DECIMAL) TO HEX,
             STORE RESULT -1 IN S1]

FA4C   IF S1 < "30", GO TO "FA4E"
[T]          "2F" ⟶ ! FAEPT, ADVANCE
             FAEPT. S1 - "30" ⟶ S1,
             GO TO "FA4C" [T] [FOR REMAINING
             CT.]

FA4E   S1 ⟶ !FAEPT, GO TO FAADNX [6]
[T]          [STORE, ADV. PTR, GET NEXT
             CHAR.]

[NOTE: 0X = PRINT FIELD OF X+1⎫
              1X =                X+17⎬ RESULT]
              2X =                X+33⎭

| | | |
|---|---|---|
| FALRN | [LETTER "N" = GET FOLLOWING NUM, CONV TO HEX, STORE IN N HOLD] | |
| | CALL "DH1T3" [16] [CONV. FOLLOWING 1 TO 3 DEC. CHAR. TO HEX] STORE RESULT IN N HOLD [1 BYTE] | A |
| | GO TO "FA1B" [FOR NEXT CHAR W/O CLEARING N HOLD] | B |
| FALRV | [LETTER V: PRINT FIELD TO DELIMITER, Nth OCCURRENCE] | |
| | 30 → (! FAEPT) [3X = PRINT FIELD TO DELIM.] | A |
| FA6B [8] | IF N HOLD = 0 : 1 → N HOLD | B |
| | L.S.D. (N HOLD - 1) OR (! FAEPT) → ! FAEPT. [TYPE CODE TO MOST SIG. DIGIT, (N HOLD - 1) → LEAST SIGNIFICANT DIGIT] | C |
| | ADVANCE [DECR → TEST] FAEPT. | D |
| | ADVANCE [INCR → TEST] ISPT | E |
| | ! ISPT → ! FAEPT [MOVE DELIMITER] | F |
| FAADNX [4E,7D 8E,9D 11B,C,12D, 13A,C,14B, C,D | ADVANCE [DECR → TEST] FAEPT | G |
| | GO TO "FANEXT" [1] | H |
| FALRS | [SKIP "WXY" CHAR. POSITIONS] "40" → S2 [TO DISTINGUI "40" GROUP FROM "80" (OUT) GROUP] | A |

| | | |
|---|---|---|
| FA7B [13D] | CALL "DH1T3"; AREG - 1→S1 [CONV. NXT 1 - 3 DEC CHAR TO HEX → S1] | B, C |
| FA7D [T] | IF S1 < "40", GO TO "FA7F" | D |
| | S2 + "3F" → !FAEPT; ADVANCE (DEC 7 TEST) FAEPT.<br>S1 - "40"→S1, GO TO "FA7D"<br>[THIS MAKES AN ENTRY FOR MAX VALUE: 64 CHAR POS'NS] | E |
| FA7F [T] | S2 + S1 → ! FAEPT. GO TO "FAADNX" [6] | F |
| | [NOTE: 4X = SKIP X + 1 CHAR<br>5X = X + 17<br>6X = X + 33<br>7X = X + 49 } RESULT]<br>[LETTER "D"] | |
| FALRD | [SKIP TO DELIMITER, Nth OCCURRENCE] | |
| | 80 → ! FAEPT | A |
| | GO TO "FA6B" | B |
| FALRQ | [LETTER "Q": LOAD REG "XY", "B" BITS<br>PER CHAR.] | |
| | "E0" → S2 | C |
| | GO TO FA9B | D |
| FALRE | [LETTER "E": END OF DEFINITION] | |
| | "FF" → ! FAEPT: GO TO "FAADNX" [6] | E |

FALRR        [LETTER "R": LOAD REGISTER "XY", 4
                     BITS/CHAR]

"CO" ⟶ S2                                          A

FA9B         CALL "DH1T3" [16], AREG ⟶ S1                       B
[8]
[17]
             IF S1 > "1E", GO TO                                C
                     "FAFERR" [15]   [FORMAT
                  AREA AS NO REGISTER > 30]

S1 + S2 ⟶ ! FAEPT: GO TO "FAADNX" [6]              D
FALRL        [LETTER "L" : SET LENGTH OF REGISTER
                     "XY" AT "N" (VALUE IN N HOLD)
                     DIGITS]

CALL "DH1T3" [16]⟶S1   [GET REGISTER               A
                     IDENTITY]

IF |RGLØT| = 2 x S1 ≥ |RGLTE| , [INVALID           B
                     REGISTER ID] , GO TO "FAFERR
                     [15]
                     [FORMAT ERROR]

! (|RGLØT| + (2 x S1))⟶S2, ! (|RGLOT|              C
                     + (2 x S1) + 1)
                            ⟶ S3 [FETCH REG LOC TBL ENTRY]

IF M.S.B. S3 = 0, GO TO "FAFERR" [15]              D
                     [REGISTER IS NOT VARIABLE LENGTH]
             IF ( 7 L.S.B. S3)< N HOLD, GO TO
                     "FAFERR" [15] [SPECIFIED LTH TOO           E
                     LONG]

(7 L.S.B. S3) - N HOLD ⟶ ! (|REGAR| + S2)          F
                     [STORE STARTING OFFSET]

GO TO "FANEXT" [1]                                 G

[OUTPUT FORMAT DEFINITION:]

FALRP  [LETTER "P" : INDICATES DEFINTION
         FOR OUTPUT MESSAGE "XY"]

CALL "DH1T3" [16], AREG ⟶ MSGTYP            A

IS 2 x MSGTYP ≥ |ROMØFE| - |RØMØFT| ?       B
    IF YES [MSGTYP TOO BIG], GO
    TO FAFERR [FORMAT ERROR]

IF ! ( |RØMØFT| + (2x MSGTYP)) ≠ "FF",      C
    GO TO FAARDF [15] [ALREADY
    DEFINED IN RØM]

! (|RØMØFT| + (2x MSGTYP) + 1) ⟶ S1         D
    [RAM INPUT FORMAT INDEX,
    BYTES x 2]

GO TO FA3A                                   E

FALRC  [LETTER "C" : L.F, CR]
       "2E" ⟶ ! FAEPT: GO TO "FAADNX" [6]

FALRG  [LETTER "G" : GO TO NEXT TAB]         G
       "2F" ⟶ ! FAEPT: GO TO "FAADNX" [6]

FALRØB [CHAR: "OPENING BRACKET" ("⌐")
        BEGINNING OF LITERAL]

0 ⟶ S1;                                      A
FAEPT ⟶ S2, S3 [HOLD CURRENT VALUE TO
    WRITE IDENTIFIER] : ADVANCE
    FAEPT

FA12B  INCR.⟩TEST ISPT                       B
[T]

IF ! ISPT ≠ "5D" (ASCII "]"):                C
    S1 + 1

⟶ S1; ! INSPT ⟶ ! FAEPT;
   ADVANCE FAEPT: GO TO "FA12B"

[LIT STRING TRANSFERRED TO FORMAT
   AREA, S1 = NUM OF LIT CHAR]

IF S1 > "2C" : ! INSPT ⟶ ! FAEPT               D
   [MOVE "⊐"] ; "2D" ⟶ ! (S2,S3)
   [STORE ID] ,
   GO TO "FAADNX" [6]
S1 ⟶ ! S2; GO TO FANEXT [1]  [AS            A
   FAEPT ALREADY ADVANCED]

FALRF    [LETTER "F" COPY "XY" th. PRINT FIELD
            FROM INPUT BUFFER]

CALL "DH1T3" [16] ⟶ S1. IF                     B
   S1 > "10", GO TO "FAFERR" [15]
   [FORMAT ERROR. ONLY 16 PRINT
    FIELDS ALLOWED]

S1 - 1 + "30" ⟶ ! FAEPT: GO TO                 C
   "FAADNX" [6]
   [STORE "30" + X - 1 IN OUTPUT
    FORMAT AREA]

FALRA    [LETTER "A" : ADVANCE TO CHAR. POS'N
            REF. LAST CR OF TAB]

"80" ⟶ S2, GO TO "FA7B"                        D
   [USE CODE FOR "S" EXCEPT USE
    "80" INSTEAD OF "40"]

[LETTER "K":]

FALRK

[CANCEL (DELETE) MOST RECENTLY-DEFINED
  REMAINING FORMAT DEFINITION.
  WHETHER INPUT OR OUTPUT]

FIND SMALLEST NON-ZERO TWO BYTE VALUE     A
  BETWEEN |RAMFLT| AND (NOT
  INCLUSIVE) |RAMFTE| .
  [FORMAT TABLE IS BACKWARDS] . THIS
  VALUE → FAEPT:
  THIS VALUE REPLACED BY ZERO
  IF NO NON-ZERO VALUE FOUND,
  |STFA| → FAEPT.

GO TO FANEXT [1]                          B

FALRB

["B" = SET BFLAG = 0 FOR 6 BITS/CHAR REG
  IN/OUT OPTION.]

0 → BFLAG: GO TO "FANEXT" [1]             C

FALRH

["H" AS "B" EXCEPT BFLAG TO "FF" =
  8 BITS/CHAR

"FF" → BFLAG: GO TO "FANEXT" [1]          D

FAEND
[1B]
[END OF FORMAT DEFINITION PROCESS]
  [OUTPUT MSG《C1》 TO FORMAT
    ORIGINATOR]

《C1》 → 2 BYTES (ERRMSG) [ALTHOUGH       A
    NOT REALLY AN ERROR]                  B

GO TO "EXIT"

FAFERR
[1C,10B,
13B,10D]
[FORMAT ERROR]

[OUTPUT MESSAGE 《 E1 》  TO FORMAT
  ORIGINATOR]

《 E1 》 → 2 BYTES (ERRMSG)                C

GO TO "EXIT"                              D

| | | |
|---|---|---|
| FAARDF [2D,3A, 9C | [REGISTER LENGTH ALREADY DEFINED] | |
| | [OUTPUT MESSAGE ≪ E2 ≫ TO FORMAT ORIGINATOR] | E |
| | ≪ E2 ≫ → 2 BYTES (ERRMSG) | F |
| | GO TO "EXIT" | |
| DH1T3 [2C.10A,11 13B,4A,5 | [CONVERT THE FOLLOWING 1 TO 3 DEC CHAR TO HEX. MAX VALUE OF RESULT IS 2SS] | |
| | ADVANCE ISPT : LSD (! ISPT) → SS1; 0 → SS2; 0 → SS3 | A |
| FA16B [T] | IS ! (ISPT + 1) A DECIMAL (ASCII) DIGIT ? IF NO, GO TO "FA16F" | B |
| | ADVANCE ISPT SS2 → SS3; SS1 → SS2; LSD (! ISPT) → SS1 | C |
| | GO TO "FA16B" | D, E |
| FA16F [T] | SS1 + SS2 x "A" + SS3 x "64" [DEC 100] → AREG | F |
| | RETURN | G |
| FALRM | [LETTER "M" : LOAD REGISTER, 4 BITS/CHAR, UNTIL NON-DIGIT (WHICH IS SKIPPED) IS FOUND] | |
| | "A0" → S2 | A |
| | GO TO FA9B | B |

I claim:

1. In a system, including at least two data processing units, for automatically performing banking functions in response to transaction requests, originated at a banking terminal by a banking customer, said banking terminal associated with a first one of said data processing units, apparatus for verifying the identity of said customer comprising:

means, at said terminal operated by said customer, for receiving a scret customer code and for encrypting said code to form an encrypted message portion;

means at said terminal for receiving transaction information and for forming a transaction message portion;

means for transmitting said encrypted message portion and said transaction message portion from said terminal to said first data processing unit;

means at said first data processing unit for interpreting said transaction message portion and for providing a first control signal if said customer has an account maintained by said data processing unit and for providing a second control signal if said customer has an account maintained by a second data processing unit in said system;

a memory associated with said first data processing unit for storing encrypted customer codes, and including means for selecting an encrypted customer code from said memory in response to said first control signal in accordance with said transaction message portion;

and decrypting means connected to said first data processing unit and receiving said encrypted message portion and said selected customer code from said first data processing unit, and responsive to said first control signals for decrypting said encrypted message portion, and including means for comparing said decrypted message portion to said selected customer code, and said decrypting means further including means, responsive to said second control signals, for decrypting said encrypted message portion and re-encrypting said encrypted message portion for transmission with said transaction message portion to said data processing unit.

2. Apparatus as specified in claim 1 wherein said means for encrypting said code is operable in response to said secret code and to said transaction message portion thereby to form an encrypted message portion which is encrypted with at least portions of said transaction message portion, whereby said transaction message portions are verified by the successful decrypting and comparison of said secret code.

3. Apparatus as specified in claim 1 wherein said system includes a plurality of said terminals, wherein said encrypting means at each terminal makes use of a first encrypting key unique to that terminal, wherein said decrypting means incudes a memory for storing said first encrypting keys and means for selecting oen of said first encrypting keys in accordance with the terminal at which a message originated.

4. Apparatus as specified in claim 3 wherein said first encrypting keys are stored in said memory inencrypted form and wherein said decrypting means includes means for decrypting said keys.

5. Apparatus as specified in claim 4 wherein said decrypting and re-encrypting means includes a memory for storing re-encrypting keys.

* * * * *

UNITED STATES PATENT AND TRADEMARK OFFICE
CERTIFICATE OF CORRECTION

PATENT NO. : 4,259,720
DATED : March 31, 1981
INVENTOR(S) : Carl M. Campbell

It is certified that error appears in the above—identified patent and that said Letters Patent is hereby corrected as shown below:

Column 5, line 28, "form memory" should read --from memory--.
Column 6, line 65, "from" should read --form--.

Signed and Sealed this

Ninth Day of February 1982

[SEAL]

Attest:

Attesting Officer

GERALD J. MOSSINGHOFF
Commissioner of Patents and Trademarks